US012791834B2

(12) United States Patent
Lee et al.

(10) Patent No.: US 12,791,834 B2
(45) Date of Patent: Nov. 10, 2026

(54) OPTICAL IMAGING SYSTEM COMPRISING NINE LENSES

(71) Applicant: Samsung Electro-Mechanics Co., Ltd., Suwon-si (KR)

(72) Inventors: Ji Su Lee, Suwon-si (KR); Dong Hyuk Jang, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 176 days.

(21) Appl. No.: 18/619,867

(22) Filed: Mar. 28, 2024

(65) Prior Publication Data

US 2024/0369809 A1 Nov. 7, 2024

(30) Foreign Application Priority Data

May 3, 2023 (KR) ........................ 10-2023-0057877

(51) Int. Cl.
*G02B 13/00* (2006.01)
*G02B 9/64* (2006.01)

(52) U.S. Cl.
CPC ........... *G02B 13/0045* (2013.01); *G02B 9/64* (2013.01)

(58) Field of Classification Search
None
See application file for complete search history.

(56) References Cited

U.S. PATENT DOCUMENTS

2020/0249437 A1* 8/2020 Hirano ............... G02B 13/0045
2020/0393652 A1* 12/2020 Kuo ......................... G02B 9/64
2020/0393653 A1* 12/2020 Chen .................. G02B 13/0045
2021/0215915 A1 7/2021 Hirano
2021/0364746 A1 11/2021 Chen
2022/0066146 A1 3/2022 Huang
2022/0137339 A1 5/2022 Kuo
2022/0171162 A1 6/2022 Jang et al.
(Continued)

FOREIGN PATENT DOCUMENTS

CN 113534416 A 10/2021
CN 217981990 U 12/2022
(Continued)

OTHER PUBLICATIONS

English translation of TW 202144847 A Published on Dec. 1, 2021 to Chen (72 pages) (Year: 2021).*
(Continued)

*Primary Examiner* — Paul C Lee
(74) *Attorney, Agent, or Firm* — NSIP Law

(57) ABSTRACT

An optical imaging system includes a first lens, a second lens, a third lens, a fourth lens, a fifth lens, a sixth lens, a seventh lens, an eighth lens, and a ninth lens sequentially disposed in ascending numerical order from an object side of the optical imaging system toward an imaging surface of the optical imaging system, wherein the first lens has a positive refractive power, the second lens has a positive refractive power, and the third lens has a negative refractive power, an Abbe number of the third lens is less than an Abbe number of the first lens and is less than an Abbe number of the second lens, and $TTL/(2 \times IMG\ HT)<0.7$ is satisfied, where TTL is a distance from an object-side surface of the first lens to the imaging surface, and IMG HT is one half of a diagonal length of the imaging surface.

22 Claims, 31 Drawing Sheets

(56) References Cited

U.S. PATENT DOCUMENTS

| | | | | |
|---|---|---|---|---|
| 2023/0194832 | A1 | 6/2023 | Park et al. | |
| 2024/0019663 | A1* | 1/2024 | Kwon | G02B 9/64 |

FOREIGN PATENT DOCUMENTS

| | | | | | |
|---|---|---|---|---|---|
| CN | 114578510 | B | | 2/2023 | |
| TW | 202144846 | A | | 12/2021 | |
| TW | 202144847 | A | * | 12/2021 | |
| TW | 202219585 | A | | 5/2022 | |
| TW | 202238206 | A | | 10/2022 | |
| WO | WO-2022124835 | A1 | * | 6/2022 | G02B 13/18 |

OTHER PUBLICATIONS

English translation of WO 2022/124835 A1 published on Jun. 16, 2022 to Kwon (121 pages) (Year: 2022).*

Taiwanese Office Action issued on Nov. 12, 2024, in counterpart Taiwanese Patent Application No. 113113177 (10 pages in English, 7 pages in Chinese).

Taiwanese Office Action issued on Oct. 13, 2025, in counterpart Taiwanese Patent Application No. 114134584 (9 pages in English, 6 pages in Chinese).

Indian Office Action issued on Jun. 10, 2026, in counterpart Indian Patent Application No. 202414027773 (9 pages in dual-text English and Hindi).

* cited by examiner

OPTICAL IMAGING SYSTEM COMPRISING NINE LENSES

CROSS-REFERENCE TO RELATED APPLICATIONS

This application claims the benefit under 35 USC 119(a) of Korean Patent Application No. 10-2023-0057877 filed on May 3, 2023, in the Korean Intellectual Property Office, the entire disclosure of which is incorporated herein by reference for all purposes.

BACKGROUND

1. Field

The present disclosure relates to an optical imaging system.

2. Description of Related Art

A recent portable terminal is equipped with a camera including an optical imaging system including a plurality of lenses to enable video calls and image capturing.

Furthermore, as the functions of a camera in a portable terminal have gradually increased, demand for cameras for the portable terminal having a high resolution is increasing.

Furthermore, as the portable terminal has gradually become smaller, a slimmer camera for the portable terminal is needed, and accordingly there is a need for the development of an optical imaging system that is slim and has a high resolution.

SUMMARY

This Summary is provided to introduce a selection of concepts in simplified form that are further described below in the Detailed Description. This Summary is not intended to identify key features or essential features of the claimed subject matter, nor is it intended to be used as an aid in determining the scope of the claimed subject matter.

In one general aspect, an optical imaging system includes a first lens, a second lens, a third lens, a fourth lens, a fifth lens, a sixth lens, a seventh lens, an eighth lens, and a ninth lens sequentially disposed in ascending numerical order along an optical axis of the optical imaging system from an object side of the optical imaging system toward an imaging surface of the optical imaging system, wherein the first lens has a positive refractive power, the second lens has a positive refractive power, and the third lens has a negative refractive power, an Abbe number of the third lens is less than an Abbe number of the first lens and is less than an Abbe number of the second lens, and $TTL/(2\times IMG\ HT)<0.7$ is satisfied, where TTL is a distance along the optical axis from an object-side surface of the first lens to the imaging surface, and IMG HT is one half of a diagonal length of the imaging surface.

Either one or both of $v1-v3<45$ and $v1-v5<45$ may be satisfied, where v1 is the Abbe number of the first lens, v3 is the Abbe number of the third lens, and v5 is an Abbe number of the fifth lens.

$35<v3+v5<45$ may be satisfied.

$0<f1/f<30$ may be satisfied, where f1 is a focal length of the first lens, and f is a total focal length of the optical imaging system.

$0<f2/f<3$ may be satisfied, where f2 is a focal length of the second lens, and f is a total focal length of the optical imaging system.

$-3<f3/f<0$ may be satisfied, where f3 is a focal length of the third lens, and f is a total focal length of the optical imaging system.

$0.4<|f12/f3|<0.6$ may be satisfied, where f12 is a composite focal length of the first lens and the second lens, and f3 is a focal length of the third lens.

$4.5<f1/f2<21$ may be satisfied, where f1 is a focal length of the first lens, and f2 is a focal length of the second lens.

$0.4<|f2/f3|<0.7$ may be satisfied, where f2 is a focal length of the second lens.

$0.09<|f3/f1|<0.32$ may be satisfied, where f1 is a focal length of the first lens.

$TTL/f<1.5$ and $BFL/f<0.5$ may be satisfied, where BFL is a distance along the optical axis from an image-side surface of the ninth lens to the imaging surface, and f is a total focal length of the optical imaging system.

$Fno\leq 1.69$ may be satisfied, where Fno is an F-number of the optical imaging system.

$FOV\times IMG\ HT/f>60°$ may be satisfied, where FOV is a field of view of the optical imaging system, and f is a total focal length of the optical imaging system.

Either one or both of $SWA11<25°$ and $SWA21<36°$ may be satisfied, where SWA11 is a sweep angle at an end of an effective diameter of the object-side surface of the first lens, and SWA21 is a sweep angle at an end of an effective diameter of an object-side surface of the second lens.

Each of the first lens to the sixth lens may have a convex object-side surface in a paraxial region thereof and a concave image-side surface in a paraxial region thereof.

A sum of the Abbe number of the third lens and an Abbe number of the fifth lens may be less than an Abbe number of the fourth lens.

The ninth lens may have a negative refractive power, a convex object-side surface in a paraxial region thereof, and a concave image-side surface in a paraxial region thereof.

Each of the first lens and the second lens may have an Abbe number greater than 54 and less than 57, and the third lens may have an Abbe number greater than 18 and less than 24.

The fifth lens may have a refractive index greater than 1.64 and an Abbe number less than 21.

Two of the fifth to seventh lenses may have a refractive index greater than 1.61 and an Abbe number less than 26.

An Abbe number of the seventh lens may be less than an Abbe number of the eighth lens and may be less than an Abbe number of the ninth lens.

A focal length of the second lens may be less than an absolute value of a focal length of the third lens, and the absolute value of the focal length of the third lens may be less than a focal length of the first lens.

The optical imaging system may have a field of view greater than 80° and less than 85°.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative sizes, proportions, and depictions of elements in the drawings may be exaggerated for clarity, illustration, and convenience.

DETAILED DESCRIPTION

Figure 1:
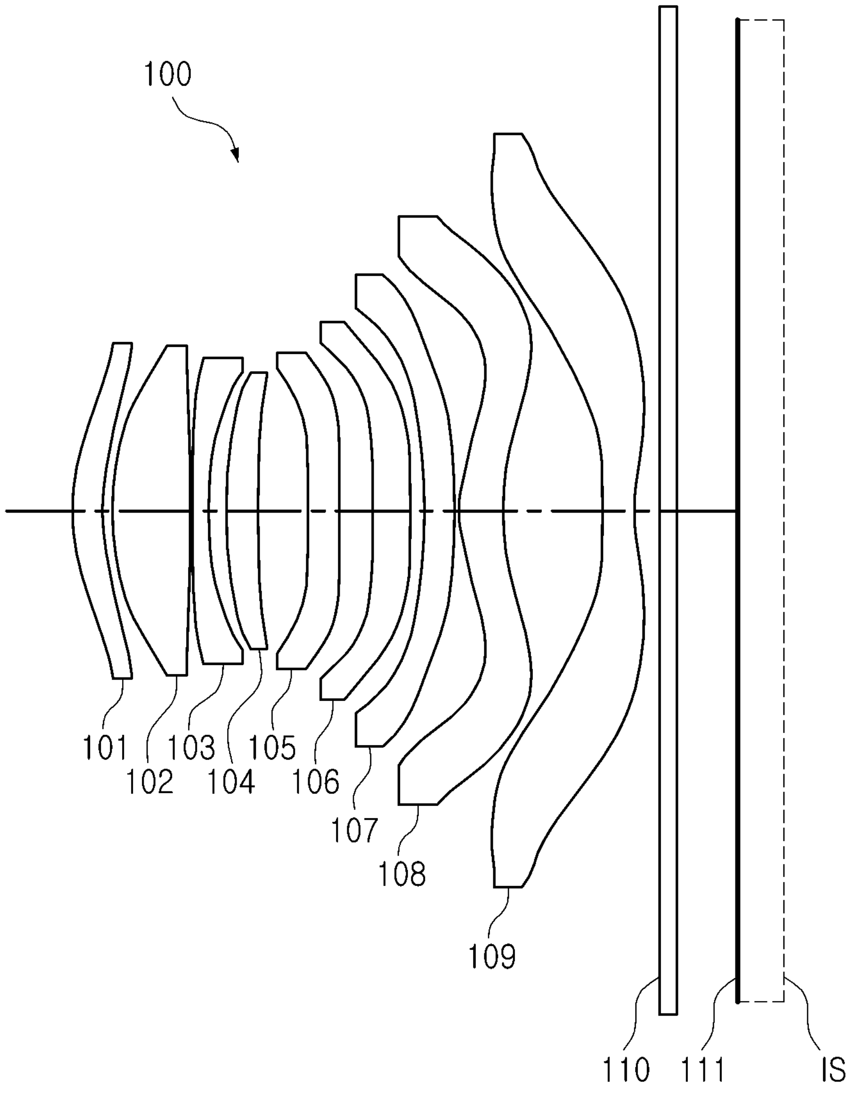
FIG. 1 is a structural view of an optical imaging system according to a first embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

In the drawings, the thicknesses, sizes, and shapes of the lenses may be exaggerated for illustrative purposes. In particular, shapes of spherical or aspherical surfaces illustrated in the drawings are only presented as examples, and are not limited thereto.

An optical imaging system according to an embodiment of the present disclosure includes nine lenses.

A first lens refers to a lens closest to an object side of the optical imaging system, and a ninth lens refers to a lens closest to an imaging surface (or an image sensor) of the optical imaging system.

Additionally, in each lens, a first surface (or an object-side surface) denotes a surface closest to the object side of the optical imaging system, and a second surface or an image-side surface) denotes a surface closest to the imaging surface of the optical imaging surface.

Additionally, in the one or more embodiments of an optical imaging system, the numerical values of the radiuses of curvature, thicknesses, distances, and focal lengths of the lenses are expressed in mm, and a field of view (FOV) of the optical imaging system is expressed in degrees (°).

Additionally, in describing the shape of each lens, a statement that a surface is convex denotes that a paraxial region of the corresponding surface is convex, and a statement that a surface is concave denotes that a paraxial region of the corresponding surface is concave.

Therefore, even if one surface of the lens is described as having a convex shape, an edge portion of the surface may be concave. Similarly, even if one surface of the lens is described as having a concave shape, an edge portion of the surface may be convex.

A paraxial region of a lens surface is a central portion of the lens surface surrounding the optical axis of the lens surface in which light rays incident to the lens surface make a small angle θ to the optical axis, and the approximations sin θ≈θ, tan θ≈θ, and cos θ≈1 are valid.

The imaging surface may refer to a virtual surface on which a focus is formed by the optical imaging system. Alternatively, the imaging surface may refer to one surface of an image sensor on which light is received through the optical imaging system.

The optical imaging system according to an embodiment of the present disclosure includes at least nine lenses.

For example, the optical imaging system according to an embodiment of the present disclosure includes a first lens, a second lens, a third lens, a fourth lens, a fifth lens, a sixth lens, a seventh lens, an eighth lens, and a ninth lens sequentially disposed in ascending numerical order along an optical axis of the optical imaging system from the object side of the optical imaging system toward the imaging surface of the optical imaging system. Adjacent lenses among the first lens to the ninth lens are spaced apart from each other by a predetermined distance along the optical axis.

The optical imaging system according to an embodiment of the present disclosure may further include an image sensor that converts an image of an incident subject into an electrical signal.

Additionally, the optical imaging system may further include an infrared blocking filter (hereinafter referred to as a filter) that blocks infrared rays. The filter may be disposed between the ninth lens and the imaging surface.

Additionally, the optical imaging system may further include an aperture that adjusts an amount of light that reaches the imaging surface.

The first lens to the ninth lens forming the optical imaging system according to an embodiment of the present disclosure may be made of a plastic material.

Additionally, at least one lens among the first lens to the ninth lens has an aspherical surface. For example, each of the first lens to the ninth lens may have at least one aspherical surface.

That is, either one or both of each of the first and second surfaces of the first lens to the ninth lens may be aspherical surfaces. The aspherical surfaces of the first lens to the ninth lens are represented by Equation 1 below.

$$Z = \frac{cY^2}{1+\sqrt{1-(1+K)c^2Y^2}} + AY^4 + BY^6 + CY^8 + DY^{10} + EY^{12} + FY^{14} + GY^{16} + HY^{18} + JY^{20} + LY^{22} + MY^{24} + NY^{26} + OY^{28} + PY^{30} \quad (1)$$

In Equation 1, c is a curvature of the lens and is equal to a reciprocal of a radius of curvature of the lens surface at an optical axis of the lens surface, K is a conic constant, and Y is a distance from any point on the aspherical surface of the lens to the optical axis. In addition, constants A to H, J, and L to P are aspherical surface coefficients. Z (also known as sag) is a distance in a direction parallel to an optical axis direction between the point on the aspherical surface of the lens at the distance Y from the optical axis of the aspherical surface to a tangential plane perpendicular to the optical axis and intersecting a vertex of the aspherical surface.

The optical imaging system according to an embodiment of the present disclosure may satisfy any one or any combination of any two or more of the following conditional expressions.

$$0 < f1/f < 30 \quad \text{(Conditional Expression 1)}$$

$$0 < f2/f < 3 \quad \text{(Conditional Expression 2)}$$

$$-3 < f3/f < 0 \quad \text{(Conditional Expression 3)}$$

$$-1 < f4/f/100 < 0.5 \quad \text{(Conditional Expression 4)}$$

$$-0.5 < f5/f/100 < 1 \quad \text{(Conditional Expression 5)}$$

$$-2 < f6/f/100 < 1.5 \quad \text{(Conditional Expression 6)}$$

$$-0.5 < f7/f/15 \quad \text{(Conditional Expression 7)}$$

$$-1 < f8/f/100 < 0.5 \quad \text{(Conditional Expression 8)}$$

$$-3 < f9/f < 0 \quad \text{(Conditional Expression 9)}$$

$$v1 - v3 < 45 \quad \text{(Conditional Expression 10)}$$

$$v1 - v5 < 45 \quad \text{(Conditional Expression 11)}$$

$$TTL/f < 1.5 \quad \text{(Conditional Expression 12)}$$

$$BFL/f < 0.5 \quad \text{(Conditional Expression 13)}$$

$$TTL/(2 \times IMG\ HT) < 0.7 \quad \text{(Conditional Expression 14)}$$

$$FOV \times IMG\ HT/f > 60° \quad \text{(Conditional Expression 15)}$$

$$Fno \leq 1.69 \quad \text{(Conditional Expression 16)}$$

$$SWA11 < 25° \quad \text{(Conditional Expression 17)}$$

-continued $$SWA21 < 36°$$ (Conditional Expression 18)

$$Nv26 \leq 3$$ (Conditional Expression 19)

$$35 < v3 + v5 < 45$$ (Conditional Expression 20)

$$4.5 < f1/f2 < 21$$ (Conditional Expression 21)

$$0.4 < |f12/f3| < 0.6$$ (Conditional Expression 22)

$$0.4 < |f2/f3| < 0.7$$ (Conditional Expression 23)

$$0.09 < |f3/f1| < 0.32$$ (Conditional Expression 24)

In the conditional expressions, f1 is a focal length of the first lens, f2 is a focal length of the second lens, f3 is a focal length of the third lens, f4 is a focal length of the fourth lens, f5 is a focal length of the fifth lens, f6 is a focal length of the sixth lens, f7 is a focal length of the seventh lens, f8 is a focal length of the eighth lens, f9 is a focal length of the ninth lens, f12 is a combined focal length of the first and second lenses, and f is a total focal length of the optical imaging system.

v1 is an Abbe number of the first lens, v3 is an Abbe number of the third lens, and v5 is an Abbe number of the fifth lens.

Nv26 is a number of lenses having an Abbe number less than 26.

TTL is a distance along the optical axis from an object-side surface of the first lens to the imaging surface, BFL is a distance along the optical axis from an image-side surface of the ninth lens to the imaging surface, and IMG HT is one half of a diagonal length of the imaging surface.

FOV is a field of view of the optical imaging system, and Fno is an F-number of the optical imaging system.

SWA11 is a sweep angle at an end of an effective diameter of an object-side surface of the first lens, and SWA21 is a sweep angle at an end of an effective diameter of the object-side surface of the second lens.

Figure 31:
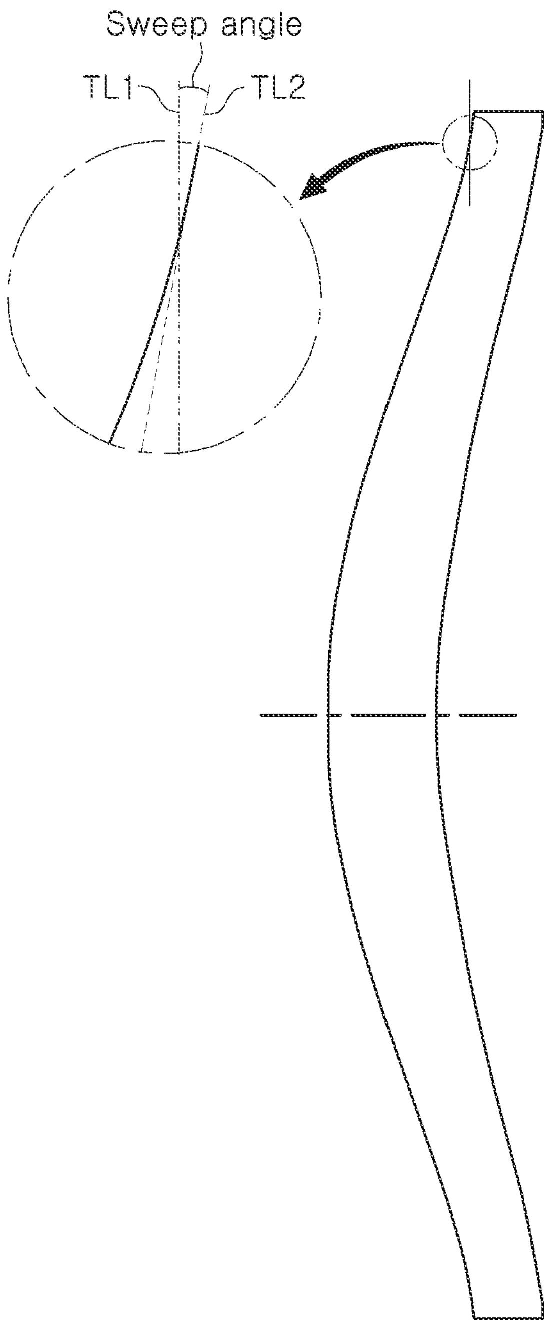
FIG. 31 illustrates a sweep angle at a specific position of an object-side surface of a lens.

Referring to FIG. 31, a sweep angle at a specific position of an object-side surface of a lens may be defined as an angle between a tangent line TL1 at a vertex of the object-side surface of the lens and a tangent line TL2 at the specific position, or between a straight line TL1 perpendicular to an optical axis of the object-side surface of the lens and the tangent line TL2 at the specific position. The vertex of the object-side surface of the lens may be a point at which the object-side surface of the lens meets the optical axis of the object-side surface of the lens.

For example, the sweep angle SWA11 at the end of the effective diameter of the object-side surface of the first lens may be defined as an angle between a tangent line at a vertex of the object-side surface of the first lens and a tangent line at an end of the effective diameter of the object-side surface of the first lens. The sweep angle SWA21 at the end of the effective diameter of the object-side surface of the second lens may be defined as an angle between a tangent line at a vertex of the object-side surface of the second lens and a tangent line at the end of the effective diameter of the object-side surface of the second lens.

The first lens has a positive refractive power. Additionally, the first lens may have a meniscus shape convex toward the object side. In addition, a first surface of the first lens may be convex in the paraxial region, and a second surface of the first lens may be concave in the paraxial region.

The second lens has a positive refractive power. Additionally, the second lens may have a meniscus shape convex toward the object side. In addition, a first surface of the second lens may be convex in the paraxial region, and a second surface of the second lens may be concave in the paraxial region.

The third lens has a negative refractive power. Additionally, the third lens may have a meniscus shape convex toward the object side. In addition, a first surface of the third lens may be convex in the paraxial region, and a second surface of the third lens may be concave in the paraxial region.

The fourth lens has a negative refractive power or a positive refractive power. Additionally, the fourth lens may have a meniscus shape convex toward the object side. In addition, a first surface of the fourth lens may be convex in the paraxial region, and a second surface of the fourth lens may be concave in the paraxial region.

The fifth lens has a negative refractive power or a positive refractive power. Additionally, the fifth lens may have a meniscus shape convex toward the object side. In addition, a first surface of the fifth lens may be convex in the paraxial region, and a second surface of the fifth lens may be concave in the paraxial region.

The sixth lens has a negative refractive power or a positive refractive power. Additionally, the sixth lens may have a meniscus shape convex toward the object side. In addition, a first surface of the sixth lens may be convex in the paraxial region, and a second surface of the sixth lens may be concave in the paraxial region.

The seventh lens has a negative refractive power or a positive refractive power. Additionally, the seventh lens may have a meniscus shape convex toward the image side. In addition, a first surface of the seventh lens may be concave in the paraxial region, and a second surface of the seventh lens may be convex in the paraxial region. Alternatively, the seventh lens may have a shape in which both surfaces are convex. In addition, the first and second surfaces of the seventh lens may be convex in the paraxial region.

The eighth lens has a negative refractive power or a positive refractive power. Additionally, the eighth lens may have a meniscus shape convex toward the object side. In addition, a first surface of the eighth lens may be convex in the paraxial region and a second surface of the eighth lens may be concave in the paraxial region. Alternatively, the eighth lens may have a meniscus shape convex toward the image side. In addition, the first surface of the eighth lens may be concave in the paraxial region, and the second surface of the eighth lens may be convex in the paraxial region.

The ninth lens has a negative refractive power. Additionally, the ninth lens may have a meniscus shape convex toward the object side. In addition, a first surface of the ninth lens may be convex in the paraxial region, and a second surface of the ninth lens may be concave in the paraxial region.

Additionally, at least one lens among the fifth to ninth lenses may have at least one inflection point formed on either one or both of the first surface and the second surface. For example, the first surface of the fifth lens may be convex in the paraxial region and concave in a peripheral region outside the paraxial region. The second surface of the fifth lens may be concave in the paraxial region and convex in a peripheral region outside the paraxial region.

Each of the first lens and the second lens may have an Abbe number greater than 54 and less than 57. Furthermore, the third lens may have an Abbe number greater than 18 and less than 24.

An Abbe number of the fourth lens may be greater than an Abbe number of the third lens. Additionally, a sum of the Abbe number of the third lens and the Abbe number of the fifth lens may be less than the Abbe number of the fourth lens.

The fifth lens may have a refractive index greater than 1.64 and an Abbe number less than 21.

Two of the fifth to seventh lenses may have a refractive index greater than 1.61 and an Abbe number less than 26.

An Abbe number of the seventh lens may be less than an Abbe number of the eighth lens and less than an Abbe number of the ninth lens.

A focal length of the second lens may be less than an absolute value of a focal length of the third lens, and the absolute value of the focal length of the third lens may be less than a focal length of the first lens.

An optical imaging system according to an embodiment of the present disclosure may be configured to have a field of view greater than 80°. In an embodiment, the field of view of the optical imaging system may be less than 85°.

Figure 2:
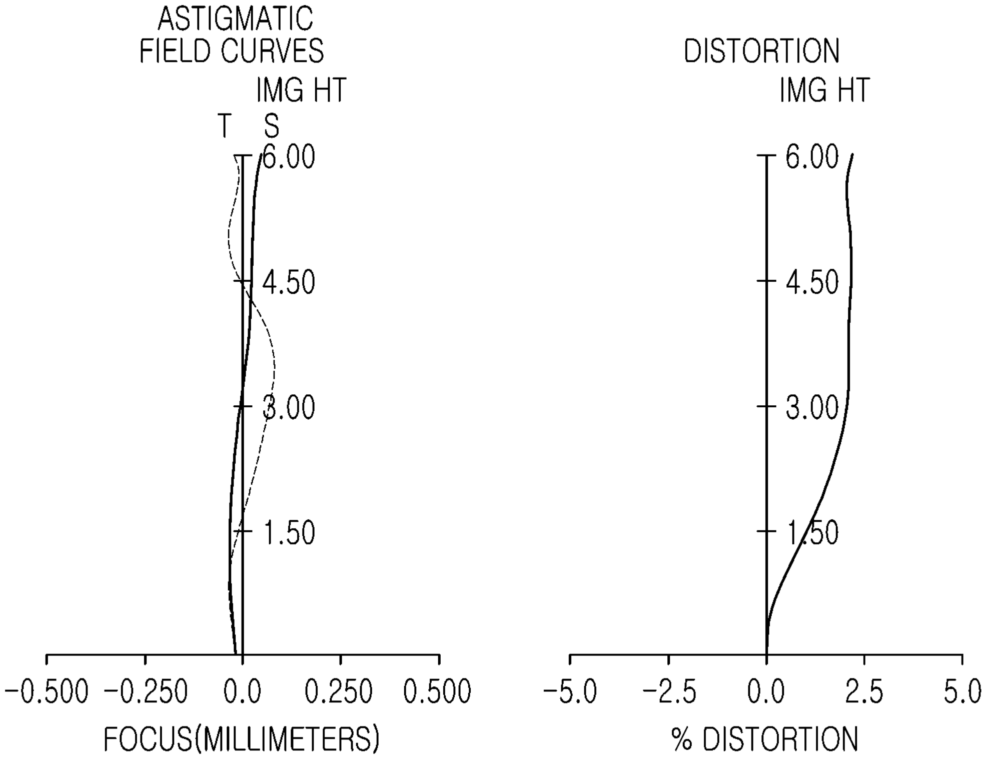
FIG. 2 is a view illustrating aberration characteristics of the optical imaging system illustrated in FIG. 1.

FIG. 1 is a structural view of an optical imaging system according to a first embodiment of the present disclosure, and FIG. 2 is a view illustrating aberration characteristics of the optical imaging system illustrated in FIG. 1.

Referring to FIG. 1, an optical imaging system 100 according to the first embodiment of the present disclosure includes a first lens 101, a second lens 102, a third lens 103, a fourth lens 104, a fifth lens 105, a sixth lens 106, a seventh lens 107, an eighth lens 108, and a ninth lens 109, and may further include a filter 110 and an image sensor IS.

The optical imaging system 100 according to the first embodiment of the present disclosure may form a focus on an imaging surface 111. The imaging surface 111 may denote a surface on which a focus is formed by the optical imaging system. In an example, the imaging surface 111 may denote one surface of the image sensor IS on which light is received.

The lens characteristics (a radius of curvature, a lens thickness, a distance between lenses, an index of refraction, an Abbe number, and a focal length) of each lens are illustrated in Table 1 below.

TABLE 1

| Surface Number | Element | Radius of Curvature | Thickness or Distance | Index of Refraction | Abbe Number | Focal Length |
|---|---|---|---|---|---|---|
| S1 | First | 3.110 | 0.374 | 1.544 | 55.99 | 37.06 |
| S2 | Lens | 3.519 | 0.111 | | | |
| S3 | Second | 3.338 | 0.949 | 1.544 | 55.99 | 6.36 |
| S4 | Lens | 75.139 | 0.033 | | | |
| S5 | Third | 16.743 | 0.210 | 1.639 | 23.49 | −9.72 |
| S6 | Lens | 4.541 | 0.226 | | | |
| S7 | Fourth | 5.762 | 0.388 | 1.544 | 55.99 | 21.7 |
| S8 | Lens | 10.941 | 0.609 | | | |
| S9 | Fifth | 51.940 | 0.401 | 1.671 | 19.24 | −52.34 |
| S10 | Lens | 21.033 | 0.402 | | | |
| S11 | Sixth | 39.872 | 0.480 | 1.544 | 55.99 | −66.59 |
| S12 | Lens | 18.943 | 0.163 | | | |
| S13 | Seventh | −6.448 | 0.380 | 1.614 | 25.94 | −90.53 |
| S14 | Lens | −7.449 | 0.060 | | | |
| S15 | Eighth | 2.156 | 0.538 | 1.544 | 55.99 | 7.89 |
| S16 | Lens | 3.937 | 1.228 | | | |
| S17 | Ninth | 32.913 | 0.400 | 1.535 | 55.74 | −5.95 |
| S18 | Lens | 2.900 | 0.306 | | | |
| S19 | Filter | Infinity | 0.210 | 1.517 | 64.20 | |
| S20 | | Infinity | 0.775 | | | |
| S21 | Imaging Surface | Infinity | | | | |

A total focal length f of the optical imaging system 100 according to the first embodiment of the present disclosure is 6.8357 mm, Fno is 1.59, IMG HT is 6 mm, FOV is 80.8°, SWA11 is 19.045°, SWA21 is 33.395°, and f12 is 5.671 mm.

In the first embodiment of the present disclosure, the first lens 101 has a positive refractive power, a first surface of the first lens 101 is convex in the paraxial region, and the second surface of the first lens 101 is concave in the paraxial region.

The second lens 102 has a positive refractive power, a first surface of the second lens 102 is convex in the paraxial region, and a second surface of the second lens 102 is concave in the paraxial region.

The third lens 103 has a negative refractive power, a first surface of the third lens 103 is convex in the paraxial region, and a second surface of the third lens 103 is concave in the paraxial region.

The fourth lens 104 has a positive refractive power, a first surface of the fourth lens 104 is convex in the paraxial region, and a second surface of the fourth lens 104 is concave in the paraxial region.

The fifth lens 105 has a negative refractive power, a first surface of the fifth lens 105 is convex in the paraxial region, and a second surface of the fifth lens 105 is concave in the paraxial region.

The sixth lens 106 has a negative refractive power, a first surface of the sixth lens 106 is convex in the paraxial region, and a second surface of the sixth lens 106 is concave in the paraxial region.

The seventh lens 107 has a negative refractive power, a first surface of the seventh lens 107 is concave in the paraxial region, and a second surface of the seventh lens 107 is convex in the paraxial region.

The eighth lens 108 has a positive refractive power, a first surface of the eighth lens 108 is convex in the paraxial region, and a second surface of the eighth lens 108 is concave in the paraxial region.

The ninth lens 109 has a negative refractive power, a first surface of the ninth lens 109 is convex in the paraxial region, and a second surface of the ninth lens 109 is concave in the paraxial region.

Additionally, one or more of the fifth lens 105 to the ninth lens 109 has at least one inflection point formed on either one or both of the first surface and the second surface thereof.

Each surface of the first lens 101 to the ninth lens 109 has aspherical coefficients as illustrated in Table 2 below. For example, both an object-side surface and an image-side surface of each of the first lens 101 to the ninth lens 109 are aspherical surfaces.

TABLE 2

| | S1 | S2 | S3 | S4 | S5 | S6 |
|---|---|---|---|---|---|---|
| Conic Constant (K) | −5.517 | −12.092 | −4.259 | 99.000 | 20.052 | 4.565 |
| Fourth Coefficient (A) | 1.933E−02 | 1.397E−02 | −2.160E−03 | 4.518E−02 | 3.735E−02 | 6.053E−03 |
| Sixth Coefficient (B) | −3.085E−02 | −4.567E−02 | 1.093E−03 | −2.702E−01 | −2.608E−01 | −1.387E−01 |
| Eighth Coefficient (C) | 6.061E−02 | 1.079E−01 | −8.651E−03 | 7.191E−01 | 7.711E−01 | 5.715E−01 |
| Tenth Coefficient (D) | −9.012E−02 | −1.882E−01 | 4.058E−02 | −1.197E+00 | −1.430E+00 | −1.469E+00 |
| Twelfth Coefficient (E) | 9.244E−02 | 2.266E−01 | −8.070E−02 | 1.352E+00 | 1.814E+00 | 2.542E+00 |
| Fourteenth Coefficient (F) | −6.691E−02 | −1.899E−01 | 9.668E−02 | −1.077E+00 | −1.632E+00 | −3.073E+00 |
| Sixteenth Coefficient (G) | 3.473E−02 | 1.132E−01 | −7.649E−02 | 6.190E−01 | 1.064E+00 | 2.656E+00 |
| Eighteenth Coefficient (H) | −1.303E−02 | −4.860E−02 | 4.166E−02 | −2.594E−01 | −5.069E−01 | −1.659E+00 |
| Twentieth Coefficient (J) | 3.526E−03 | 1.508E−02 | −1.590E−02 | 7.928E−02 | 1.766E−01 | 7.502E−01 |
| Twenty-Second Coefficient (L) | −6.799E−04 | −3.351E−03 | 4.248E−03 | −1.746E−02 | −4.441E−02 | −2.429E−01 |
| Twenty-Fourth Coefficient (M) | 9.075E−05 | 5.199E−04 | −7.795E−04 | 2.697E−03 | 7.846E−03 | 5.487E−02 |
| Twenty-Sixth Coefficient (N) | −7.927E−06 | −5.349E−05 | 9.363E−05 | −2.768E−04 | −9.231E−04 | −8.209E−03 |
| Twenty-Eighth Coefficient (O) | 4.050E−07 | 3.279E−06 | −6.632E−06 | 1.694E−05 | 6.490E−05 | 7.306E−04 |
| Thirtieth Coefficient (P) | −9.087E−09 | −9.062E−08 | 2.101E−07 | −4.671E−07 | −2.061E−06 | −2.928E−05 |
| | **S7** | **S8** | **S9** | **S10** | **S11** | **S12** |
| Conic Constant (K) | −8.237 | −64.854 | −99.000 | −74.600 | 56.326 | 10.586 |
| Fourth Coefficient (A) | 6.270E−04 | −7.096E−03 | −2.960E−02 | −3.370E−02 | −6.276E−02 | −9.275E−02 |
| Sixth Coefficient (B) | −2.500E−02 | 3.036E−02 | 8.598E−04 | 1.322E−02 | 2.811E−02 | 3.620E−02 |
| Eighth Coefficient (C) | 8.655E−02 | −1.314E−01 | −1.213E−02 | −2.175E−02 | 1.989E−02 | −2.576E−03 |
| Tenth Coefficient (D) | −2.104E−01 | 3.452E−01 | 6.403E−02 | 4.314E−02 | −7.486E−02 | −1.521E−02 |
| Twelfth Coefficient (E) | 3.705E−01 | −6.140E−01 | −1.705E−01 | −7.246E−02 | 1.075E−01 | 2.160E−02 |
| Fourteenth Coefficient (F) | −4.723E−01 | 7.734E−01 | 2.710E−01 | 8.448E−02 | −1.015E−01 | −1.850E−02 |
| Sixteenth Coefficient (G) | 4.370E−01 | −7.059E−01 | −2.839E−01 | −6.799E−02 | 6.806E−02 | 1.056E−02 |
| Eighteenth Coefficient (H) | −2.933E−01 | 4.714E−01 | 2.058E−01 | 3.854E−02 | −3.309E−02 | −4.114E−03 |
| Twentieth Coefficient (J) | 1.420E−01 | −2.302E−01 | −1.052E−01 | −1.556E−02 | 1.170E−02 | 1.106E−03 |
| Twenty-Second Coefficient (L) | −4.898E−02 | 8.115E−02 | 3.798E−02 | 4.456E−03 | −2.975E−03 | −2.049E−04 |
| Twenty-Fourth Coefficient (M) | 1.171E−02 | −2.009E−02 | −9.480E−03 | −8.856E−04 | 5.298E−04 | 2.555E−05 |
| Twenty-Sixth Coefficient (N) | −1.841E−03 | 3.313E−03 | 1.560E−03 | 1.163E−04 | −6.263E−05 | −2.032E−06 |
| Twenty-Eighth Coefficient (O) | 1.710E−04 | −3.264E−04 | −1.524E−04 | −9.078E−06 | 4.412E−06 | 9.185E−08 |
| Thirtieth Coefficient (P) | −7.110E−06 | 1.453E−05 | 6.705E−06 | 3.196E−07 | −1.400E−07 | −1.755E−09 |
| | **S13** | **S14** | **S15** | **S16** | **S17** | **S18** |
| Conic Constant (K) | 3.384 | 2.029 | −7.436 | −13.027 | 24.864 | −13.487 |
| Fourth Coefficient (A) | 5.179E−02 | 3.583E−03 | 2.902E−03 | 3.067E−02 | −9.969E−02 | −5.050E−02 |

TABLE 2-continued

| | | | | | | |
|---|---|---|---|---|---|---|
| Sixth Coefficient (B) | −6.312E−02 | 3.551E−03 | −3.912E−03 | −1.869E−02 | 4.168E−02 | 1.934E−02 |
| Eighth Coefficient (C) | 5.710E−02 | −1.512E−02 | −8.030E−03 | 3.714E−03 | −1.419E−02 | −6.175E−03 |
| Tenth Coefficient (D) | −4.232E−02 | 1.856E−02 | 9.321E−03 | 6.853E−04 | 3.807E−03 | 1.538E−03 |
| Twelfth Coefficient (E) | 2.845E−02 | −1.277E−02 | −5.497E−03 | −7.614E−04 | −7.331E−04 | −2.929E−04 |
| Fourteenth Coefficient (F) | −1.715E−02 | 5.554E−03 | 2.082E−03 | 2.757E−04 | 9.751E−05 | 4.239E−05 |
| Sixteenth Coefficient (G) | 8.223E−03 | −1.628E−03 | −5.427E−04 | −6.057E−05 | −8.838E−06 | −4.670E−06 |
| Eighteenth Coefficient (H) | −2.901E−03 | 3.330E−04 | 1.000E−04 | 8.955E−06 | 5.329E−07 | 3.917E−07 |
| Twentieth Coefficient (J) | 7.334E−04 | −4.828E−05 | −1.308E−05 | −9.169E−07 | −1.975E−08 | −2.476E−08 |
| Twenty-Second Coefficient (L) | −1.310E−04 | 4.946E−06 | 1.197E−06 | 6.489E−08 | 3.144E−10 | 1.153E−09 |
| Twenty-Fourth Coefficient (M) | 1.617E−05 | −3.499E−07 | −7.415E−08 | −3.091E−09 | 6.957E−12 | −3.808E−11 |
| Twenty-Sixth Coefficient (N) | −1.314E−06 | 1.624E−08 | 2.921E−09 | 9.344E−11 | −4.755E−13 | 8.394E−13 |
| Twenty-Eighth Coefficient (O) | 6.345E−08 | −4.439E−10 | −6.465E−11 | −1.584E−12 | 9.821E−15 | −1.102E−14 |
| Thirtieth Coefficient (P) | −1.380E−09 | 5.392E−12 | 5.888E−13 | 1.100E−14 | −7.627E−17 | 6.493E−17 |

Additionally, the optical imaging system 100 configured as described above may have the aberration characteristics illustrated in FIG. 2.

Figure 3:
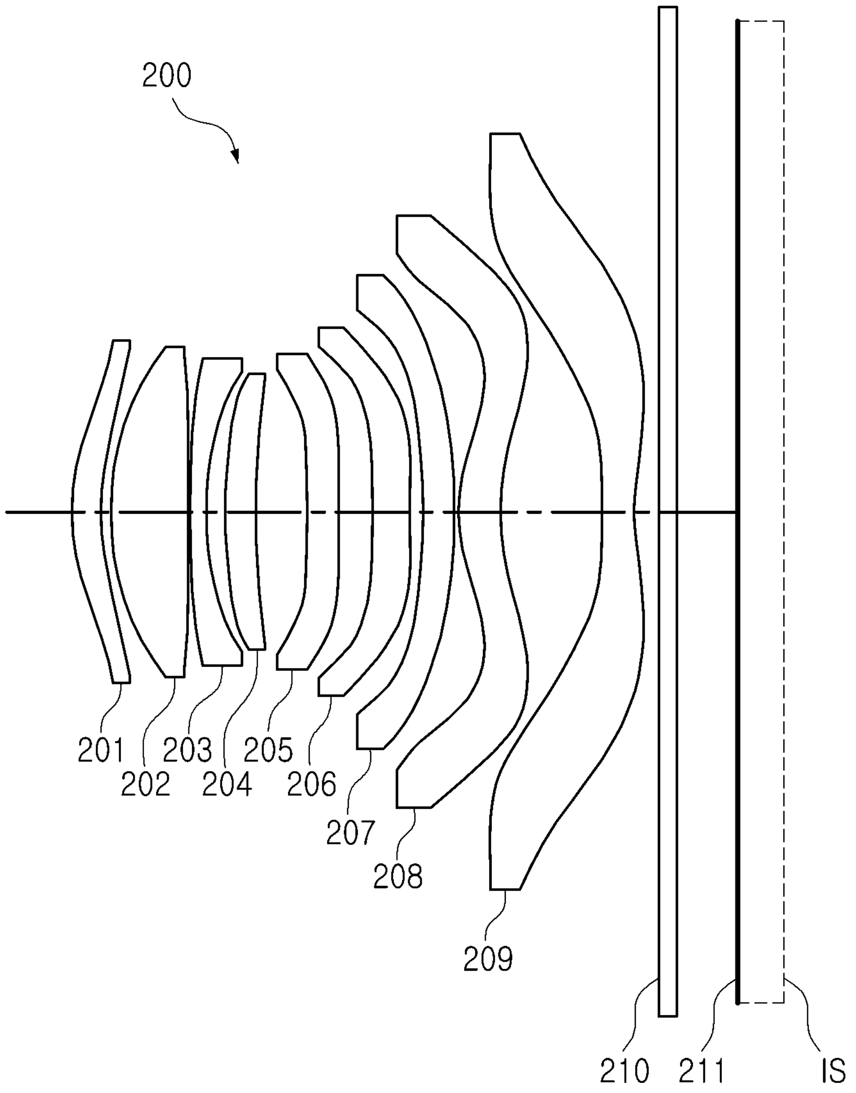
FIG. 3 is a structural view of an optical imaging system according to a second embodiment of the present disclosure.
Figure 4:
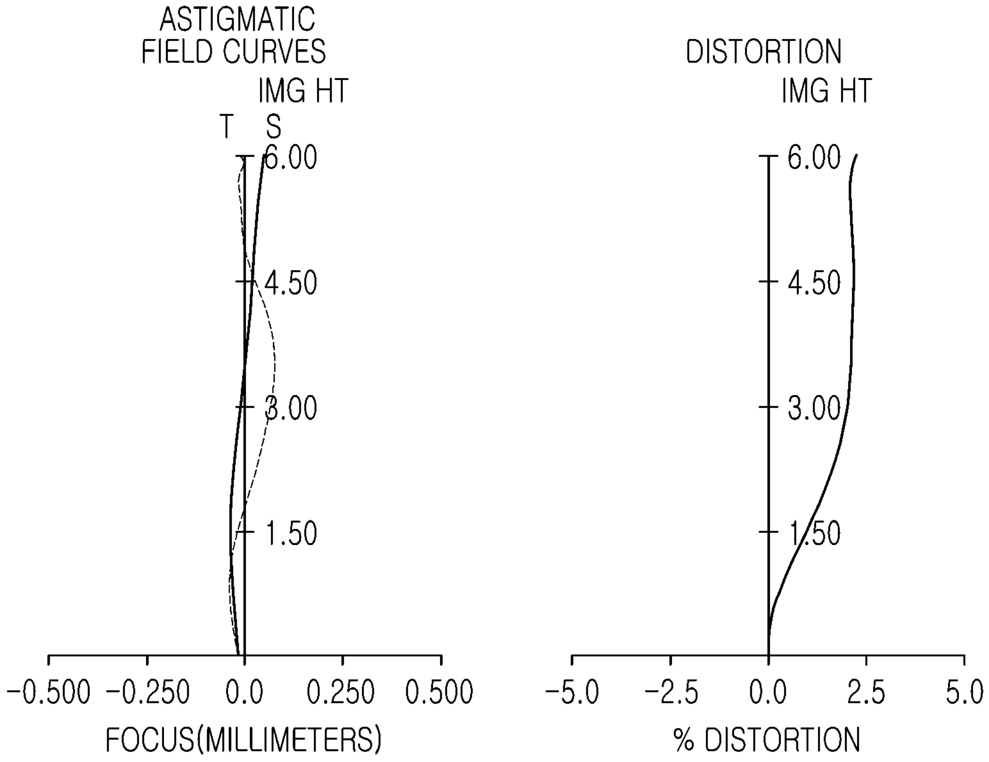
FIG. 4 is a view illustrating aberration characteristics of the optical imaging system illustrated in FIG. 3.

FIG. 3 is a structural view of an optical imaging system according to a second embodiment of the present disclosure, and FIG. 4 is a view illustrating aberration characteristics of the optical imaging system illustrated in FIG. 3.

Referring to FIG. 3, an optical imaging system 200 according to the second embodiment of the present disclosure includes a first lens 201, a second lens 202, a third lens 203, a fourth lens 204, a fifth lens 205, a sixth lens 206, a seventh lens 207, an eighth lens 208, and a ninth lens 209, and may further include a filter 210 and an image sensor IS.

The optical imaging system 200 according to a second embodiment of the present disclosure may form a focus on an imaging surface 211. The imaging surface 211 may denote a surface on which a focus is formed by the optical imaging system. In an example, the imaging surface 211 may denote one surface of the image sensor IS on which light is received.

The lens characteristics (a radius of curvature, a lens thickness, a distance between lenses, an index of refraction, an Abbe number, and a focal length) of each lens are illustrated in Table 3 below.

TABLE 3

| Surface Number | Element | Radius of Curvature | Thickness or Distance | Index of Refraction | Abbe Number | Focal Length |
|---|---|---|---|---|---|---|
| S1 | First | 3.111 | 0.360 | 1.544 | 55.99 | 33.0131 |
| S2 | Lens | 3.605 | 0.120 | | | |
| S3 | Second | 3.415 | 0.947 | 1.544 | 55.99 | 6.5329 |
| S4 | Lens | 71.440 | 0.031 | | | |
| S5 | Third | 16.549 | 0.210 | 1.639 | 23.49 | −9.7654 |
| S6 | Lens | 4.542 | 0.218 | | | |
| S7 | Fourth | 5.828 | 0.396 | 1.544 | 55.99 | 21.461 |
| S8 | Lens | 11.311 | 0.616 | | | |
| S9 | Fifth | 53.474 | 0.397 | 1.671 | 19.24 | −49.099 |
| S10 | Lens | 20.472 | 0.408 | | | |
| S11 | Sixth | 51.314 | 0.480 | 1.544 | 55.99 | −49.6532 |
| S12 | Lens | 17.687 | 0.160 | | | |
| S13 | Seventh | −6.868 | 0.380 | 1.614 | 25.94 | 397.9142 |
| S14 | Lens | −6.824 | 0.060 | | | |
| S15 | Eighth | 2.211 | 0.526 | 1.544 | 55.99 | 8.3442 |
| S16 | Lens | 3.931 | 1.246 | | | |
| S17 | Ninth | 32.726 | 0.400 | 1.535 | 55.74 | −5.8621 |
| S18 | Lens | 2.860 | 0.306 | | | |
| S19 | Filter | Infinity | 0.210 | 1.517 | 64.20 | |
| S20 | | Infinity | 0.750 | | | |
| S21 | Imaging Surface | Infinity | | | | |

A total focal length f of the optical imaging system 200 according to the second embodiment of the present disclosure is 6.8353 mm, Fno is 1.59, IMG HT is 6 mm, FOV is 80.5°, SWA11 is 19.011°, SWA21 is 32.83°, and f12 is 5.684 mm.

In the second embodiment of the present disclosure, the first lens 201 has a positive refractive power, a first surface of the first lens 201 is convex in the paraxial region, and a second surface of the first lens 201 is concave in the paraxial region.

The second lens 202 has a positive refractive power, a first surface of the second lens 202 is convex in the paraxial region, and a second surface of the second lens 202 is concave in the paraxial region.

The third lens 203 has a negative refractive power, a first surface of the third lens 203 is convex in the paraxial region, and a second surface of the third lens 203 is concave in the paraxial region.

The fourth lens 204 has a positive refractive power, a first surface of the fourth lens 204 is convex in the paraxial region, and a second surface of the fourth lens 204 is concave in the paraxial region.

The fifth lens 205 has a negative refractive power, a first surface of the fifth lens 205 is convex in the paraxial region, and the second surface of the fifth lens 205 is concave in the paraxial region.

The sixth lens 206 has a negative refractive power, a first surface of the sixth lens 206 is convex in the paraxial region, and a second surface of the sixth lens 206 is concave in the paraxial region.

The seventh lens 207 has a positive refractive power, a first surface of the seventh lens 207 is concave in the paraxial region, and a second surface of the seventh lens 207 is convex in the paraxial region.

The eighth lens 208 has a positive refractive power, a first surface of the eighth lens 208 is convex in the paraxial region, and a second surface of the eighth lens 208 is concave in the paraxial region.

The ninth lens 209 has a negative refractive power, a first surface of the ninth lens 209 is convex in the paraxial region, and a second surface of the ninth lens 209 is concave in the paraxial region.

Additionally, one or more of the fifth lens 205 to the ninth lens 209 has at least one inflection point formed on either one or both of the first surface and the second surface thereof.

Each surface of the first lens 201 to the ninth lens 209 has aspherical coefficients as illustrated in Table 4 below. For example, both an object-side surface and an image-side surface of each of the first lens 201 to the ninth lens 209 are aspherical surfaces.

TABLE 4

| | S1 | S2 | S3 | S4 | S5 | S6 |
|---|---|---|---|---|---|---|
| Conic Constant (K) | −5.543 | −12.191 | −4.288 | 99.000 | 20.386 | 4.567 |
| Fourth Coefficient (A) | 1.651E−02 | 6.602E−03 | −4.429E−03 | 4.482E−02 | 3.687E−02 | 6.654E−03 |
| Sixth Coefficient (B) | −1.679E−02 | −6.928E−03 | 1.561E−02 | −2.676E−01 | −2.507E−01 | −1.415E−01 |
| Eighth Coefficient (C) | 2.552E−02 | −5.854E−04 | −4.678E−02 | 7.134E−01 | 7.258E−01 | 5.679E−01 |
| Tenth Coefficient (D) | −3.526E−02 | 2.583E−03 | 9.632E−02 | −1.197E+00 | −1.323E+00 | −1.430E+00 |
| Twelfth Coefficient (E) | 3.429E−02 | 8.181E−04 | −1.282E−01 | 1.371E+00 | 1.654E+00 | 2.435E+00 |
| Fourteenth Coefficient (F) | −2.345E−02 | −2.703E−03 | 1.178E−01 | −1.113E+00 | −1.471E+00 | −2.902E+00 |
| Sixteenth Coefficient (G) | 1.135E−02 | 1.629E−03 | −7.671E−02 | 6.546E−01 | 9.484E−01 | 2.473E+00 |
| Eighteenth Coefficient (H) | −3.889E−03 | −2.711E−04 | 3.588E−02 | −2.818E−01 | −4.474E−01 | −1.523E+00 |
| Twentieth Coefficient (J) | 9.383E−04 | −1.533E−04 | −1.207E−02 | 8.876E−02 | 1.542E−01 | 6.788E−01 |
| Twenty-Second Coefficient (L) | −1.561E−04 | 1.041E−04 | 2.893E−03 | −2.021E−02 | −3.834E−02 | −2.166E−01 |
| Twenty-Fourth Coefficient (M) | 1.713E−05 | −2.894E−05 | −4.815E−04 | 3.236E−03 | 6.689E−03 | 4.819E−02 |
| Twenty-Sixth Coefficient (N) | −1.131E−06 | 4.431E−06 | 5.284E−05 | −3.454E−04 | −7.760E−04 | −7.100E−03 |
| Twenty-Eighth Coefficient (O) | 3.612E−08 | −3.661E−07 | −3.435E−06 | 2.206E−05 | 5.371E−05 | 6.222E−04 |
| Thirtieth Coefficient (P) | −2.142E−10 | 1.282E−08 | 1.002E−07 | −6.373E−07 | −1.677E−06 | −2.455E−05 |

| | S7 | S8 | S9 | S10 | S11 | S12 |
|---|---|---|---|---|---|---|
| Conic Constant (K) | −7.809 | −60.948 | −99.000 | −62.976 | −75.590 | −18.647 |
| Fourth Coefficient (A) | −4.195E−04 | −7.097E−03 | −2.946E−02 | −3.361E−02 | −6.071E−02 | −9.348E−02 |
| Sixth Coefficient (B) | −1.922E−02 | 2.705E−02 | −6.101E−03 | 1.284E−02 | 1.309E−02 | 1.598E−02 |
| Eighth Coefficient (C) | 5.087E−02 | −1.206E−01 | 2.572E−02 | −1.998E−02 | 7.193E−02 | 4.342E−02 |
| Tenth Coefficient (D) | −8.708E−02 | 3.290E−01 | −5.090E−02 | 4.026E−02 | −1.746E−01 | −5.710E−02 |
| Twelfth Coefficient (E) | 1.083E−01 | −6.034E−01 | 5.174E−02 | −7.172E−02 | 2.326E−01 | 3.398E−02 |
| Fourteenth Coefficient (F) | −1.000E−01 | 7.802E−01 | −2.239E−02 | 8.788E−02 | −2.115E−01 | −8.479E−03 |
| Sixteenth Coefficient (G) | 6.894E−02 | −7.274E−01 | −9.651E−03 | −7.346E−02 | 1.381E−01 | −2.607E−03 |

TABLE 4-continued

| | | | | | | |
|---|---|---|---|---|---|---|
| Eighteenth Coefficient (H) | −3.497E−02 | 4.938E−01 | 2.109E−02 | 4.293E−02 | −6.567E−02 | 3.298E−03 |
| Twentieth Coefficient (J) | 1.271E−02 | −2.438E−01 | −1.538E−02 | −1.778E−02 | 2.277E−02 | −1.490E−03 |
| Twenty-Second Coefficient (L) | −3.161E−03 | 8.650E−02 | 6.681E−03 | 5.209E−03 | −5.690E−03 | 4.051E−04 |
| Twenty-Fourth Coefficient (M) | 4.961E−04 | −2.146E−02 | −1.876E−03 | −1.056E−03 | 9.969E−04 | −7.108E−05 |
| Twenty-Sixth Coefficient (N) | −4.013E−05 | 3.533E−03 | 3.364E−04 | 1.413E−04 | −1.161E−04 | 7.902E−06 |
| Twenty-Eighth Coefficient (O) | 3.647E−07 | −3.466E−04 | −3.525E−05 | −1.122E−05 | 8.070E−06 | −5.076E−07 |
| Thirtieth Coefficient (P) | 1.216E−07 | 1.533E−05 | 1.653E−06 | 4.009E−07 | −2.530E−07 | 1.436E−08 |

| | S13 | S14 | S15 | S16 | S17 | S18 |
|---|---|---|---|---|---|---|
| Conic Constant (K) | 3.935 | 0.986 | −7.142 | −12.971 | 19.688 | −14.329 |
| Fourth Coefficient (A) | 5.302E−02 | 1.676E−02 | 4.567E−03 | 2.769E−02 | −1.066E−01 | −5.198E−02 |
| Sixth Coefficient (B) | −9.232E−02 | −2.303E−02 | −7.135E−03 | −1.242E−02 | 4.982E−02 | 2.208E−02 |
| Eighth Coefficient (C) | 1.201E−01 | 2.041E−02 | −3.836E−03 | −2.528E−03 | −1.948E−02 | −7.997E−03 |
| Tenth Coefficient (D) | −1.092E−01 | −1.170E−02 | 5.951E−03 | 4.538E−03 | 5.874E−03 | 2.225E−03 |
| Twelfth Coefficient (E) | 7.080E−02 | 4.191E−03 | −3.795E−03 | −2.393E−03 | −1.250E−03 | −4.620E−04 |
| Fourteenth Coefficient (F) | −3.421E−02 | −9.569E−04 | 1.518E−03 | 7.683E−04 | 1.845E−04 | 7.142E−05 |
| Sixteenth Coefficient (G) | 1.260E−02 | 1.386E−04 | −4.182E−04 | −1.684E−04 | −1.903E−05 | −8.258E−06 |
| Eighteenth Coefficient (H) | −3.542E−03 | −1.134E−05 | 8.231E−05 | 2.618E−05 | 1.382E−06 | 7.148E−07 |
| Twentieth Coefficient (J) | 7.534E−04 | 1.262E−07 | −1.165E−05 | −2.920E−06 | −7.036E−08 | −4.596E−08 |
| Twenty-Second Coefficient (L) | −1.187E−04 | 9.112E−08 | 1.174E−06 | 2.321E−07 | 2.458E−09 | 2.154E−09 |
| Twenty-Fourth Coefficient (M) | 1.341E−05 | −1.209E−08 | −8.183E−08 | −1.283E−08 | −5.604E−11 | −7.115E−11 |
| Twenty-Sixth Coefficient (N) | −1.024E−06 | 7.985E−10 | 3.738E−09 | 4.686E−10 | 7.467E−13 | 1.564E−12 |
| Twenty-Eighth Coefficient (O) | 4.728E−08 | −2.859E−11 | −1.005E−10 | −1.015E−11 | −4.257E−15 | −2.046E−14 |
| Thirtieth Coefficient (P) | −9.956E−10 | 4.388E−13 | 1.205E−12 | 9.865E−14 | −3.334E−18 | 1.203E−16 |

Additionally, the optical imaging system 200 configured as described above may have the aberration characteristics illustrated in FIG. 4.

Figure 5:
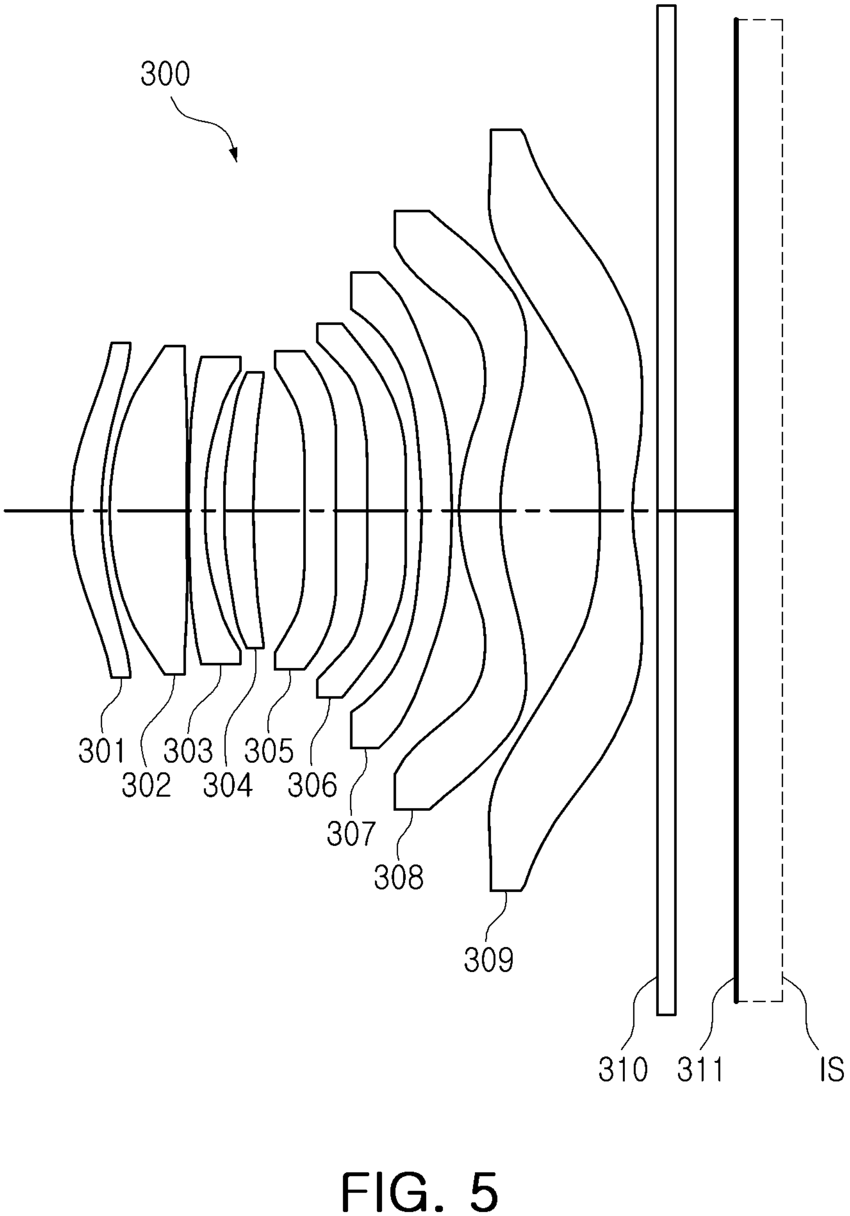
FIG. 5 is a structural view of an optical imaging system according to a third embodiment of the present disclosure.
Figure 6:
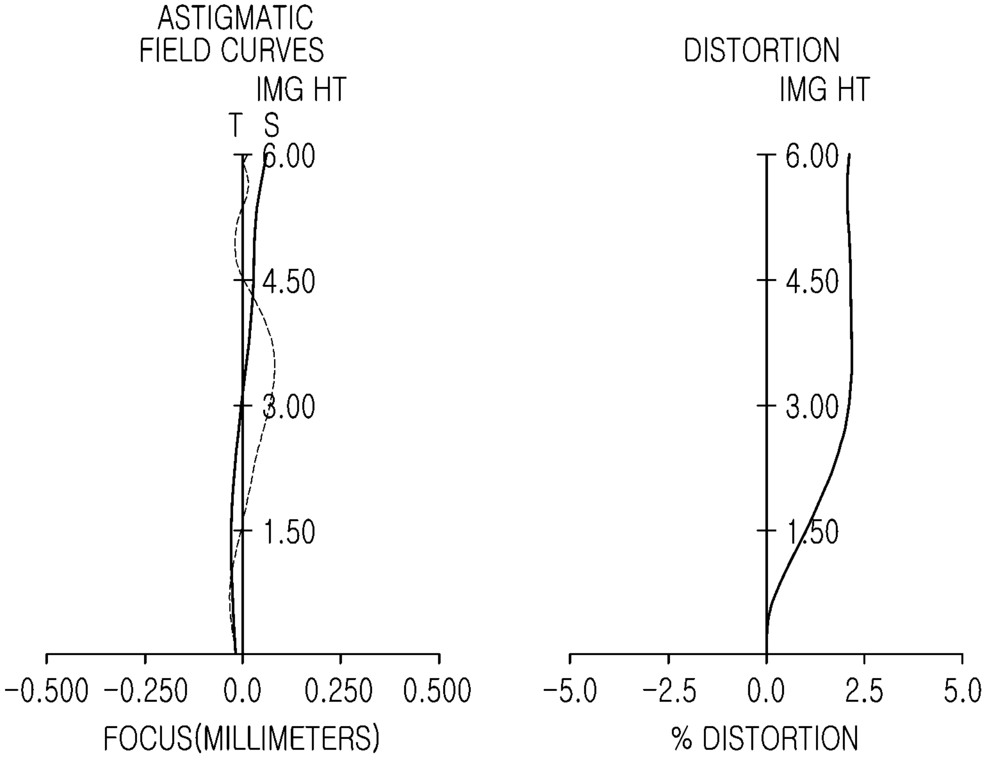
FIG. 6 is a view illustrating aberration characteristics of the optical imaging system illustrated in FIG. 5.

FIG. 5 is a structural view of an optical imaging system according to a third embodiment of the present disclosure, and FIG. 6 is a view illustrating aberration characteristics of the optical imaging system illustrated in FIG. 5.

Referring to FIG. 5, an optical imaging system 300 according to the third embodiment of the present disclosure includes a first lens 301, a second lens 302, a third lens 303, a fourth lens 304, a fifth lens 305, a sixth lens 306, a seventh lens 307, an eighth lens 308, and a ninth lens 309, and may further include a filter 310 and an image sensor IS.

The optical imaging system 300 according to the third embodiment of the present disclosure may form a focus on an imaging surface 311. The imaging surface 311 may denote a surface on which a focus is formed by the optical imaging system. In an example, the imaging surface 311 may mean one surface of the image sensor IS on which light is received.

The lens characteristics (a radius of curvature, a lens thickness, a distance between lenses, an index of refraction, an Abbe number, and a focal length) of each lens are illustrated in Table 5 below.

TABLE 5

| Surface Number | Element | Radius of Curvature | Thickness or Distance | Index of Refraction | Abbe Number | Focal Length |
|---|---|---|---|---|---|---|
| S1 | First | 3.110 | 0.373 | 1.544 | 55.99 | 39.1769 |
| S2 | Lens | 3.485 | 0.106 | | | |
| S3 | Second | 3.306 | 0.945 | 1.544 | 55.99 | 6.328 |
| S4 | Lens | 68.167 | 0.030 | | | |
| S5 | Third | 16.366 | 0.210 | 1.639 | 23.49 | −9.7961 |
| S6 | Lens | 4.538 | 0.227 | | | |
| S7 | Fourth | 5.740 | 0.386 | 1.544 | 55.99 | 22.8213 |
| S8 | Lens | 10.386 | 0.601 | | | |

TABLE 5-continued

| Surface Number | Element | Radius of Curvature | Thickness or Distance | Index of Refraction | Abbe Number | Focal Length |
|---|---|---|---|---|---|---|
| S9 | Fifth | 34.291 | 0.401 | 1.671 | 19.24 | −43.3858 |
| S10 | Lens | 15.770 | 0.379 | | | |
| S11 | Sixth | 20.037 | 0.480 | 1.544 | 55.99 | 384.5405 |
| S12 | Lens | 21.962 | 0.194 | | | |
| S13 | Seventh | −6.002 | 0.389 | 1.614 | 25.94 | −55.4949 |
| S14 | Lens | −7.450 | 0.080 | | | |
| S15 | Eighth | 2.148 | 0.509 | 1.544 | 55.99 | 8.1377 |
| S16 | Lens | 3.807 | 1.226 | | | |
| S17 | Ninth | 33.026 | 0.413 | 1.535 | 55.74 | −5.9489 |
| S18 | Lens | 2.901 | 0.306 | | | |
| S19 | Filter | Infinity | 0.210 | 1.517 | 64.20 | |
| S20 | | Infinity | 0.759 | | | |
| S21 | Imaging Surface | Infinity | | | | |

A total focal length f of the optical imaging system 300 according to the third embodiment of the present disclosure is 6.8389 mm, Fno is 1.59, IMG HT is 6 mm, FOV is 80.5°, SWA11 is 19.065°, SWA21 is 33.45°, and f12 is 5.688 mm.

In the third embodiment of the present disclosure, the first lens 301 has a positive refractive power, a first surface of the first lens 301 is convex in the paraxial region, and the second surface of the first lens 301 is concave in the paraxial region.

The second lens 302 has a refractive power, a first surface of the second lens 302 is convex in the paraxial region, and a second surface of the second lens 302 is concave in the paraxial region.

The third lens 303 has a negative refractive power, a first surface of the third lens 303 is convex in the paraxial region, and a second surface of the third lens 303 is concave in the paraxial region.

The fourth lens 304 has a positive refractive power, a first surface of the fourth lens 304 is convex in the paraxial region, and a second surface of the fourth lens 304 is concave in the paraxial region.

The fifth lens 305 has a negative refractive power, a first surface of the fifth lens 305 is convex in the paraxial region, and a second surface of the fifth lens 305 is concave in the paraxial region.

The sixth lens 306 has a positive refractive power, a first surface of the sixth lens 306 is convex in the paraxial region, and a second surface of the sixth lens 306 is concave in the paraxial region.

The seventh lens 307 has a negative refractive power, a first surface of the seventh lens 307 is concave in the paraxial region, and a second surface of the seventh lens 307 is convex in the paraxial region.

The eighth lens 308 has a positive refractive power, a first surface of the eighth lens 308 is convex in the paraxial region, and a second surface of the eighth lens 308 is concave in the paraxial region.

The ninth lens 309 has a negative refractive power, a first surface of the ninth lens 309 is convex in the paraxial region, and a second surface of the ninth lens 309 is concave in the paraxial region.

Additionally, one or more of the fifth lens 305 to the ninth lens 309 has at least one inflection point formed on either one or both of the first surface and the second surface thereof.

Each surface of the first lens 301 to the ninth lens 309 has aspherical coefficients as illustrated in Table 6 below. For example, both an object-side surface and an image-side surface of each of the first lens 301 to the ninth lens 309 are aspherical surfaces.

TABLE 6

| | S1 | S2 | S3 | S4 | S5 | S6 |
|---|---|---|---|---|---|---|
| Conic Constant (K) | −5.501 | −12.068 | −4.280 | 99.000 | 20.143 | 4.564 |
| Fourth Coefficient (A) | 1.906E−02 | 1.496E−02 | −2.475E−03 | 4.505E−02 | 3.907E−02 | 7.771E−03 |
| Sixth Coefficient (B) | −2.864E−02 | −4.466E−02 | 6.414E−03 | −2.771E−01 | −2.780E−01 | −1.496E−01 |
| Eighth Coefficient (C) | 5.465E−02 | 9.758E−02 | −2.996E−02 | 7.423E−01 | 8.251E−01 | 6.072E−01 |
| Tenth Coefficient (D) | −8.236E−02 | −1.679E−01 | 8.128E−02 | −1.230E+00 | −1.517E+00 | −1.533E+00 |
| Twelfth Coefficient (E) | 8.741E−02 | 2.057E−01 | −1.276E−01 | 1.376E+00 | 1.896E+00 | 2.607E+00 |
| Fourteenth Coefficient (F) | −6.623E−02 | −1.768E−01 | 1.328E−01 | −1.083E+00 | −1.677E+00 | −3.103E+00 |
| Sixteenth Coefficient (G) | 3.629E−02 | 1.081E−01 | −9.589E−02 | 6.141E−01 | 1.073E+00 | 2.646E+00 |
| Eighteenth Coefficient (H) | −1.449E−02 | −4.756E−02 | 4.903E−02 | −2.536E−01 | −5.016E−01 | −1.634E+00 |
| Twentieth Coefficient (J) | 4.210E−03 | 1.511E−02 | −1.786E−02 | 7.623E−02 | 1.713E−01 | 7.317E−01 |
| Twenty-Second Coefficient (L) | −8.798E−04 | −3.437E−03 | 4.607E−03 | −1.649E−02 | −4.224E−02 | −2.350E−01 |
| Twenty-Fourth Coefficient (M) | 1.287E−04 | 5.459E−04 | −8.218E−04 | 2.499E−03 | 7.315E−03 | 5.271E−02 |

TABLE 6-continued

| | | | | | | |
|---|---|---|---|---|---|---|
| Twenty-Sixth Coefficient (N) | −1.249E−05 | −5.751E−05 | 9.646E−05 | −2.513E−04 | −8.436E−04 | −7.837E−03 |
| Twenty-Eighth Coefficient (O) | 7.209E−07 | 3.609E−06 | −6.702E−06 | 1.504E−05 | 5.814E−05 | 6.937E−04 |
| Thirtieth Coefficient (P) | −1.873E−08 | −1.021E−07 | 2.089E−07 | −4.049E−07 | −1.811E−06 | −2.767E−05 |

| | S7 | S8 | S9 | S10 | S11 | S12 |
|---|---|---|---|---|---|---|
| Conic Constant (K) | −8.362 | −62.396 | −97.868 | −92.451 | −71.434 | 45.581 |
| Fourth Coefficient (A) | 1.330E−03 | −7.289E−03 | −3.268E−02 | −3.936E−02 | −6.983E−02 | −8.950E−02 |
| Sixth Coefficient (B) | −2.716E−02 | 3.132E−02 | 1.025E−02 | 2.817E−02 | 4.519E−02 | 5.146E−02 |
| Eighth Coefficient (C) | 8.906E−02 | −1.234E−01 | −3.631E−02 | −5.088E−02 | −1.749E−02 | −3.947E−02 |
| Tenth Coefficient (D) | −2.037E−01 | 2.973E−01 | 1.206E−01 | 8.903E−02 | −1.964E−02 | 2.814E−02 |
| Twelfth Coefficient (E) | 3.390E−01 | −4.896E−01 | −2.729E−01 | −1.271E−01 | 5.213E−02 | −1.207E−02 |
| Fourteenth Coefficient (F) | −4.137E−01 | 5.775E−01 | 4.055E−01 | 1.325E−01 | −6.261E−02 | 7.593E−04 |
| Sixteenth Coefficient (G) | 3.709E−01 | −4.995E−01 | −4.108E−01 | −9.891E−02 | 4.873E−02 | 2.111E−03 |
| Eighteenth Coefficient (H) | −2.434E−01 | 3.199E−01 | 2.918E−01 | 5.314E−02 | −2.636E−02 | −1.277E−03 |
| Twentieth Coefficient (J) | 1.160E−01 | −1.514E−01 | −1.472E−01 | −2.058E−02 | 1.011E−02 | 3.966E−04 |
| Twenty-Second Coefficient (L) | −3.955E−02 | 5.222E−02 | 5.251E−02 | 5.690E−03 | −2.745E−03 | −7.735E−05 |
| Twenty-Fourth Coefficient (M) | 9.367E−03 | −1.274E−02 | −1.297E−02 | −1.097E−03 | 5.149E−04 | 9.817E−06 |
| Twenty-Sixth Coefficient (N) | −1.462E−03 | 2.083E−03 | 2.112E−03 | 1.400E−04 | −6.347E−05 | −7.868E−07 |
| Twenty-Eighth Coefficient (O) | 1.350E−04 | −2.045E−04 | −2.040E−04 | −1.065E−05 | 4.620E−06 | 3.590E−08 |
| Thirtieth Coefficient (P) | −5.578E−06 | 9.110E−06 | 8.866E−06 | 3.660E−07 | −1.503E−07 | −6.990E−10 |

| | S13 | S14 | S15 | S16 | S17 | S18 |
|---|---|---|---|---|---|---|
| Conic Constant (K) | 2.796 | 1.969 | −7.376 | −12.771 | 26.625 | −13.007 |
| Fourth Coefficient (A) | 4.894E−02 | −5.015E−03 | 1.137E−03 | 3.056E−02 | −9.704E−02 | −4.941E−02 |
| Sixth Coefficient (B) | −4.557E−02 | 1.683E−02 | 1.089E−03 | −1.896E−02 | 3.922E−02 | 1.841E−02 |
| Eighth Coefficient (C) | 2.830E−02 | −2.990E−02 | −1.373E−02 | 4.072E−03 | −1.270E−02 | −5.607E−03 |
| Tenth Coefficient (D) | −1.675E−02 | 2.956E−02 | 1.359E−02 | 6.619E−04 | 3.294E−03 | 1.333E−03 |
| Twelfth Coefficient (E) | 1.426E−02 | −1.810E−02 | −7.649E−03 | −8.621E−04 | −6.277E−04 | −2.444E−04 |
| Fourteenth Coefficient (F) | −1.164E−02 | 7.279E−03 | 2.830E−03 | 3.344E−04 | 8.407E−05 | 3.419E−05 |
| Sixteenth Coefficient (G) | 6.503E−03 | −2.010E−03 | −7.274E−04 | −7.777E−05 | −7.786E−06 | −3.647E−06 |
| Eighteenth Coefficient (H) | −2.412E−03 | 3.933E−04 | 1.330E−04 | 1.214E−05 | 4.900E−07 | 2.967E−07 |
| Twentieth Coefficient (J) | 6.092E−04 | −5.537E−05 | −1.736E−05 | −1.316E−06 | −1.997E−08 | −1.824E−08 |
| Twenty-Second Coefficient (L) | −1.061E−04 | 5.612E−06 | 1.601E−06 | 9.932E−08 | 4.494E−10 | 8.275E−10 |
| Twenty-Fourth Coefficient (M) | 1.265E−05 | −4.019E−07 | −1.014E−07 | −5.119E−09 | −1.039E−12 | −2.667E−11 |
| Twenty-Sixth Coefficient (N) | −9.915E−07 | 1.941E−08 | 4.167E−09 | 1.715E−10 | −2.331E−13 | 5.740E−13 |
| Twenty-Eighth Coefficient (O) | 4.628E−08 | −5.703E−10 | −9.955E−11 | −3.355E−12 | 5.889E−15 | −7.355E−15 |
| Thirtieth Coefficient (P) | −9.788E−10 | 7.730E−12 | 1.041E−12 | 2.900E−14 | −4.909E−17 | 4.228E−17 |

Additionally, the optical imaging system 300 configured as described above may have the aberration characteristics illustrated in FIG. 6.

Figure 7:
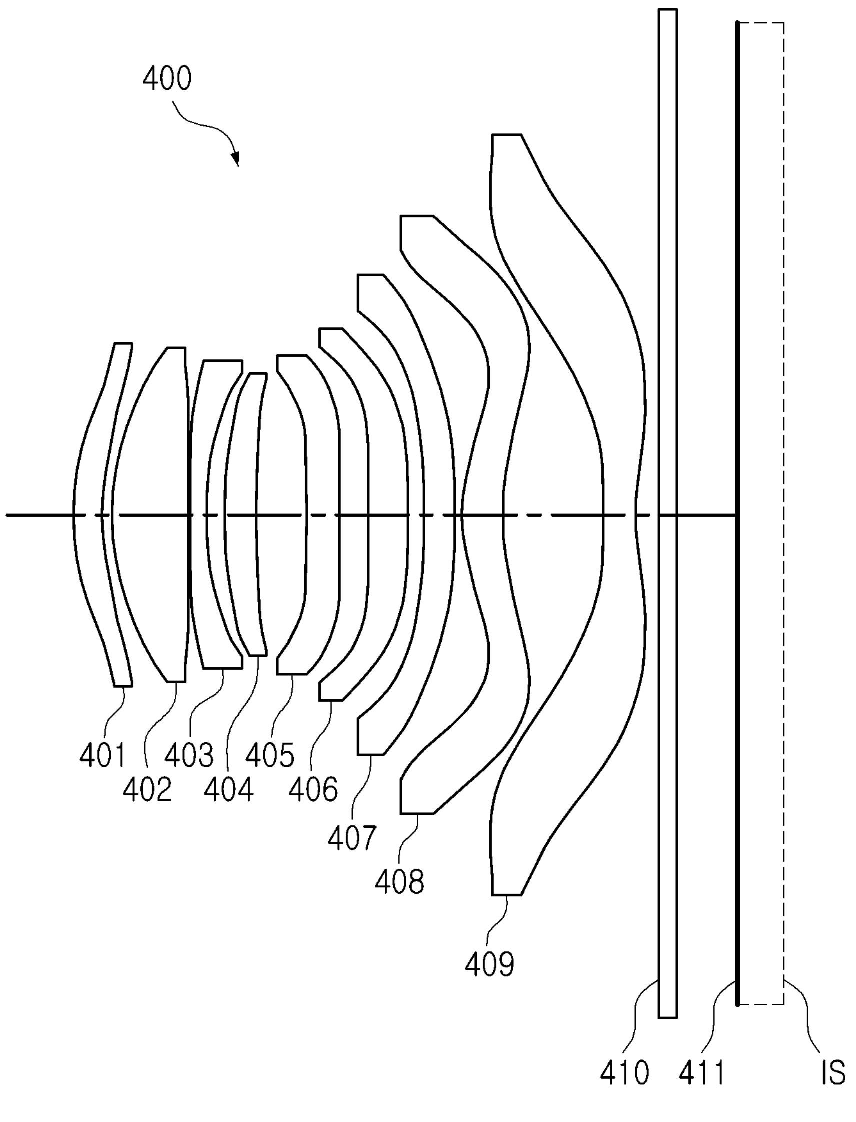
FIG. 7 is a structural view of an optical imaging system according to a fourth embodiment of the present disclosure.
Figure 8:
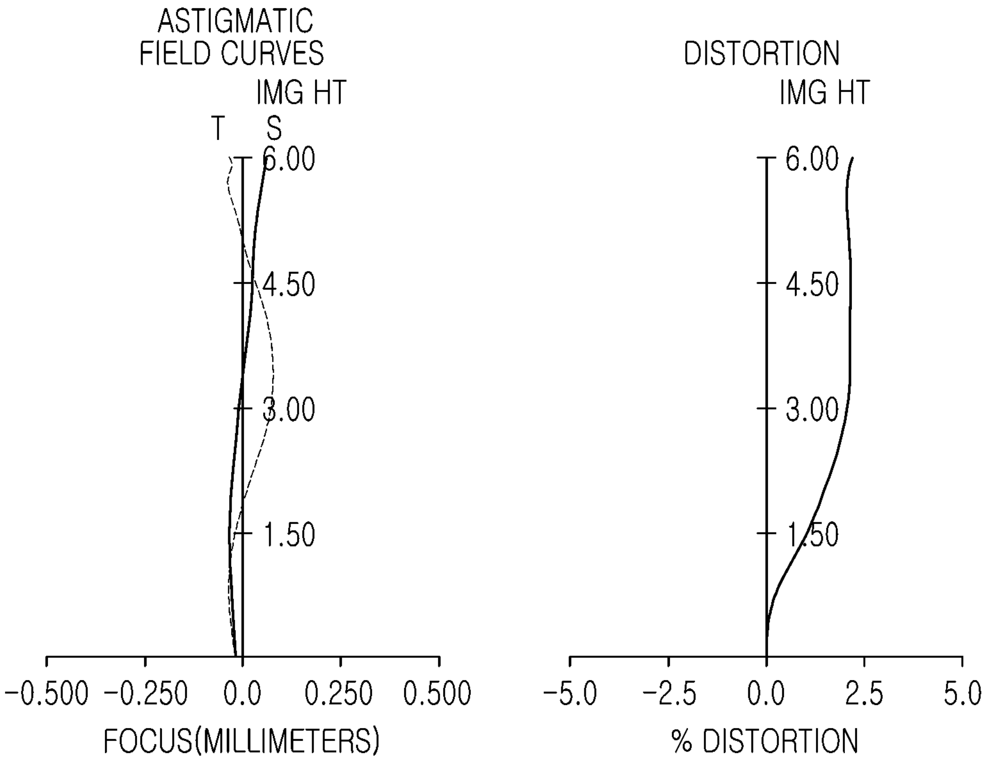
FIG. 8 is a view illustrating aberration characteristics of the optical imaging system illustrated in FIG. 7.

FIG. 7 is a structural view of an optical imaging system according to a fourth embodiment of the present disclosure, and FIG. 8 is a view illustrating aberration characteristics of the optical imaging system illustrated in FIG. 7.

Referring to FIG. 7, an optical imaging system 400 according to the fourth embodiment of the present disclosure includes a first lens 401, a second lens 402, a third lens 403, a fourth lens 404, a fifth lens 405, a sixth lens 406, a seventh lens 407, an eighth lens 408, and a ninth lens 409, and may further include a filter 410 and an image sensor IS.

The optical imaging system 400 according to the fourth embodiment of the present disclosure may form a focus on an imaging surface 411. The imaging surface 411 may denote a surface on which a focus is formed by the optical imaging system. In an example, the imaging surface 411 may mean one surface of the image sensor IS on which light is received.

The lens characteristics (a radius of curvature, a lens thickness, a distance between lenses, an index of refraction, an Abbe number, and a focal length) of each lens are illustrated in Table 7 below.

The fifth lens 405 has a negative refractive power, a first surface of the fifth lens 405 is convex in the paraxial region, and a second surface of the fifth lens 405 is concave in the paraxial region.

The sixth lens 406 has a positive refractive power, a first surface of the sixth lens 406 is convex in the paraxial region, and a second surface of the sixth lens 406 is concave in the paraxial region.

The seventh lens 407 has a positive refractive power, a first surface of the seventh lens 407 is concave in the paraxial region, and a second surface of the seventh lens 407 is convex in the paraxial region.

TABLE 7

| Surface Number | Element | Radius of Curvature | Thickness or Distance | Index of Refraction | Abbe Number | Focal Length |
|---|---|---|---|---|---|---|
| S1 | First | 3.110 | 0.360 | 1.544 | 55.99 | 33.6544 |
| S2 | Lens | 3.590 | 0.118 | | | |
| S3 | Second | 3.402 | 0.935 | 1.544 | 55.99 | 6.5579 |
| S4 | Lens | 60.804 | 0.030 | | | |
| S5 | Third | 15.900 | 0.210 | 1.639 | 23.49 | −9.9158 |
| S6 | Lens | 4.540 | 0.217 | | | |
| S7 | Fourth | 5.736 | 0.392 | 1.544 | 55.99 | 22.8715 |
| S8 | Lens | 10.346 | 0.614 | | | |
| S9 | Fifth | 37.651 | 0.405 | 1.671 | 19.24 | −36.8572 |
| S10 | Lens | 14.967 | 0.371 | | | |
| S11 | Sixth | 18.518 | 0.480 | 1.544 | 55.99 | 999.9999 |
| S12 | Lens | 18.992 | 0.210 | | | |
| S13 | Seventh | −6.599 | 0.381 | 1.614 | 25.94 | 9724.1446 |
| S14 | Lens | −6.737 | 0.086 | | | |
| S15 | Eighth | 2.264 | 0.499 | 1.544 | 55.99 | 8.9029 |
| S16 | Lens | 3.906 | 1.245 | | | |
| S17 | Ninth | 33.093 | 0.400 | 1.535 | 55.74 | −5.815 |
| S18 | Lens | 2.842 | 0.306 | | | |
| S19 | Filter | Infinity | 0.210 | 1.517 | 64.20 | |
| S20 | | Infinity | 0.753 | | | |
| S21 | Imaging Surface | Infinity | | | | |

A total focal length f of the optical imaging system 400 according to the fourth embodiment of the present disclosure is 6.8354 mm, Fno is 1.59, IMG HT is 6 mm, FOV is 80.5°, SWA11 is 19.074°, SWA21 is 32.851°, and f12 is 5.719 mm.

In the fourth embodiment of the present disclosure, the first lens 401 has a positive refractive power, a first surface of the first lens 401 is convex in the paraxial region, and a second surface of the first lens 401 is concave in the paraxial region.

The second lens 402 has a positive refractive power, a first surface of the second lens 402 is convex in the paraxial region, and a second surface of the second lens 402 is concave in the paraxial region.

The third lens 403 has a negative refractive power, a first surface of the third lens 403 is convex in the paraxial region, and a second surface of the third lens 403 is concave in the paraxial region.

The fourth lens 404 has a positive refractive power, a first surface of the fourth lens 404 is convex in the paraxial region, and a second surface of the fourth lens 404 is concave in the paraxial region.

The eighth lens 408 has a positive refractive power, a first surface of the eighth lens 408 is convex in the paraxial region, and a second surface of the eighth lens 408 is concave in the paraxial region.

The ninth lens 409 has a negative refractive power, a first surface of the ninth lens 409 is convex in the paraxial region, and a second surface of the ninth lens 409 is concave in the paraxial region.

Additionally, one or more of the fifth lens 405 to the ninth lens 409 has at least one inflection point formed on either one or both of the first surface and the second surface thereof.

Each surface of the first lens 401 to the ninth lens 409 has aspherical coefficients as illustrated in Table 8 below. For example, both an object-side surface and an image-side surface of each of the first lens 401 to the ninth lens 409 are aspherical surfaces.

TABLE 8

| | S1 | S2 | S3 | S4 | S5 | S6 |
|---|---|---|---|---|---|---|
| Conic Constant (K) | −5.507 | −12.228 | −4.316 | 99.000 | 20.303 | 4.566 |
| Fourth Coefficient (A) | 1.577E−02 | 6.349E−03 | −4.697E−03 | 4.584E−02 | 3.690E−02 | 5.456E−03 |
| Sixth Coefficient (B) | −1.297E−02 | −1.982E−03 | 1.872E−02 | −2.738E−01 | −2.502E−01 | −1.314E−01 |
| Eighth Coefficient (C) | 1.575E−02 | −1.814E−02 | −5.739E−02 | 7.276E−01 | 7.176E−01 | 5.251E−01 |
| Tenth Coefficient (D) | −2.017E−02 | 3.469E−02 | 1.141E−01 | −1.215E+00 | −1.292E+00 | −1.314E+00 |
| Twelfth Coefficient (E) | 1.886E−02 | −3.659E−02 | −1.461E−01 | 1.385E+00 | 1.597E+00 | 2.227E+00 |
| Fourteenth Coefficient (F) | −1.243E−02 | 2.734E−02 | 1.295E−01 | −1.120E+00 | −1.404E+00 | −2.647E+00 |
| Sixteenth Coefficient (G) | 5.709E−03 | −1.558E−02 | −8.171E−02 | 6.566E−01 | 8.965E−01 | 2.252E+00 |
| Eighteenth Coefficient (H) | −1.803E−03 | 6.852E−03 | 3.718E−02 | −2.818E−01 | −4.190E−01 | −1.387E+00 |
| Twentieth Coefficient (J) | 3.799E−04 | −2.286E−03 | −1.221E−02 | 8.847E−02 | 1.431E−01 | 6.181E−01 |
| Twenty-Second Coefficient (L) | −4.915E−05 | 5.611E−04 | 2.864E−03 | −2.008E−02 | −3.529E−02 | −1.974E−01 |
| Twenty-Fourth Coefficient (M) | 2.852E−06 | −9.717E−05 | −4.676E−04 | 3.206E−03 | 6.108E−03 | 4.397E−02 |
| Twenty-Sixth Coefficient (N) | 1.302E−07 | 1.117E−05 | 5.042E−05 | −3.413E−04 | −7.032E−04 | −6.488E−03 |
| Twenty-Eighth Coefficient (O) | −3.015E−08 | −7.615E−07 | −3.226E−06 | 2.174E−05 | 4.832E−05 | 5.697E−04 |
| Thirtieth Coefficient (P) | 1.352E−09 | 2.325E−08 | 9.272E−08 | −6.263E−07 | −1.498E−06 | −2.253E−05 |

| | S7 | S8 | S9 | S10 | S11 | S12 |
|---|---|---|---|---|---|---|
| Conic Constant (K) | −7.741 | −54.430 | −93.831 | −84.155 | −99.000 | 17.415 |
| Fourth Coefficient (A) | −2.530E−04 | −8.295E−03 | −3.246E−02 | −4.144E−02 | −7.024E−02 | −9.570E−02 |
| Sixth Coefficient (B) | −2.360E−02 | 3.521E−02 | −1.547E−03 | 3.337E−02 | 3.498E−02 | 5.092E−02 |
| Eighth Coefficient (C) | 7.032E−02 | −1.465E−01 | 2.507E−02 | −6.136E−02 | 2.754E−02 | −2.338E−02 |
| Tenth Coefficient (D) | −1.329E−01 | 3.813E−01 | −5.897E−02 | 1.069E−01 | −1.112E−01 | 1.350E−02 |
| Twelfth Coefficient (E) | 1.788E−01 | −6.730E−01 | 6.453E−02 | −1.524E−01 | 1.677E−01 | −1.817E−02 |
| Fourteenth Coefficient (F) | −1.761E−01 | 8.404E−01 | −2.896E−02 | 1.603E−01 | −1.627E−01 | 2.162E−02 |
| Sixteenth Coefficient (G) | 1.286E−01 | −7.593E−01 | −1.385E−02 | −1.215E−01 | 1.107E−01 | −1.670E−02 |
| Eighteenth Coefficient (H) | −6.961E−02 | 5.012E−01 | 3.015E−02 | 6.643E−02 | −5.428E−02 | 8.558E−03 |
| Twentieth Coefficient (J) | 2.765E−02 | −2.413E−01 | −2.228E−02 | −2.620E−02 | 1.928E−02 | −2.998E−03 |
| Twenty-Second Coefficient (L) | −7.901E−03 | 8.375E−02 | 9.766E−03 | 7.385E−03 | −4.913E−03 | 7.241E−04 |
| Twenty-Fourth Coefficient (M) | 1.571E−03 | −2.037E−02 | −2.749E−03 | −1.450E−03 | 8.755E−04 | −1.188E−04 |
| Twenty-Sixth Coefficient (N) | −2.049E−04 | 3.296E−03 | 4.906E−04 | 1.886E−04 | −1.035E−04 | 1.264E−05 |
| Twenty-Eighth Coefficient (O) | 1.561E−05 | −3.185E−04 | −5.087E−05 | −1.460E−05 | 7.286E−06 | −7.881E−07 |
| Thirtieth Coefficient (P) | −5.200E−07 | 1.390E−05 | 2.346E−06 | 5.093E−07 | −2.310E−07 | 2.181E−08 |

| | S13 | S14 | S15 | S16 | S17 | S18 |
|---|---|---|---|---|---|---|
| Conic Constant (K) | 3.547 | 0.894 | −6.898 | −12.537 | 21.738 | −13.889 |
| Fourth Coefficient (A) | 3.844E−02 | 8.849E−03 | 5.497E−03 | 2.827E−02 | −1.063E−01 | −5.188E−02 |
| Sixth Coefficient (B) | −4.192E−02 | −5.737E−03 | −6.243E−03 | −1.395E−02 | 4.896E−02 | 2.166E−02 |
| Eighth Coefficient (C) | 4.583E−02 | −1.591E−03 | −6.030E−03 | −1.180E−03 | −1.907E−02 | −7.689E−03 |
| Tenth Coefficient (D) | −4.504E−02 | 5.763E−03 | 8.156E−03 | 4.047E−03 | 5.873E−03 | 2.120E−03 |
| Twelfth Coefficient (E) | 3.428E−02 | −5.136E−03 | −5.026E−03 | −2.327E−03 | −1.295E−03 | −4.386E−04 |

TABLE 8-continued

| | | | | | | |
|---|---|---|---|---|---|---|
| Fourteenth Coefficient (F) | −1.954E−02 | 2.606E−03 | 1.951E−03 | 7.800E−04 | 1.999E−04 | 6.752E−05 |
| Sixteenth Coefficient (G) | 8.237E−03 | −8.730E−04 | −5.205E−04 | −1.753E−04 | −2.173E−05 | −7.771E−06 |
| Eighteenth Coefficient (H) | −2.554E−03 | 2.056E−04 | 9.892E−05 | 2.768E−05 | 1.681E−06 | 6.699E−07 |
| Twentieth Coefficient (J) | 5.792E−04 | −3.487E−05 | −1.352E−05 | −3.115E−06 | −9.275E−08 | −4.294E−08 |
| Twenty-Second Coefficient (L) | −9.496E−05 | 4.253E−06 | 1.317E−06 | 2.488E−07 | 3.616E−09 | 2.008E−09 |
| Twenty-Fourth Coefficient (M) | 1.096E−05 | −3.636E−07 | −8.911E−08 | −1.378E−08 | −9.695E−11 | −6.622E−11 |
| Twenty-Sixth Coefficient (N) | −8.440E−07 | 2.064E−08 | 3.969E−09 | 5.034E−10 | 1.691E−12 | 1.453E−12 |
| Twenty-Eighth Coefficient (O) | 3.895E−08 | −6.963E−10 | −1.045E−10 | −1.089E−11 | −1.714E−14 | −1.897E−14 |
| Thirtieth Coefficient (P) | −8.143E−10 | 1.054E−11 | 1.233E−12 | 1.057E−13 | 7.556E−17 | 1.113E−16 |

Additionally, the optical imaging system 400 configured as described above may have the aberration characteristics illustrated in FIG. 8.

Figure 9:
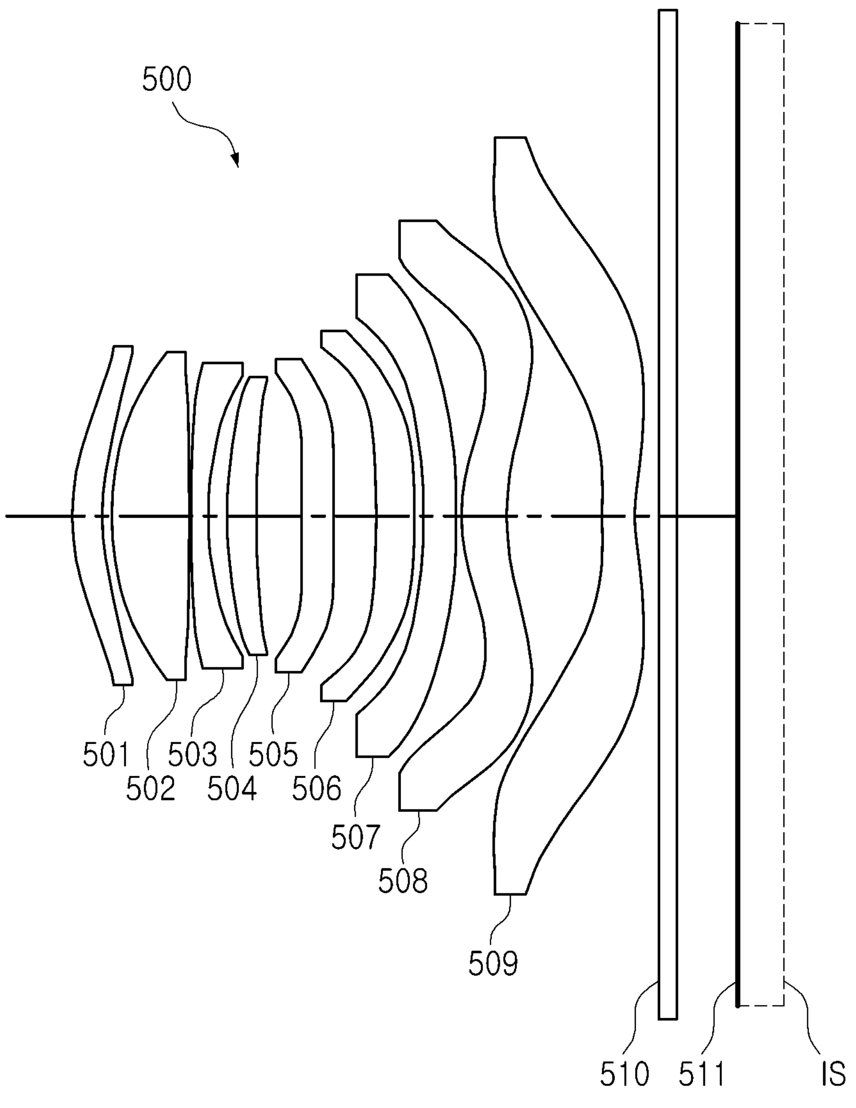
FIG. 9 is a structural view of an optical imaging system according to a fifth embodiment of the present disclosure.
Figure 10:
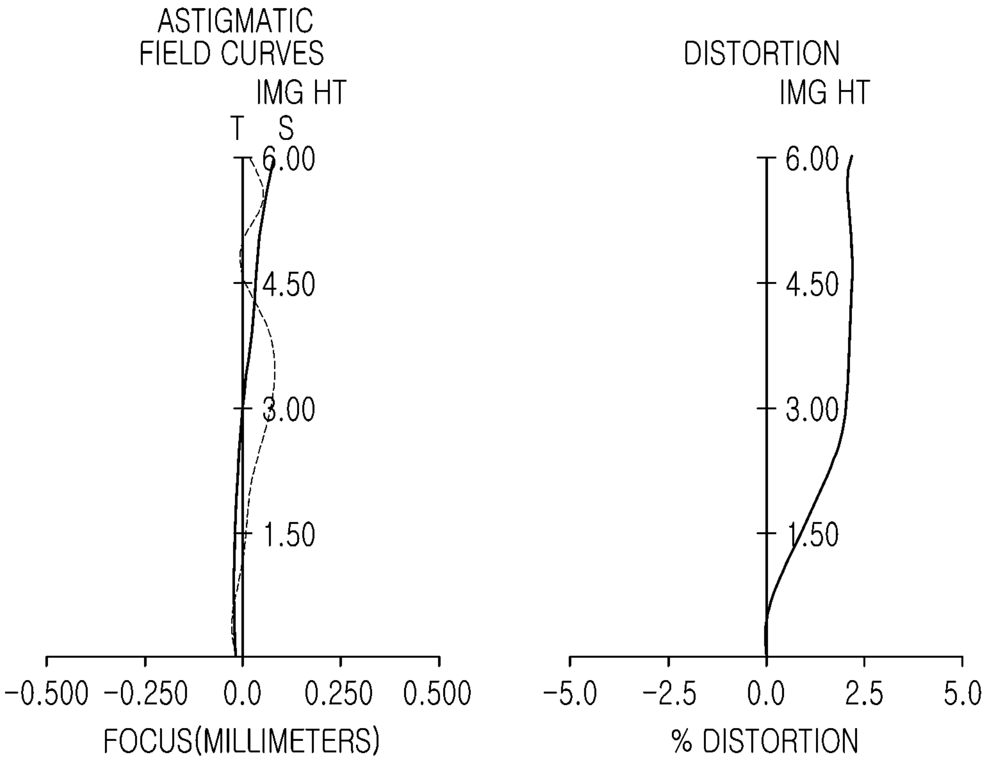
FIG. 10 is a view illustrating aberration characteristics of the optical imaging system illustrated in FIG. 9.

FIG. 9 is a structural view of an optical imaging system according to a fifth embodiment of the present disclosure, and FIG. 10 is a view illustrating aberration characteristics of the optical imaging system illustrated in FIG. 9.

Referring to FIG. 9, an optical imaging system 500 according to the fifth embodiment of the present disclosure includes a first lens 501, a second lens 502, a third lens 503, a fourth lens 504, a fifth lens 505, a sixth lens 506, a seventh lens 507, an eighth lens 508, and a ninth lens 509, and may further include a filter 510 and an image sensor IS.

The optical imaging system 500 according to the fifth embodiment of the present disclosure may form a focus on an imaging surface 511. The imaging surface 511 may denote a surface on which a focus is formed by the optical imaging system. In an example, the imaging surface 511 may denote one surface of the image sensor IS on which light is received.

The lens characteristics (a radius of curvature, a lens thickness, a distance between lenses, an index of refraction, an Abbe number, and a focal length) of each lens are illustrated in Table 9 below.

TABLE 9

| Surface Number | Element | Radius of Curvature | Thickness or Distance | Index of Refraction | Abbe Number | Focal Length |
|---|---|---|---|---|---|---|
| S1 | First | 3.111 | 0.377 | 1.544 | 55.99 | 36.95 |
| S2 | Lens | 3.520 | 0.108 | | | |
| S3 | Second | 3.339 | 0.955 | 1.544 | 55.99 | 6.24 |
| S4 | Lens | 143.471 | 0.030 | | | |
| S5 | Third | 18.735 | 0.210 | 1.639 | 23.49 | −9.34 |
| S6 | Lens | 4.541 | 0.224 | | | |
| S7 | Fourth | 5.688 | 0.378 | 1.544 | 55.99 | 25.3 |
| S8 | Lens | 9.438 | 0.548 | | | |
| S9 | Fifth | 18.995 | 0.389 | 1.671 | 19.24 | 300 |
| S10 | Lens | 20.776 | 0.528 | | | |
| S11 | Sixth | 169.106 | 0.480 | 1.544 | 55.99 | −51.59 |
| S12 | Lens | 24.136 | 0.103 | | | |
| S13 | Seventh | −6.061 | 0.421 | 1.614 | 25.94 | −42.51 |
| S14 | Lens | −8.081 | 0.060 | | | |
| S15 | Eighth | 2.225 | 0.566 | 1.544 | 55.99 | 7.78 |
| S16 | Lens | 4.252 | 1.171 | | | |
| S17 | Ninth | 31.937 | 0.401 | 1.535 | 55.74 | −5.94 |
| S18 | Lens | 2.886 | 0.306 | | | |

TABLE 9-continued

| Surface Number | Element | Radius of Curvature | Thickness or Distance | Index of Refraction | Abbe Number | Focal Length |
|---|---|---|---|---|---|---|
| S19 | Filter | Infinity | 0.210 | 1.517 | 64.20 | |
| S20 | | Infinity | 0.779 | | | |
| S21 | Imaging Surface | Infinity | | | | |

A total focal length f of the optical imaging system 500 according to the fifth embodiment of the present disclosure is 6.84 mm, Fno is 1.59, IMG HT is 6 mm, FOV is 80.5°, SWA11 is 19.09°, SWA21 is 33.324°, and f12 is 5.580 mm.

In the fifth embodiment of the present disclosure, the first lens 501 has a positive refractive power, a first surface of the first lens 501 is convex in the paraxial region, and a second surface of the first lens 501 is concave in the paraxial region.

The second lens 502 has a positive refractive power, a first surface of the second lens 502 is convex in the paraxial region, and a second surface of the second lens 502 is concave in the paraxial region.

The third lens 503 has a negative refractive power, a first surface of the third lens 503 is convex in the paraxial region, and a second surface of the third lens 503 is concave in the paraxial region.

The fourth lens 504 has a positive refractive power, a first surface of the fourth lens 504 is convex in the paraxial region, and a second surface of the fourth lens 504 is concave in the paraxial region.

The fifth lens 505 has a positive refractive power, a first surface of the fifth lens 505 is convex in the paraxial region, and a second surface of the fifth lens 505 is concave in the paraxial region.

The sixth lens 506 has a negative refractive power, a first surface of the sixth lens 506 is convex in the paraxial region, and a second surface of the sixth lens 506 is concave in the paraxial region.

The seventh lens 507 has a negative refractive power, a first surface of the seventh lens 507 is concave in the paraxial region, and a second surface of the seventh lens 507 is convex in the paraxial region.

The eighth lens 508 has a positive refractive power, a first surface of the eighth lens 508 is convex in the paraxial region, and a second surface of the eighth lens 508 is concave in the paraxial region.

The ninth lens 509 has a negative refractive power, a first surface of the ninth lens 509 is convex in the paraxial region, and a second surface of the ninth lens 509 is concave in the paraxial region.

Additionally, one or more of the fifth lens 505 to the ninth lens 509 has at least one inflection point formed on either one or both of the first surface and the second surface thereof.

Each surface of the first lens 501 to the ninth lens 509 has aspherical coefficients as illustrated in Table 10 below. For example, both an object-side surface and an image-side surface of each of the first lens 501 to the ninth lens 509 are aspherical surfaces.

TABLE 10

| | S1 | S2 | S3 | S4 | S5 | S6 |
|---|---|---|---|---|---|---|
| Conic Constant (K) | −5.485 | −12.131 | −4.262 | 99.000 | 18.032 | 4.563 |
| Fourth Coefficient (A) | 1.676E−02 | 1.410E−02 | −2.990E−03 | 4.283E−02 | 3.883E−02 | 6.741E−03 |
| Sixth Coefficient (B) | −1.518E−02 | −3.946E−02 | 1.230E−02 | −2.564E−01 | −2.596E−01 | −1.259E−01 |
| Eighth Coefficient (C) | 1.492E−02 | 7.996E−02 | −5.401E−02 | 6.621E−01 | 7.400E−01 | 5.075E−01 |
| Tenth Coefficient (D) | −1.231E−02 | −1.321E−01 | 1.367E−01 | −1.069E+00 | −1.342E+00 | −1.322E+00 |
| Twelfth Coefficient (E) | 6.931E−03 | 1.600E−01 | −2.074E−01 | 1.178E+00 | 1.684E+00 | 2.342E+00 |
| Fourteenth Coefficient (F) | −2.636E−03 | −1.382E−01 | 2.097E−01 | −9.208E−01 | −1.514E+00 | −2.902E+00 |
| Sixteenth Coefficient (G) | 5.880E−04 | 8.536E−02 | −1.477E−01 | 5.217E−01 | 9.909E−01 | 2.563E+00 |
| Eighteenth Coefficient (H) | −5.600E−06 | −3.799E−02 | 7.394E−02 | −2.163E−01 | −4.759E−01 | −1.632E+00 |
| Twentieth Coefficient (J) | −4.864E−05 | 1.220E−02 | −2.650E−02 | 6.557E−02 | 1.673E−01 | 7.495E−01 |
| Twenty-Second Coefficient (L) | 1.902E−05 | −2.800E−03 | 6.744E−03 | −1.436E−02 | −4.252E−02 | −2.459E−01 |
| Twenty-Fourth Coefficient (M) | −3.994E−06 | 4.480E−04 | −1.190E−03 | 2.209E−03 | 7.594E−03 | 5.616E−02 |
| Twenty-Sixth Coefficient (N) | 5.088E−07 | −4.747E−05 | 1.385E−04 | −2.262E−04 | −9.031E−04 | −8.478E−03 |
| Twenty-Eighth Coefficient (O) | −3.717E−08 | 2.993E−06 | −9.548E−06 | 1.383E−05 | 6.416E−05 | 7.602E−04 |
| Thirtieth Coefficient (P) | 1.202E−09 | −8.500E−08 | 2.956E−07 | −3.816E−07 | −2.058E−06 | −3.065E−05 |

| | S7 | S8 | S9 | S10 | S11 | S12 |
|---|---|---|---|---|---|---|
| Conic Constant (K) | −8.494 | −66.585 | −64.824 | −58.979 | 73.942 | 6.485 |
| Fourth Coefficient (A) | 3.012E−03 | −6.971E−03 | −3.695E−02 | −3.093E−02 | −5.359E−02 | −8.818E−02 |
| Sixth Coefficient (B) | −4.356E−02 | 3.073E−02 | 5.317E−02 | 1.222E−02 | 1.794E−02 | 2.373E−02 |
| Eighth Coefficient (C) | 1.590E−01 | −1.320E−01 | −2.122E−01 | −2.338E−02 | 2.630E−02 | −7.231E−03 |
| Tenth Coefficient (D) | −3.947E−01 | 3.337E−01 | 5.580E−01 | 3.842E−02 | −7.630E−02 | 2.565E−02 |
| Twelfth Coefficient (E) | 6.926E−01 | −5.621E−01 | −1.001E+00 | −5.195E−02 | 1.064E−01 | −3.891E−02 |
| Fourteenth Coefficient (F) | −8.685E−01 | 6.660E−01 | 1.256E+00 | 5.212E−02 | −1.013E−01 | 3.098E−02 |
| Sixteenth Coefficient (G) | 7.851E−01 | −5.712E−01 | −1.125E+00 | −3.791E−02 | 6.958E−02 | −1.585E−02 |
| Eighteenth Coefficient (H) | −5.135E−01 | 3.597E−01 | 7.296E−01 | 2.009E−02 | −3.481E−02 | 5.656E−03 |
| Twentieth Coefficient (J) | 2.423E−01 | −1.666E−01 | −3.429E−01 | −7.787E−03 | 1.265E−02 | −1.456E−03 |
| Twenty-Second Coefficient (L) | −8.152E−02 | 5.614E−02 | 1.157E−01 | 2.191E−03 | −3.292E−03 | 2.710E−04 |
| Twenty-Fourth Coefficient (M) | 1.904E−02 | −1.339E−02 | −2.733E−02 | −4.368E−04 | 5.967E−04 | −3.571E−05 |
| Twenty-Sixth Coefficient (N) | −2.929E−03 | 2.145E−03 | 4.288E−03 | 5.864E−05 | −7.142E−05 | 3.168E−06 |
| Twenty-Eighth Coefficient (O) | 2.669E−04 | −2.068E−04 | −4.015E−04 | −4.762E−06 | 5.067E−06 | −1.697E−07 |
| Thirtieth Coefficient (P) | −1.090E−05 | 9.077E−06 | 1.698E−05 | 1.769E−07 | −1.612E−07 | 4.146E−09 |

| | S13 | S14 | S15 | S16 | S17 | S18 |
|---|---|---|---|---|---|---|
| Conic Constant (K) | 3.086 | 1.794 | −7.620 | −13.751 | 24.857 | −13.913 |
| Fourth Coefficient (A) | 5.434E−02 | 7.348E−03 | 1.745E−03 | 2.491E−02 | −1.019E−01 | −5.109E−02 |

TABLE 10-continued

| | | | | | | |
|---|---|---|---|---|---|---|
| Sixth Coefficient (B) | −7.687E−02 | 3.468E−03 | 2.252E−04 | −7.978E−03 | 4.646E−02 | 2.147E−02 |
| Eighth Coefficient (C) | 7.030E−02 | −1.990E−02 | −1.318E−02 | −6.227E−03 | −1.707E−02 | −7.559E−03 |
| Tenth Coefficient (D) | −3.905E−02 | 2.487E−02 | 1.230E−02 | 6.174E−03 | 4.713E−03 | 2.034E−03 |
| Twelfth Coefficient (E) | 1.251E−02 | −1.729E−02 | −6.388E−03 | −2.751E−03 | −9.038E−04 | −4.116E−04 |
| Fourteenth Coefficient (F) | −2.221E−03 | 7.704E−03 | 2.189E−03 | 7.763E−04 | 1.175E−04 | 6.258E−05 |
| Sixteenth Coefficient (G) | 2.975E−04 | −2.350E−03 | −5.253E−04 | −1.507E−04 | −1.022E−05 | −7.166E−06 |
| Eighteenth Coefficient (H) | −1.263E−04 | 5.081E−04 | 9.023E−05 | 2.073E−05 | 5.704E−07 | 6.167E−07 |
| Twentieth Coefficient (J) | 5.961E−05 | −7.901E−05 | −1.108E−05 | −2.033E−06 | −1.732E−08 | −3.948E−08 |
| Twenty-Second Coefficient (L) | −1.629E−05 | 8.801E−06 | 9.533E−07 | 1.406E−07 | 8.131E−12 | 1.842E−09 |
| Twenty-Fourth Coefficient (M) | 2.685E−06 | −6.863E−07 | −5.496E−08 | −6.662E−09 | 2.230E−11 | −6.054E−11 |
| Twenty-Sixth Coefficient (N) | −2.709E−07 | 3.560E−08 | 1.959E−09 | 2.040E−10 | −9.062E−13 | 1.322E−12 |
| Twenty-Eighth Coefficient (O) | 1.558E−08 | −1.103E−09 | −3.656E−11 | −3.591E−12 | 1.646E−14 | −1.716E−14 |
| Thirtieth Coefficient (P) | −3.942E−10 | 1.547E−11 | 2.243E−13 | 2.705E−14 | −1.203E−16 | 9.996E−17 |

Additionally, the optical imaging system 500 configured as described above may have the aberration characteristics illustrated in FIG. 10.

Figure 11:
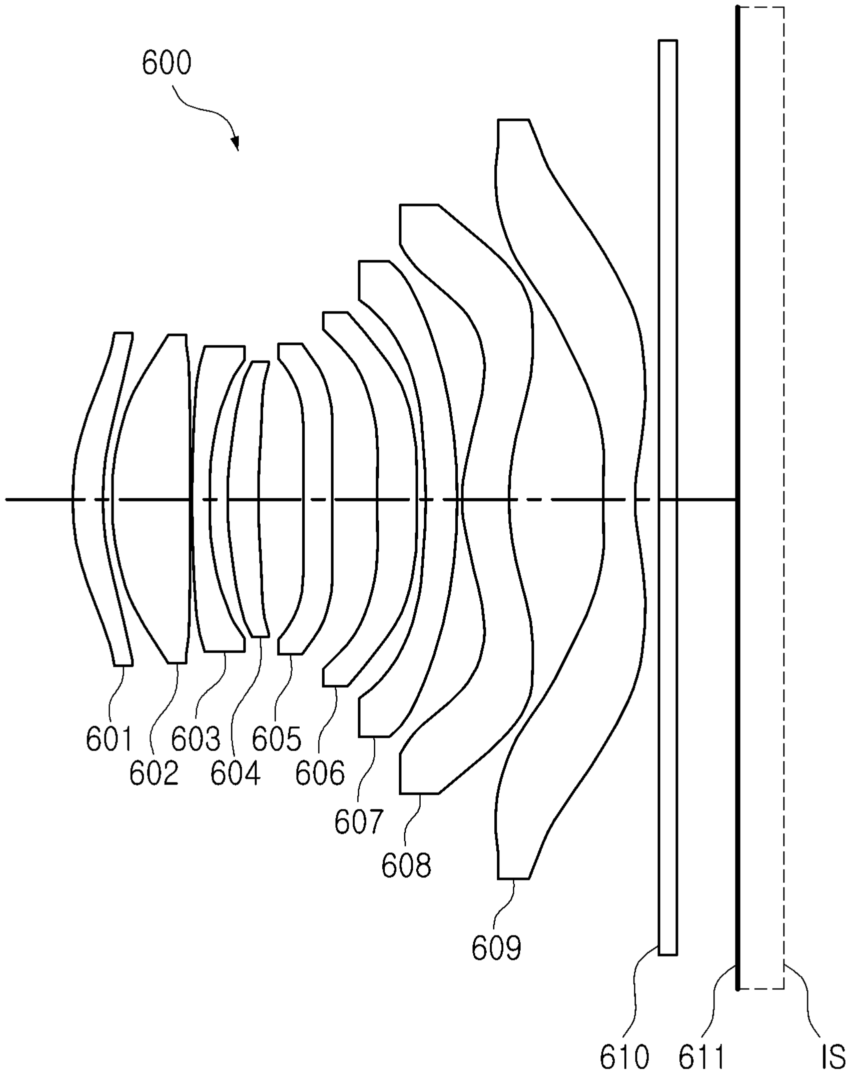
FIG. 11 is a block diagram of an optical imaging system according to a sixth embodiment of the present disclosure.
Figure 12:
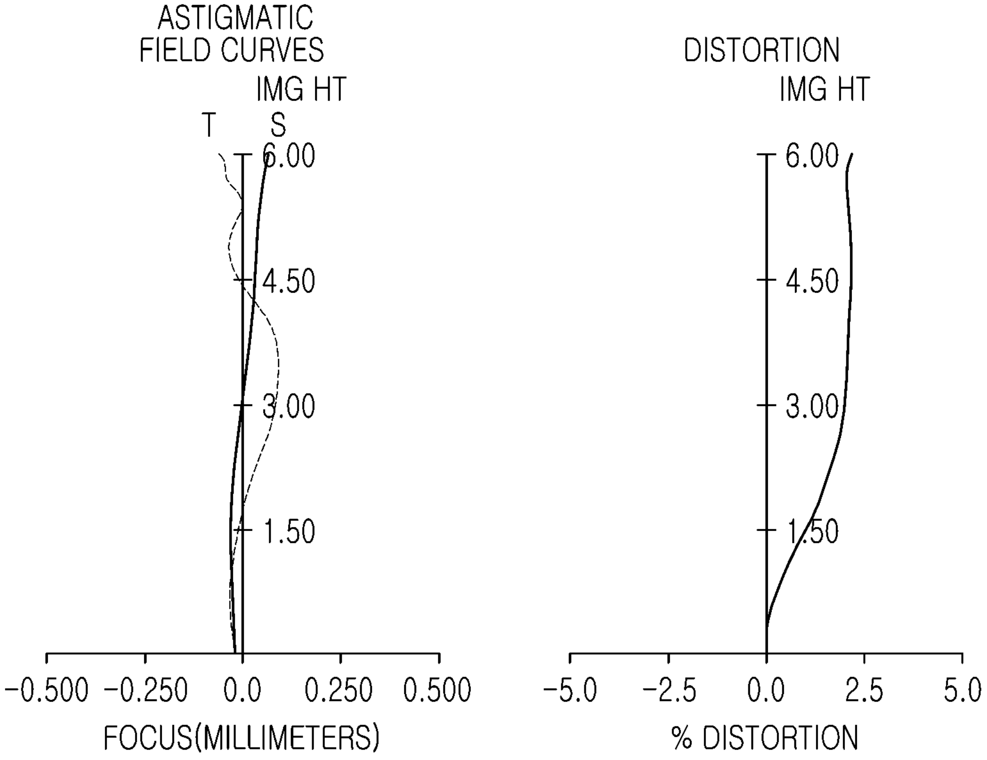
FIG. 12 is a view illustrating aberration characteristics of the optical imaging system illustrated in FIG. 11.

FIG. 11 is a structural view of an optical imaging system according to a sixth embodiment of the present disclosure, and FIG. 12 is a view illustrating aberration characteristics of the optical imaging system illustrated in FIG. 11.

Referring to FIG. 11, an optical imaging system 600 according to the sixth embodiment of the present disclosure includes a first lens 601, a second lens 602, a third lens 603, a fourth lens 604, a fifth lens 605, a sixth lens 606, a seventh lens 607, an eighth lens 608, and a ninth lens 609, and may further include a filter 610 and an image sensor IS.

The optical imaging system 600 according to the sixth embodiment of the present disclosure may form a focus on an imaging surface 611. The imaging surface 611 may denote a surface on which a focus is formed by the optical imaging system. In an example, the imaging surface 611 may denote one surface of the image sensor IS on which light is received.

The lens characteristics (a radius of curvature, a lens thickness, a distance between lenses, an index of refraction, an Abbe number, and a focal length) of each lens are illustrated in Table 11 below.

TABLE 11

| Surface Number | Element | Radius of Curvature | Thickness or Distance | Index of Refraction | Abbe Number | Focal Length |
|---|---|---|---|---|---|---|
| S1 | First | 3.112 | 0.376 | 1.544 | 55.99 | 42.53 |
| S2 | Lens | 3.440 | 0.111 | | | |
| S3 | Second | 3.267 | 0.959 | 1.544 | 55.99 | 6.08 |
| S4 | Lens | 173.268 | 0.030 | | | |
| S5 | Third | 19.173 | 0.210 | 1.639 | 23.49 | −9.27 |
| S6 | Lens | 4.540 | 0.233 | | | |
| S7 | Fourth | 5.977 | 0.377 | 1.544 | 55.99 | 25.49 |
| S8 | Lens | 10.239 | 0.541 | | | |
| S9 | Fifth | 15.166 | 0.365 | 1.671 | 19.24 | 500 |
| S10 | Lens | 15.720 | 0.566 | | | |
| S11 | Sixth | 191.196 | 0.480 | 1.544 | 55.99 | −37.86 |
| S12 | Lens | 18.648 | 0.114 | | | |
| S13 | Seventh | −6.614 | 0.384 | 1.614 | 25.94 | 500 |
| S14 | Lens | −6.620 | 0.060 | | | |

TABLE 11-continued

| Surface Number | Element | Radius of Curvature | Thickness or Distance | Index of Refraction | Abbe Number | Focal Length |
|---|---|---|---|---|---|---|
| S15 | Eighth | 2.438 | 0.596 | 1.544 | 55.99 | 9.05 |
| S16 | Lens | 4.394 | 1.150 | | | |
| S17 | Ninth | 31.435 | 0.400 | 1.535 | 55.74 | −6.01 |
| S18 | Lens | 2.915 | 0.306 | | | |
| S19 | Filter | Infinity | 0.210 | 1.517 | 64.20 | |
| S20 | | Infinity | 0.780 | | | |
| S21 | Imaging Surface | Infinity | | | | |

A total focal length f of the optical imaging system 600 according to the sixth embodiment of the present disclosure is 6.84 mm, Fno is 1.59, IMG HT is 6 mm, FOV is 80.5°, SWA11 is 19.159°, SWA21 is 33.721°, and f12 is 5.563 mm.

In the sixth embodiment of the present disclosure, the first lens 601 has a positive refractive power, a first surface of the first lens 601 is convex in the paraxial region, and a second surface of the first lens 601 is concave in the paraxial region.

The second lens 602 has a positive refractive power, a first surface of the second lens 602 is convex in the paraxial region, and a second surface of the second lens 602 is concave in the paraxial region.

The third lens 603 has a negative refractive power, a first surface of the third lens 603 is convex in the paraxial region, and a second surface of the third lens 603 is concave in the paraxial region.

The fourth lens 604 has a positive refractive power, a first surface of the fourth lens 604 is convex in the paraxial region, and a second surface of the fourth lens 604 is concave in the paraxial region.

The fifth lens 605 has a positive refractive power, a first surface of the fifth lens 605 is convex in the paraxial region, and a second surface of the fifth lens 605 is concave in the paraxial region.

The sixth lens 606 has a negative refractive power, a first surface of the sixth lens 606 is convex in the paraxial region, and a second surface of the sixth lens 606 is concave in the paraxial region.

The seventh lens 607 has a positive refractive power, a first surface of the seventh lens 607 is concave in the paraxial region, and a second surface of the seventh lens 607 is convex in the paraxial region.

The eighth lens 608 has a positive refractive power, a first surface of the eighth lens 608 is convex in the paraxial region, and a second surface of the eighth lens 608 is concave in the paraxial region.

The ninth lens 609 has a negative refractive power, a first surface of the ninth lens 609 is convex in the paraxial region, and a second surface of the ninth lens 609 is concave in the paraxial region.

Additionally, one or more of the fifth lens 605 to the ninth lens 609 has at least one inflection point formed on either one or both of the first surface and the second surface thereof.

Each surface of the first lens 601 to the ninth lens 609 has aspherical coefficients as illustrated in Table 12 below. For example, both an object-side surface and an image-side surface of each of the first lens 601 to the ninth lens 609 are aspherical surfaces.

TABLE 12

| | S1 | S2 | S3 | S4 | S5 | S6 |
|---|---|---|---|---|---|---|
| Conic Constant (K) | −5.442 | −11.931 | −4.304 | 99.000 | 16.651 | 4.560 |
| Fourth Coefficient (A) | 1.820E−02 | 1.498E−02 | −2.116E−03 | 3.937E−02 | 3.221E−02 | 7.066E−03 |
| Sixth Coefficient (B) | −2.543E−02 | −4.837E−02 | 9.091E−04 | −2.634E−01 | −2.465E−01 | −1.248E−01 |
| Eighth Coefficient (C) | 4.573E−02 | 1.147E−01 | −1.424E−02 | 7.256E−01 | 7.516E−01 | 5.198E−01 |
| Tenth Coefficient (D) | −6.633E−02 | −2.018E−01 | 6.228E−02 | −1.225E+00 | −1.421E+00 | −1.379E+00 |
| Twelfth Coefficient (E) | 6.890E−02 | 2.474E−01 | −1.186E−01 | 1.396E+00 | 1.831E+00 | 2.459E+00 |
| Fourteenth Coefficient (F) | −5.181E−02 | −2.126E−01 | 1.366E−01 | −1.123E+00 | −1.675E+00 | −3.049E+00 |
| Sixteenth Coefficient (G) | 2.841E−02 | 1.301E−01 | −1.048E−01 | 6.533E−01 | 1.110E+00 | 2.691E+00 |
| Eighteenth Coefficient (H) | −1.140E−02 | −5.739E−02 | 5.570E−02 | −2.779E−01 | −5.384E−01 | −1.711E+00 |
| Twentieth Coefficient (J) | 3.338E−03 | 1.828E−02 | −2.085E−02 | 8.649E−02 | 1.909E−01 | 7.856E−01 |
| Twenty-Second Coefficient (L) | −7.040E−04 | −4.165E−03 | 5.486E−03 | −1.946E−02 | −4.887E−02 | −2.577E−01 |
| Twenty-Fourth Coefficient (M) | 1.040E−04 | 6.619E−04 | −9.939E−04 | 3.079E−03 | 8.789E−03 | 5.890E−02 |
| Twenty-Sixth Coefficient (N) | −1.021E−05 | −6.969E−05 | 1.181E−04 | −3.249E−04 | −1.052E−03 | −8.902E−03 |
| Twenty-Eighth Coefficient (O) | 5.967E−07 | 4.367E−06 | −8.287E−06 | 2.051E−05 | 7.529E−05 | 7.997E−04 |
| Thirtieth Coefficient (P) | −1.571E−08 | −1.233E−07 | 2.604E−07 | −5.856E−07 | −2.433E−06 | −3.232E−05 |

| | S7 | S8 | S9 | S10 | S11 | S12 |
|---|---|---|---|---|---|---|
| Conic Constant (K) | −7.898 | −71.048 | −63.064 | −54.551 | −99.000 | −34.202 |
| Fourth Coefficient (A) | 7.565E−04 | −8.403E−03 | −3.166E−02 | −2.984E−02 | −4.907E−02 | −1.044E−01 |
| Sixth Coefficient (B) | −2.285E−02 | 3.125E−02 | 1.984E−02 | 1.303E−02 | 1.858E−02 | 9.013E−02 |
| Eighth Coefficient (C) | 8.194E−02 | −1.206E−01 | −8.960E−02 | −3.858E−02 | 1.585E−02 | −1.418E−01 |
| Tenth Coefficient (D) | −2.150E−01 | 2.890E−01 | 2.597E−01 | 8.473E−02 | −6.012E−02 | 1.884E−01 |
| Twelfth Coefficient (E) | 4.062E−01 | −4.733E−01 | −4.997E−01 | −1.307E−01 | 9.257E−02 | −1.683E−01 |
| Fourteenth Coefficient (F) | −5.452E−01 | 5.562E−01 | 6.574E−01 | 1.399E−01 | −9.394E−02 | 1.024E−01 |
| Sixteenth Coefficient (G) | 5.218E−01 | −4.805E−01 | −6.089E−01 | −1.059E−01 | 6.715E−02 | −4.419E−02 |
| Eighteenth Coefficient (H) | −3.575E−01 | 3.081E−01 | 4.044E−01 | 5.761E−02 | −3.443E−02 | 1.391E−02 |
| Twentieth Coefficient (J) | 1.754E−01 | −1.463E−01 | −1.936E−01 | −2.263E−02 | 1.270E−02 | −3.233E−03 |
| Twenty-Second Coefficient (L) | −6.094E−02 | 5.066E−02 | 6.635E−02 | 6.377E−03 | −3.334E−03 | 5.526E−04 |
| Twenty-Fourth Coefficient (M) | 1.464E−02 | −1.242E−02 | −1.588E−02 | −1.258E−03 | 6.078E−04 | −6.783E−05 |
| Twenty-Sixth Coefficient (N) | −2.309E−03 | 2.041E−03 | 2.522E−03 | 1.650E−04 | −7.300E−05 | 5.673E−06 |
| Twenty-Eighth Coefficient (O) | 2.152E−04 | −2.013E−04 | −2.390E−04 | −1.296E−05 | 5.190E−06 | −2.899E−07 |
| Thirtieth Coefficient (P) | −8.969E−06 | 9.008E−06 | 1.023E−05 | 4.611E−07 | −1.654E−07 | 6.825E−09 |

TABLE 12-continued

| | S13 | S14 | S15 | S16 | S17 | S18 |
|---|---|---|---|---|---|---|
| Conic Constant (K) | 3.849 | 0.085 | −7.555 | −13.629 | 22.671 | −13.604 |
| Fourth Coefficient (A) | 2.154E−02 | 2.173E−02 | 1.277E−02 | 2.602E−02 | −9.998E−02 | −5.186E−02 |
| Sixth Coefficient (B) | 1.959E−02 | −5.379E−03 | −1.802E−02 | −6.449E−03 | 4.767E−02 | 2.295E−02 |
| Eighth Coefficient (C) | −1.038E−01 | −2.612E−02 | 1.323E−03 | −9.964E−03 | −1.917E−02 | −8.782E−03 |
| Tenth Coefficient (D) | 1.609E−01 | 4.030E−02 | 4.553E−03 | 9.183E−03 | 5.836E−03 | 2.530E−03 |
| Twelfth Coefficient (E) | −1.414E−01 | −3.008E−02 | −3.403E−03 | −4.139E−03 | −1.228E−03 | −5.329E−04 |
| Fourteenth Coefficient (F) | 8.068E−02 | 1.390E−02 | 1.344E−03 | 1.200E−03 | 1.763E−04 | 8.227E−05 |
| Sixteenth Coefficient (G) | −3.191E−02 | −4.326E−03 | −3.523E−04 | −2.413E−04 | −1.743E−05 | −9.391E−06 |
| Eighteenth Coefficient (H) | 9.058E−03 | 9.450E−04 | 6.558E−05 | 3.465E−05 | 1.189E−06 | 7.960E−07 |
| Twentieth Coefficient (J) | −1.871E−03 | −1.473E−04 | −8.809E−06 | −3.581E−06 | −5.522E−08 | −4.982E−08 |
| Twenty-Second Coefficient (L) | 2.803E−04 | 1.634E−05 | 8.421E−07 | 2.641E−07 | 1.662E−09 | 2.265E−09 |
| Twenty-Fourth Coefficient (M) | −2.975E−05 | −1.264E−06 | −5.530E−08 | −1.355E−08 | −2.809E−11 | −7.247E−11 |
| Twenty-Sixth Coefficient (N) | 2.122E−06 | 6.485E−08 | 2.343E−09 | 4.585E−10 | 1.162E−13 | 1.542E−12 |
| Twenty-Eighth Coefficient (O) | −9.121E−08 | −1.985E−09 | −5.693E−11 | −9.194E−12 | 4.016E−15 | −1.953E−14 |
| Thirtieth Coefficient (P) | 1.783E−09 | 2.747E−11 | 5.925E−13 | 8.262E−14 | −5.139E−17 | 1.112E−16 |

Additionally, the optical imaging system 600 configured as described above may have the aberration characteristics illustrated in FIG. 12.

Figure 13:
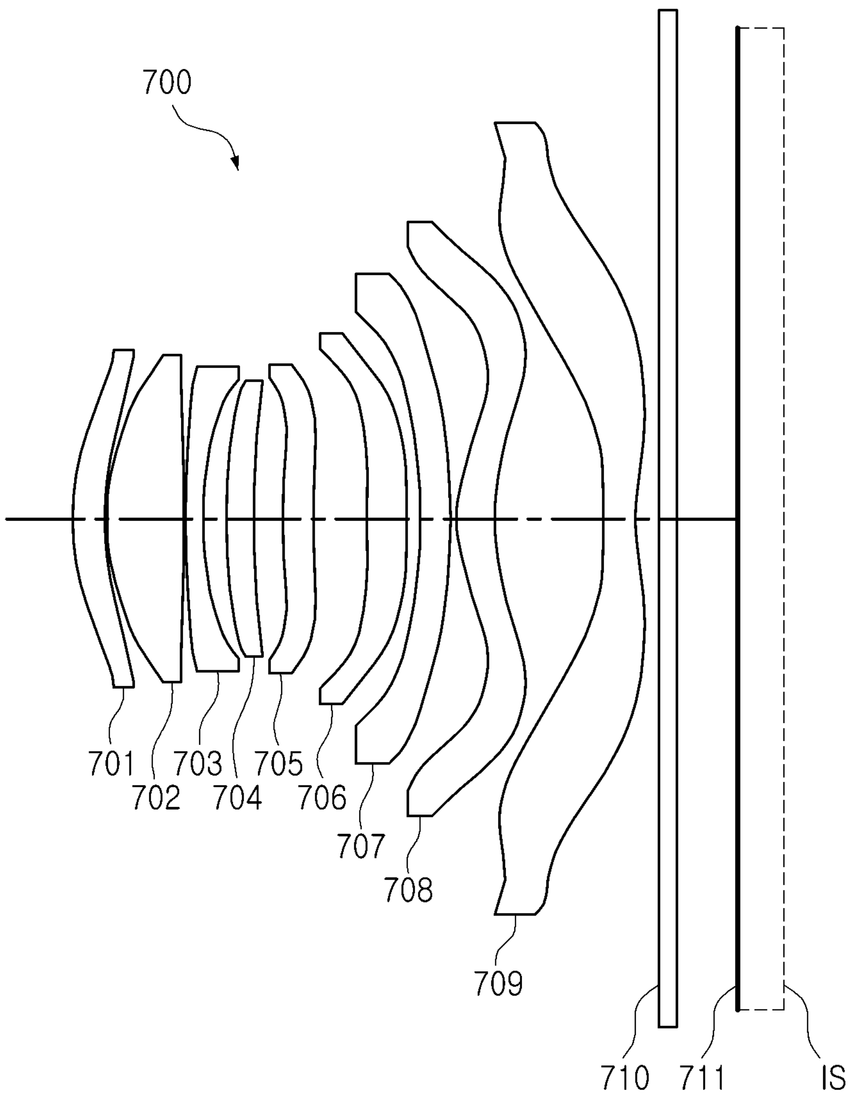
FIG. 13 is a structural view of an optical imaging system according to a seventh embodiment of the present disclosure.
Figure 14:
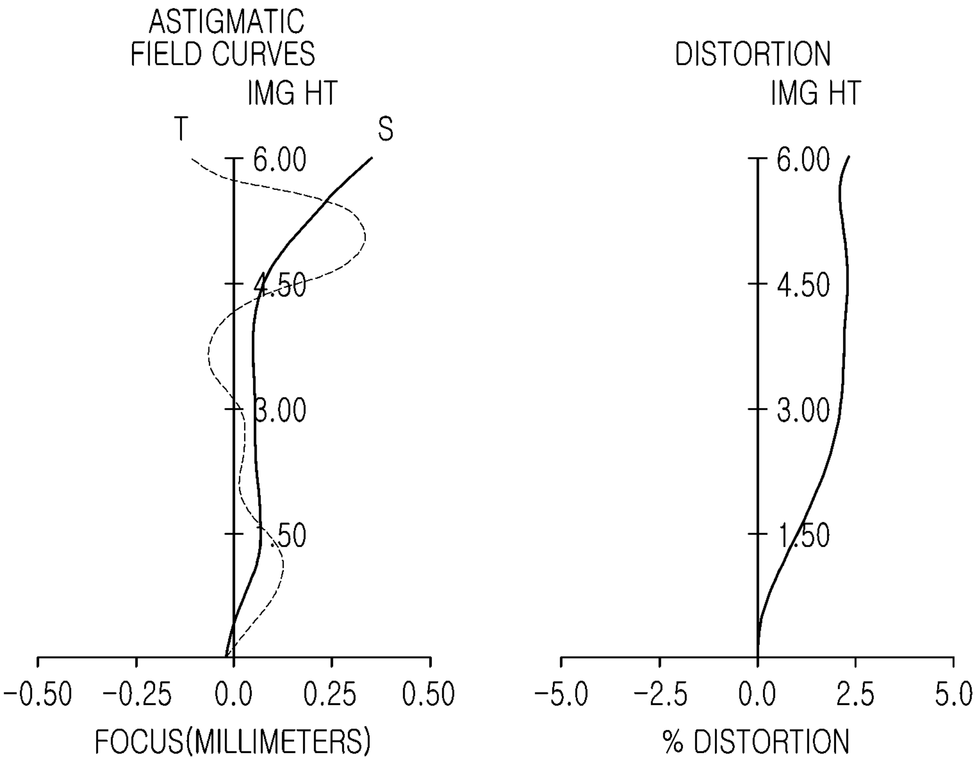
FIG. 14 is a view illustrating an aberration characteristic of the optical imaging system illustrated in FIG. 13.

FIG. 13 is a structural view of an optical imaging system according to a seventh embodiment of the present disclosure, and FIG. 14 is a view illustrating aberration characteristics of the optical imaging system illustrated in FIG. 13.

Referring to FIG. 13, an optical imaging system 700 according to the seventh embodiment of the present disclosure includes a first lens 701, a second lens 702, a third lens 703, a fourth lens 704, a fifth lens 705, a sixth lens 706, a seventh lens 707, an eighth lens 708, and a ninth lens 709, and may further include a filter 710 and an image sensor IS.

The optical imaging system 700 according to the seventh embodiment of the present disclosure may form a focus on an imaging surface 711. The imaging surface 711 may denote a surface on which a focus is formed by the optical imaging system. In an example, the imaging surface 711 may denote one surface of the image sensor IS on which light is received.

The lens characteristics (a radius of curvature, a lens thickness, a distance between lenses, an index of refraction, an Abbe number, and a focal length) of each lens are illustrated in Table 13 below.

TABLE 13

| Surface Number | Element | Radius of Curvature | Thickness or Distance | Index of Refraction | Abbe Number | Focal Length |
|---|---|---|---|---|---|---|
| S1 | First | 3.141 | 0.387 | 1.544 | 55.99 | 48.7246 |
| S2 | Lens | 3.407 | 0.044 | | | |
| S3 | Second | 3.239 | 0.937 | 1.544 | 55.99 | 6.0724 |
| S4 | Lens | 122.813 | 0.034 | | | |
| S5 | Third | 17.242 | 0.210 | 1.639 | 23.49 | −9.6388 |
| S6 | Lens | 4.550 | 0.276 | | | |
| S7 | Fourth | 6.612 | 0.325 | 1.544 | 55.99 | −500.0002 |

TABLE 13-continued

| Surface Number | Element | Radius of Curvature | Thickness or Distance | Index of Refraction | Abbe Number | Focal Length |
|---|---|---|---|---|---|---|
| S8 | Lens | 6.344 | 0.383 | | | |
| S9 | Fifth | 5.373 | 0.377 | 1.671 | 19.24 | 32.8604 |
| S10 | Lens | 6.878 | 0.664 | | | |
| S11 | Sixth | 21.882 | 0.480 | 1.544 | 55.99 | −906.6618 |
| S12 | Lens | 20.793 | 0.169 | | | |
| S13 | Seventh | −6.530 | 0.380 | 1.614 | 25.94 | −40.0063 |
| S14 | Lens | −9.060 | 0.082 | | | |
| S15 | Eighth | 2.116 | 0.474 | 1.544 | 55.99 | 7.957 |
| S16 | Lens | 3.796 | 1.329 | | | |
| S17 | Ninth | 29.925 | 0.400 | 1.535 | 55.74 | −6.2637 |
| S18 | Lens | 3.010 | 0.304 | | | |
| S19 | Filter | Infinity | 0.210 | 1.517 | 64.20 | |
| S20 | | Infinity | 0.755 | | | |
| S21 | Imaging Surface | Infinity | | | | |

A total focal length f of the optical imaging system 700 according to the seventh embodiment of the present disclosure is 6.8372 mm, Fno is 1.59, IMG HT is 6 mm, FOV is 80.5°, SWA11 is 19.23°, SWA21 is 33.346°, and f12 is 5.644 mm.

In the seventh embodiment of the present disclosure, the first lens 701 has a positive refractive power, a first surface of the first lens 701 is convex in the paraxial region, and a second surface of the first lens 701 is concave in the paraxial region.

The second lens 702 has a positive refractive power, a first surface of the second lens 702 is convex in the paraxial region, and a second surface of the second lens 702 is concave in the paraxial region.

The third lens 703 has a negative refractive power, a first surface of the third lens 703 is convex in the paraxial region, and a second surface of the third lens 703 is concave in the paraxial region.

The fourth lens 704 has a negative refractive power, a first surface of the fourth lens 704 is convex in the paraxial region, and a second surface of the fourth lens 704 is concave in the paraxial region.

The fifth lens 705 has a positive refractive power, a first surface of the fifth lens 705 is convex in the paraxial region, and a second surface of the fifth lens 705 is concave in the paraxial region.

The sixth lens 706 has a negative refractive power, a first surface of the sixth lens 706 is convex in the paraxial region, and a second surface of the sixth lens 706 is concave in the paraxial region.

The seventh lens 707 has a negative refractive power, a first surface of the seventh lens 707 is concave in the paraxial region, and a second surface of the seventh lens 707 is convex in the paraxial region.

The eighth lens 708 has a positive refractive power, a first surface of the eighth lens 708 is convex in the paraxial region, and a second surface of the eighth lens 708 is concave in the paraxial region.

The ninth lens 709 has a negative refractive power, a first surface of the ninth lens 709 is convex in the paraxial region, and a second surface of the ninth lens 709 is concave in the paraxial region.

Additionally, one or more of the fifth lens 705 to the ninth lens 709 has at least one inflection point formed on either one or both of the first surface and the second surface thereof.

Each surface of the first lens 701 to the ninth lens 709 has aspherical coefficients as illustrated in Table 14 below. For example, both an object-side surface and an image-side surface of each of the first lens 701 to the ninth lens 709 are aspherical surfaces.

TABLE 14

| | S1 | S2 | S3 | S4 | S5 | S6 |
|---|---|---|---|---|---|---|
| Conic Constant (K) | −5.366 | −12.196 | −4.390 | 99.000 | 1.804 | 4.573 |
| Fourth Coefficient (A) | −1.819E−04 | 1.050E−02 | −3.245E−03 | −1.443E−02 | 1.784E−02 | 7.552E−03 |
| Sixth Coefficient (B) | 8.080E−02 | 9.726E−02 | 1.075E−01 | 6.712E−02 | −1.092E−01 | −7.979E−02 |
| Eighth Coefficient (C) | −2.581E−01 | −5.026E−01 | −4.869E−01 | −2.559E−01 | 2.730E−01 | 2.890E−01 |
| Tenth Coefficient (D) | 4.594E−01 | 1.059E+00 | 1.028E+00 | 5.415E−01 | −4.858E−01 | −7.459E−01 |
| Twelfth Coefficient (E) | −5.310E−01 | −1.325E+00 | −1.308E+00 | −7.139E−01 | 6.499E−01 | 1.360E+00 |
| Fourteenth Coefficient (F) | 4.224E−01 | 1.104E+00 | 1.115E+00 | 6.345E−01 | −6.486E−01 | −1.764E+00 |
| Sixteenth Coefficient (G) | −2.389E−01 | −6.440E−01 | −6.694E−01 | −3.968E−01 | 4.779E−01 | 1.643E+00 |
| Eighteenth Coefficient (H) | 9.762E−02 | 2.698E−01 | 2.899E−01 | 1.784E−01 | −2.582E−01 | −1.103E+00 |
| Twentieth Coefficient (J) | −2.891E−02 | −8.168E−02 | −9.113E−02 | −5.803E−02 | 1.013E−01 | 5.327E−01 |
| Twenty-Second Coefficient (L) | 6.151E−03 | 1.774E−02 | 2.063E−02 | 1.355E−02 | −2.845E−02 | −1.832E−01 |
| Twenty-Fourth Coefficient (M) | −9.161E−04 | −2.696E−03 | −3.280E−03 | −2.216E−03 | 5.559E−03 | 4.370E−02 |
| Twenty-Sixth Coefficient (N) | 9.068E−05 | 2.724E−04 | 3.478E−04 | 2.413E−04 | −7.167E−04 | −6.871E−03 |
| Twenty-Eighth Coefficient (O) | −5.359E−06 | −1.644E−05 | −2.209E−05 | −1.573E−05 | 5.476E−05 | 6.403E−04 |
| Thirtieth Coefficient (P) | 1.431E−07 | 4.486E−07 | 6.361E−07 | 4.646E−07 | −1.876E−06 | −2.678E−05 |

| | S7 | S8 | S9 | S10 | S11 | S12 |
|---|---|---|---|---|---|---|
| Conic Constant (K) | −12.468 | −85.019 | −38.391 | −38.770 | −40.686 | 42.685 |
| Fourth Coefficient (A) | −4.229E−03 | −1.922E−02 | −5.467E−02 | −3.299E−02 | −6.148E−02 | −9.298E−02 |
| Sixth Coefficient (B) | −6.410E−02 | 9.252E−02 | 1.771E−01 | 2.161E−02 | 5.915E−02 | 5.608E−02 |
| Eighth Coefficient (C) | 3.089E−01 | −3.736E−01 | −6.273E−01 | −3.238E−02 | −9.317E−02 | −5.770E−02 |
| Tenth Coefficient (D) | −7.754E−01 | 9.755E−01 | 1.454E+00 | 1.890E−02 | 1.296E−01 | 4.912E−02 |
| Twelfth Coefficient (E) | 1.283E+00 | −1.696E+00 | −2.324E+00 | 2.377E−02 | −1.328E−01 | −2.072E−02 |
| Fourteenth Coefficient (F) | −1.492E+00 | 2.044E+00 | 2.642E+00 | −6.449E−02 | 9.732E−02 | −2.091E−03 |
| Sixteenth Coefficient (G) | 1.251E+00 | −1.757E+00 | −2.177E+00 | 7.066E−02 | −5.078E−02 | 7.625E−03 |
| Eighteenth Coefficient (H) | −7.624E−01 | 1.094E+00 | 1.313E+00 | −4.753E−02 | 1.870E−02 | −4.622E−03 |
| Twentieth Coefficient (J) | 3.370E−01 | −4.945E−01 | −5.791E−01 | 2.141E−02 | −4.744E−03 | 1.606E−03 |
| Twenty-Second Coefficient (L) | −1.067E−01 | 1.608E−01 | 1.846E−01 | −6.598E−03 | 7.853E−04 | −3.651E−04 |

TABLE 14-continued

| | | | | | | |
|---|---|---|---|---|---|---|
| Twenty-Fourth Coefficient (M) | 2.359E−02 | −3.661E−02 | −4.137E−02 | 1.376E−03 | −7.384E−05 | 5.553E−05 |
| Twenty-Sixth Coefficient (N) | −3.449E−03 | 5.544E−03 | 6.182E−03 | −1.858E−04 | 1.953E−06 | −5.467E−06 |
| Twenty-Eighth Coefficient (O) | 2.998E−04 | −5.013E−04 | −5.530E−04 | 1.464E−05 | 2.713E−07 | 3.158E−07 |
| Thirtieth Coefficient (P) | −1.172E−05 | 2.048E−05 | 2.239E−05 | −5.105E−07 | −1.956E−08 | −8.131E−09 |

| | S13 | S14 | S15 | S16 | S17 | S18 |
|---|---|---|---|---|---|---|
| Conic Constant (K) | 2.674 | 0.950 | −6.391 | −11.387 | 30.305 | −12.571 |
| Fourth Coefficient (A) | 3.542E−02 | 6.138E−03 | 8.764E−03 | 3.226E−02 | −9.175E−02 | −4.872E−02 |
| Sixth Coefficient (B) | −1.537E−02 | 9.742E−04 | −8.107E−03 | −1.624E−02 | 3.659E−02 | 1.834E−02 |
| Eighth Coefficient (C) | −3.588E−02 | −1.798E−02 | −4.227E−03 | −5.635E−04 | −1.243E−02 | −5.870E−03 |
| Tenth Coefficient (D) | 6.830E−02 | 2.791E−02 | 7.247E−03 | 4.213E−03 | 3.419E−03 | 1.456E−03 |
| Twelfth Coefficient (E) | −5.668E−02 | −2.190E−02 | −4.697E−03 | −2.549E−03 | −6.760E−04 | −2.688E−04 |
| Fourteenth Coefficient (F) | 2.808E−02 | 1.053E−02 | 1.827E−03 | 8.707E−04 | 9.228E−05 | 3.660E−05 |
| Sixteenth Coefficient (G) | −9.131E−03 | −3.372E−03 | −4.747E−04 | −1.961E−04 | −8.674E−06 | −3.701E−06 |
| Eighteenth Coefficient (H) | 2.037E−03 | 7.523E−04 | 8.597E−05 | 3.059E−05 | 5.605E−07 | 2.798E−07 |
| Twentieth Coefficient (J) | −3.186E−04 | −1.191E−04 | −1.101E−05 | −3.361E−06 | −2.447E−08 | −1.579E−08 |
| Twenty-Second Coefficient (L) | 3.536E−05 | 1.336E−05 | 9.925E−07 | 2.593E−07 | 6.833E−10 | 6.556E−10 |
| Twenty-Fourth Coefficient (M) | −2.807E−06 | −1.040E−06 | −6.143E−08 | −1.372E−08 | −1.035E−11 | −1.938E−11 |
| Twenty-Sixth Coefficient (N) | 1.592E−07 | 5.354E−08 | 2.480E−09 | 4.741E−10 | 2.250E−14 | 3.849E−13 |
| Twenty-Eighth Coefficient (O) | −6.089E−09 | −1.639E−09 | −5.864E−11 | −9.609E−12 | 1.693E−15 | −4.586E−15 |
| Thirtieth Coefficient (P) | 1.202E−10 | 2.261E−11 | 6.148E−13 | 8.651E−14 | −1.845E−17 | 2.470E−17 |

Additionally, the optical imaging system 700 configured as described above may have the aberration characteristics illustrated in FIG. 14.

Figure 15:
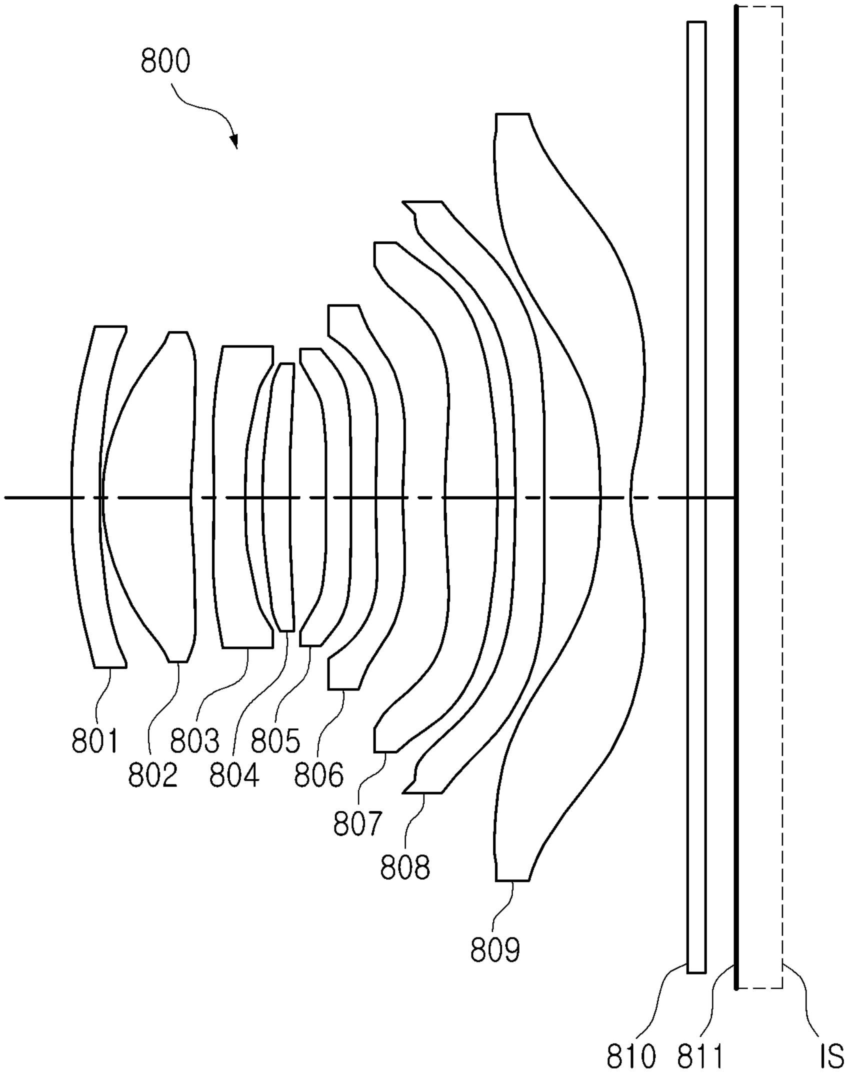
FIG. 15 is a structural view of an optical imaging system according to an eighth embodiment of the present disclosure.
Figure 16:
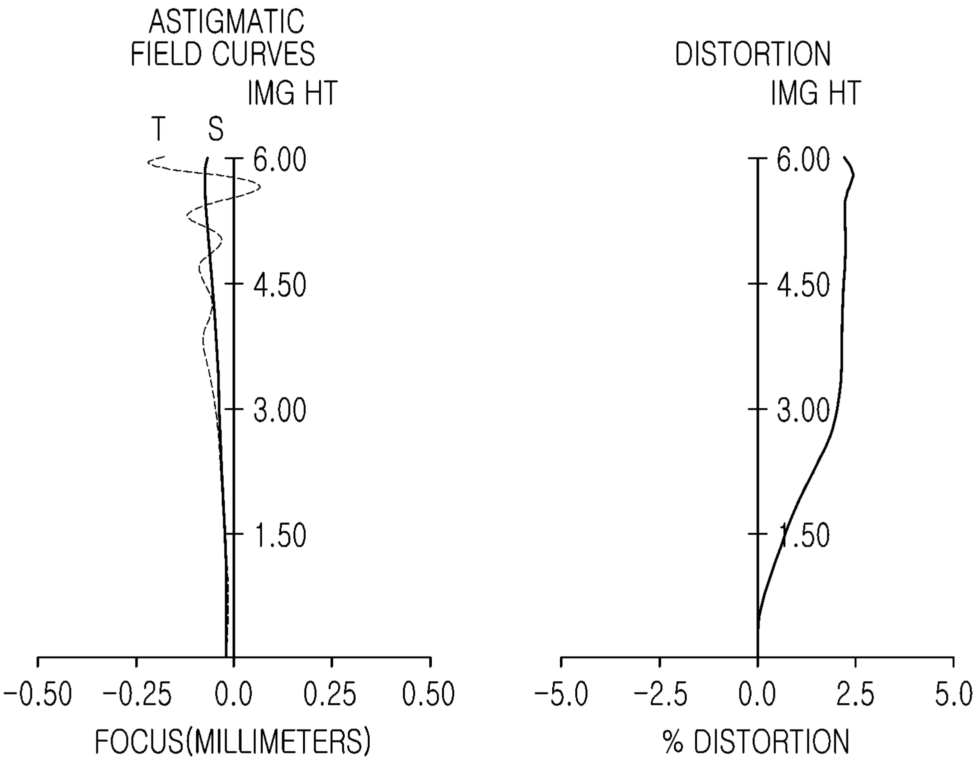
FIG. 16 is a view illustrating aberration characteristics of the optical imaging system illustrated in FIG. 15.

FIG. 15 is a structural view of an optical imaging system according to an eighth embodiment of the present disclosure, and FIG. 16 is a view illustrating aberration characteristics of the optical imaging system illustrated in FIG. 15.

Referring to FIG. 15, an optical imaging system 800 according to the eighth embodiment of the present disclosure includes a first lens 801, a second lens 802, a third lens 803, a fourth lens 804, a fifth lens 805, a sixth lens 806, a seventh lens 807, an eighth lens 808, and a ninth lens 809, and may further include a filter 810 and an image sensor IS.

The optical imaging system 800 according to the eighth embodiment of the present disclosure may form a focus on an imaging surface 811. The imaging surface 811 may denote a surface on which a focus is formed by the optical imaging system. In an example, the imaging surface 811 may denote one surface of the image sensor IS on which light is received.

The lens characteristics (a radius of curvature, a lens thickness, a distance between lenses, an index of refraction, an Abbe number, and a focal length) of each lens are illustrated in Table 15. below

TABLE 15

| Surface Number | Element | Radius of Curvature | Thickness or Distance | Index of Refraction | Abbe Number | Focal Length |
|---|---|---|---|---|---|---|
| S1 | First | 8.772 | 0.360 | 1.544 | 55.99 | 134.0397 |
| S2 | Lens | 9.822 | 0.035 | | | |
| S3 | Second | 2.859 | 1.087 | 1.544 | 55.99 | 6.5404 |
| S4 | Lens | 12.385 | 0.250 | | | |
| S5 | Third | 23.731 | 0.411 | 1.671 | 19.24 | −13.4041 |
| S6 | Lens | 6.532 | 0.207 | | | |
| S7 | Fourth | 6.667 | 0.346 | 1.544 | 55.99 | 20.8252 |
| S8 | Lens | 15.810 | 0.446 | | | |
| S9 | Fifth | 59.414 | 0.301 | 1.671 | 19.24 | −25.5204 |
| S10 | Lens | 13.386 | 0.316 | | | |
| S11 | Sixth | 6.037 | 0.341 | 1.635 | 23.96 | 312.2525 |
| S12 | Lens | 6.088 | 0.507 | | | |
| S13 | Seventh | 8.283 | 0.667 | 1.567 | 37.40 | 6.1804 |
| S14 | Lens | −5.964 | 0.210 | | | |
| S15 | Eighth | −7.236 | 0.374 | 1.544 | 55.99 | −56.9705 |
| S16 | Lens | −9.599 | 0.674 | | | |
| S17 | Ninth | 49.042 | 0.386 | 1.535 | 55.74 | −4.5696 |
| S18 | Lens | 2.331 | 0.700 | | | |
| S19 | Filter | Infinity | 0.210 | 1.517 | 64.20 | |
| S20 | | Infinity | 0.392 | | | |
| S21 | Imaging Surface | Infinity | | | | |

A total focal length f of the optical imaging system 800 according to the eighth embodiment of the present disclosure is 6.8321 mm, Fno is 1.59, IMG HT is 6 mm, FOV is 80.5°, SWA11 is 17.312°, SWA21 is 35.581°, and f12 is 6.343 mm.

In the eighth embodiment of the present disclosure, the first lens 801 has a positive refractive power, a first surface of the first lens 801 is convex in the paraxial region, and a second surface of the first lens 801 is concave in the paraxial region.

The second lens 802 has a positive refractive power, a first surface of the second lens 802 is convex in the paraxial region, and the second surface of the second lens 802 is concave in the paraxial region.

The third lens 803 has a negative refractive power, a first surface of the third lens 803 is convex in the paraxial region, and a second surface of the third lens 803 is concave in the paraxial region.

The fourth lens 804 has a positive refractive power, a first surface of the fourth lens 804 is convex in the paraxial region, and a second surface of the fourth lens 804 is concave in the paraxial region.

The fifth lens 805 has a negative refractive power, a first surface of the fifth lens 805 is convex in the paraxial region, and a second surface of the fifth lens 805 is concave in the paraxial region.

The sixth lens 806 has a positive refractive power, a first surface of the sixth lens 806 is convex in the paraxial region, and a second surface of the sixth lens 806 is concave in the paraxial region.

The seventh lens 807 has a positive refractive power, a first surface and a second surface of the seventh lens 807 are convex in the paraxial region.

The eighth lens 808 has a negative refractive power, a first surface of the eighth lens 808 is concave in the paraxial region, and a second surface of the eighth lens 808 is convex in the paraxial region.

The ninth lens 809 has a negative refractive power, a first surface of the ninth lens 809 is convex in the paraxial region, and a second surface of the ninth lens 809 is concave in the paraxial region.

Additionally, one or more of the fifth lens 805 to the ninth lens 809 has at least one inflection point formed on either one or both of the first surface and the second surface thereof.

Each surface of the first lens 801 to the ninth lens 809 has aspherical coefficients as illustrated in Table 16 below. For example, both an object-side surface and an image-side surface of each of the first lens 801 to the ninth lens 809 are aspherical surfaces.

TABLE 16

| | S1 | S2 | S3 | S4 | S5 | S6 |
|---|---|---|---|---|---|---|
| Conic Constant (K) | 7.331 | 13.780 | −1.524 | −85.514 | 36.881 | 12.237 |
| Fourth Coefficient (A) | −2.684E−03 | −9.462E−03 | −8.605E−03 | −9.076E−03 | −8.603E−03 | −7.954E−03 |
| Sixth Coefficient (B) | −2.662E−03 | 1.119E−03 | 5.403E−02 | 1.137E−02 | 1.159E−03 | 4.750E−03 |
| Eighth Coefficient (C) | −3.088E−03 | −1.070E−03 | −1.610E−01 | −4.333E−02 | 5.989E−03 | 1.483E−02 |
| Tenth Coefficient (D) | 1.502E−02 | 1.321E−02 | 3.165E−01 | 9.115E−02 | −1.432E−03 | −9.782E−02 |
| Twelfth Coefficient (E) | −2.234E−02 | −2.371E−02 | −4.116E−01 | −1.259E−01 | −1.450E−02 | 3.012E−01 |
| Fourteenth Coefficient (F) | 1.989E−02 | 2.305E−02 | 3.690E−01 | 1.211E−01 | 3.443E−02 | −5.599E−01 |
| Sixteenth Coefficient (G) | −1.195E−02 | −1.470E−02 | −2.349E−01 | −8.306E−02 | −4.261E−02 | 6.872E−01 |
| Eighteenth Coefficient (H) | 5.067E−03 | 6.592E−03 | 1.079E−01 | 4.099E−02 | 3.356E−02 | −5.810E−01 |
| Twentieth Coefficient (J) | −1.535E−03 | −2.135E−03 | −3.582E−02 | −1.457E−02 | −1.777E−02 | 3.443E−01 |
| Twenty-Second Coefficient (L) | 3.309E−04 | 5.000E−04 | 8.527E−03 | 3.693E−03 | 6.417E−03 | −1.429E−01 |
| Twenty-Fourth Coefficient (M) | −4.957E−05 | −8.282E−05 | −1.418E−03 | −6.504E−04 | −1.560E−03 | 4.068E−02 |
| Twenty-Sixth Coefficient (N) | 4.905E−06 | 9.209E−06 | 1.563E−04 | 7.559E−05 | 2.444E−04 | −7.574E−03 |
| Twenty-Eighth Coefficient (O) | −2.883E−07 | −6.164E−07 | −1.027E−05 | −5.209E−06 | −2.230E−05 | 8.306E−04 |
| Thirtieth Coefficient (P) | 7.621E−09 | 1.875E−08 | 3.041E−07 | 1.612E−07 | 9.003E−07 | −4.068E−05 |

| | S7 | S8 | S9 | S10 | S11 | S12 |
|---|---|---|---|---|---|---|
| Conic Constant (K) | −4.031 | −54.103 | 99.000 | −15.990 | −31.214 | 3.166 |
| Fourth Coefficient (A) | −3.502E−03 | −2.445E−03 | −3.598E−02 | −5.585E−02 | −8.502E−02 | −1.049E−01 |
| Sixth Coefficient (B) | 1.076E−02 | 1.569E−02 | 1.597E−02 | 4.731E−02 | 6.952E−02 | 6.110E−02 |
| Eighth Coefficient (C) | −5.584E−02 | −8.493E−02 | 3.931E−02 | −3.645E−02 | −5.807E−02 | −4.253E−02 |
| Tenth Coefficient (D) | 1.530E−01 | 2.437E−01 | −2.831E−01 | −3.559E−02 | 2.633E−02 | 2.245E−02 |
| Twelfth Coefficient (E) | −2.845E−01 | −4.706E−01 | 7.524E−01 | 1.471E−01 | 1.522E−02 | −5.274E−03 |
| Fourteenth Coefficient (F) | 3.792E−01 | 6.319E−01 | −1.211E+00 | −2.177E−01 | −4.226E−02 | −2.929E−03 |

TABLE 16-continued

| | | | | | | |
|---|---|---|---|---|---|---|
| Sixteenth Coefficient (G) | −3.696E−01 | −6.023E−01 | 1.310E+00 | 1.962E−01 | 4.176E−02 | 3.322E−03 |
| Eighteenth Coefficient (H) | 2.650E−01 | 4.121E−01 | −9.911E−01 | −1.185E−01 | −2.571E−02 | −1.493E−03 |
| Twentieth Coefficient (J) | −1.390E−01 | −2.027E−01 | 5.317E−01 | 4.940E−02 | 1.089E−02 | 3.899E−04 |
| Twenty-Second Coefficient (L) | 5.255E−02 | 7.101E−02 | −2.016E−01 | −1.420E−02 | −3.247E−03 | −6.192E−05 |
| Twenty-Fourth Coefficient (M) | −1.390E−02 | −1.726E−02 | 5.284E−02 | 2.742E−03 | 6.733E−04 | 5.637E−06 |
| Twenty-Sixth Coefficient (N) | 2.435E−03 | 2.762E−03 | −9.111E−03 | −3.359E−04 | −9.254E−05 | −2.232E−07 |
| Twenty-Eighth Coefficient (O) | −2.535E−04 | −2.614E−04 | 9.298E−04 | 2.307E−05 | 7.568E−06 | −3.306E−09 |
| Thirtieth Coefficient (P) | 1.186E−05 | 1.106E−05 | −4.255E−05 | −6.467E−07 | −2.780E−07 | 4.191E−10 |

| | S13 | S14 | S15 | S16 | S17 | S18 |
|---|---|---|---|---|---|---|
| Conic Constant (K) | 4.876 | −1.931 | −0.840 | −1.426 | 62.666 | −11.784 |
| Fourth Coefficient (A) | −2.181E−02 | 7.091E−02 | 1.486E−01 | 9.821E−02 | −1.161E−01 | −5.944E−02 |
| Sixth Coefficient (B) | 8.412E−03 | −7.207E−02 | −1.767E−01 | −1.099E−01 | 5.165E−02 | 2.533E−02 |
| Eighth Coefficient (C) | −1.940E−02 | 3.110E−02 | 1.135E−01 | 7.235E−02 | −1.442E−02 | −7.082E−03 |
| Tenth Coefficient (D) | 2.384E−02 | 2.493E−03 | −4.603E−02 | −3.207E−02 | 2.549E−03 | 1.270E−03 |
| Twelfth Coefficient (E) | −1.743E−02 | −9.654E−03 | 1.228E−02 | 1.004E−02 | −2.813E−04 | −1.396E−04 |
| Fourteenth Coefficient (F) | 8.346E−03 | 5.315E−03 | −2.154E−03 | −2.299E−03 | 1.819E−05 | 6.850E−06 |
| Sixteenth Coefficient (G) | −2.791E−03 | −1.654E−03 | 2.376E−04 | 3.927E−04 | −4.617E−07 | 4.350E−07 |
| Eighteenth Coefficient (H) | 6.749E−04 | 3.394E−04 | −1.359E−05 | −5.058E−05 | −2.490E−08 | −1.079E−07 |
| Twentieth Coefficient (J) | −1.190E−04 | −4.812E−05 | −1.178E−07 | 4.895E−06 | 2.736E−09 | 9.552E−09 |
| Twenty-Second Coefficient (L) | 1.513E−05 | 4.756E−06 | 8.295E−08 | −3.499E−07 | −1.042E−10 | −5.036E−10 |
| Twenty-Fourth Coefficient (M) | −1.344E−06 | −3.219E−07 | −6.321E−09 | 1.786E−08 | 1.453E−12 | 1.699E−11 |
| Twenty-Sixth Coefficient (N) | 7.877E−08 | 1.422E−08 | 2.303E−10 | −6.129E−10 | 2.153E−14 | −3.607E−13 |
| Twenty-Eighth Coefficient (O) | −2.725E−09 | −3.683E−10 | −3.955E−12 | 1.264E−11 | −9.995E−16 | 4.409E−15 |
| Thirtieth Coefficient (P) | 4.206E−11 | 4.232E−12 | 2.115E−14 | −1.181E−13 | 9.930E−18 | −2.371E−17 |

Additionally, the optical imaging system 800 configured as described above may have the aberration characteristics illustrated in FIG. 16.

Figure 17:
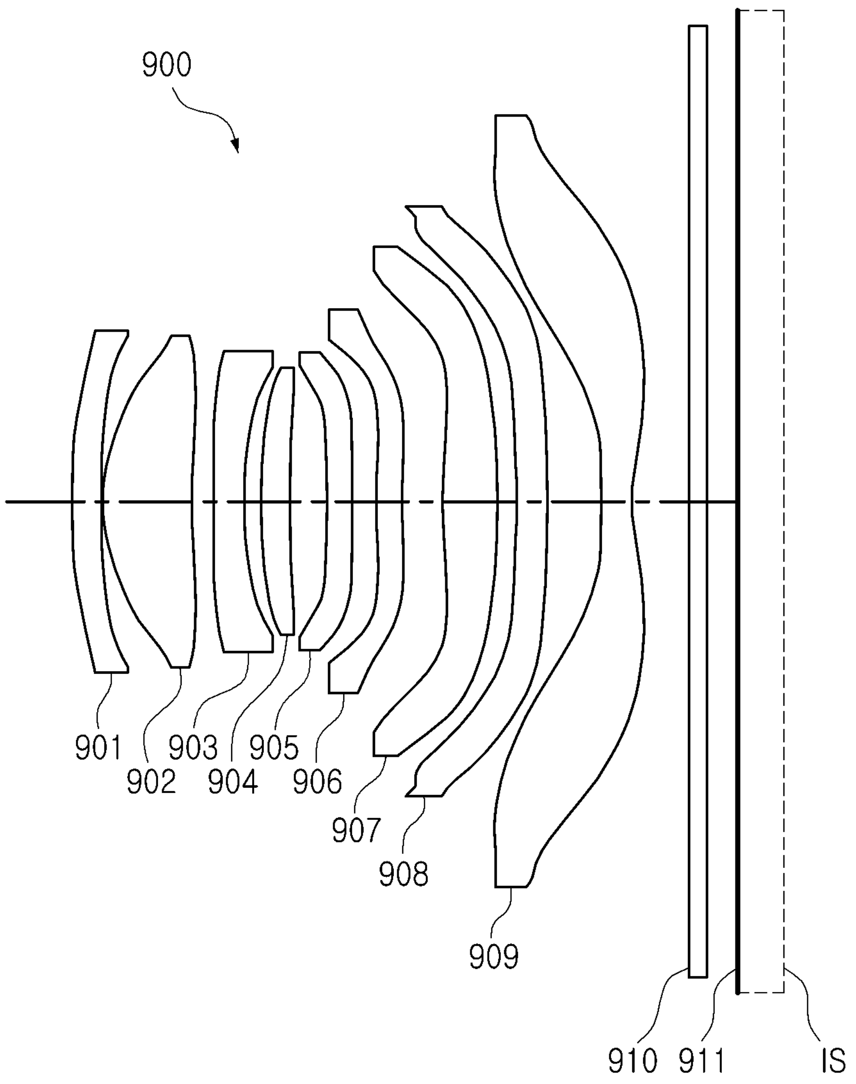
FIG. 17 is a structural view of an optical imaging system according to a ninth embodiment of the present disclosure.
Figure 18:
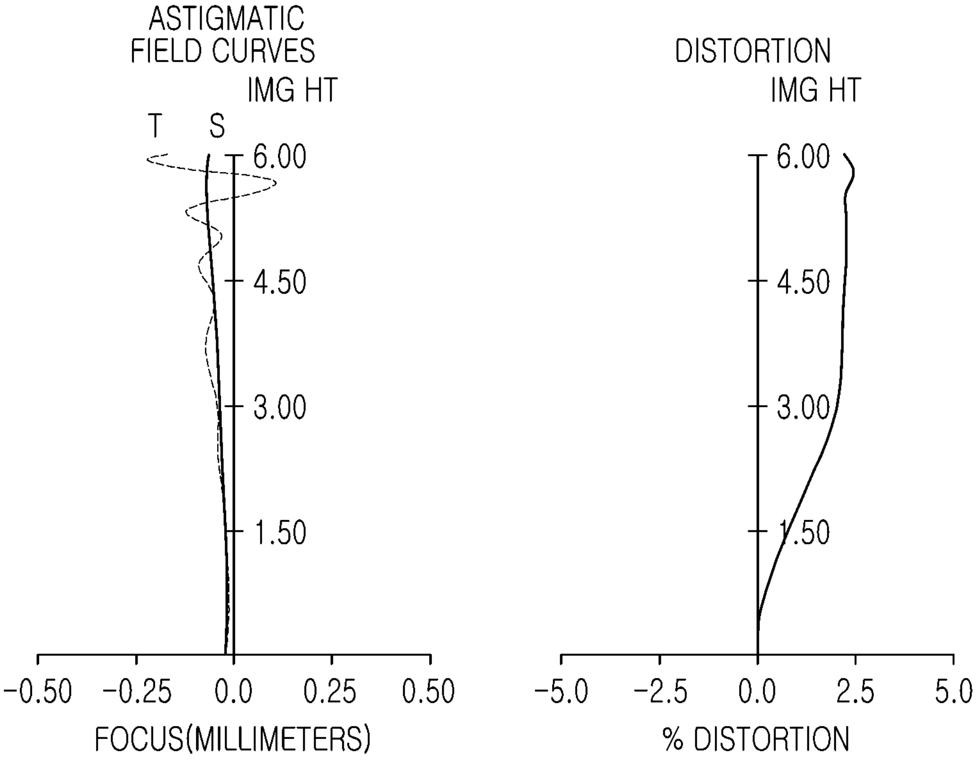
FIG. 18 is a view illustrating aberration characteristics of the optical imaging system illustrated in FIG. 17.

FIG. 17 is a structural view of an optical imaging system according to a ninth embodiment of the present disclosure, and FIG. 18 is a view illustrating aberration characteristics of the optical imaging system illustrated in FIG. 17.

Referring to FIG. 17, an optical imaging system 900 according to the ninth embodiment of the present disclosure includes a first lens 901, a second lens 902, a third lens 903, a fourth lens 904, a fifth lens 905, a sixth lens 906, a seventh lens 907, an eighth lens 908, and a ninth lens 909, and may further include a filter 910 and an image sensor IS.

The optical imaging system 900 according to the ninth embodiment of the present disclosure may form a focus on an imaging surface 911. The imaging surface 911 may denote a surface on which a focus is formed by the optical imaging system. In an example, the imaging surface 911 may denote one surface of the image sensor IS on which light is received.

The lens characteristics (a radius of curvature, a lens thickness, a distance between lenses, an index of refraction, an Abbe number, and a focal length) of each lens are illustrated in Table 17 below.

TABLE 17

| Surface Number | Element | Radius of Curvature | Thickness or Distance | Index of Refraction | Abbe Number | Focal Length |
|---|---|---|---|---|---|---|
| S1 | First | 8.712 | 0.360 | 1.544 | 55.99 | 132.1836 |
| S2 | Lens | 9.763 | 0.035 | | | |
| S3 | Second | 2.862 | 1.084 | 1.544 | 55.99 | 6.5405 |
| S4 | Lens | 12.444 | 0.253 | | | |
| S5 | Third | 24.005 | 0.399 | 1.671 | 19.24 | −13.3799 |
| S6 | Lens | 6.546 | 0.206 | | | |
| S7 | Fourth | 6.614 | 0.350 | 1.544 | 55.99 | 20.9612 |
| S8 | Lens | 15.365 | 0.452 | | | |
| S9 | Fifth | 58.344 | 0.307 | 1.671 | 19.24 | −29.276 |
| S10 | Lens | 14.793 | 0.320 | | | |
| S11 | Sixth | 6.329 | 0.318 | 1.635 | 23.96 | −423.8648 |
| S12 | Lens | 6.064 | 0.494 | | | |
| S13 | Seventh | 8.207 | 0.697 | 1.567 | 37.40 | 6.1743 |
| S14 | Lens | −5.985 | 0.210 | | | |
| S15 | Eighth | −7.203 | 0.381 | 1.544 | 55.99 | −58.3079 |
| S16 | Lens | −9.481 | 0.673 | | | |
| S17 | Ninth | 49.243 | 0.380 | 1.535 | 55.74 | −4.5756 |
| S18 | Lens | 2.335 | 0.700 | | | |

TABLE 17-continued

| Surface Number | Element | Radius of Curvature | Thickness or Distance | Index of Refraction | Abbe Number | Focal Length |
|---|---|---|---|---|---|---|
| S19 | Filter | Infinity | 0.210 | 1.517 | 64.20 | |
| S20 | | Infinity | 0.391 | | | |
| S21 | Imaging Surface | Infinity | | | | |

A total focal length f of the optical imaging system 900 according to the ninth embodiment of the present disclosure is 6.8322 mm, Fno is 1.59, IMG HT is 6 mm, FOV is 80.5°, SWA11 is 17.443°, SWA21 is 35.742°, and f12 is 6.340 mm.

In the ninth embodiment of the present disclosure, the first lens 901 has a positive refractive power, a first surface of the first lens 901 is convex in the paraxial region, and a second surface of the first lens 901 is concave in the paraxial region.

The second lens 902 has a positive refractive power, a first surface of the second lens 902 is convex in the paraxial region, and a second surface of the second lens 902 is concave in the paraxial region.

The third lens 903 has a negative refractive power, a first surface of the third lens 903 is convex in the paraxial region, and a second surface of the third lens 903 is concave in the paraxial region.

The fourth lens 904 has a positive refractive power, a first surface of the fourth lens 904 is convex in the paraxial region, and a second surface of the fourth lens 904 is concave in the paraxial region.

The fifth lens 905 has a negative refractive power, a first surface of the fifth lens 905 is convex in the paraxial region, and a second surface of the fifth lens 905 is concave in the paraxial region.

The sixth lens 906 has a negative refractive power, a first surface of the sixth lens 906 is convex in the paraxial region, and a second surface of the sixth lens 906 is concave in the paraxial region.

The seventh lens 907 has a positive refractive power, and a first surface and a second surface of the seventh lens 907 are convex in the paraxial region.

The eighth lens 908 has a negative refractive power, a first surface of the eighth lens 908 is concave in the paraxial region, and a second surface of the eighth lens 908 is convex in the paraxial region.

The ninth lens 909 has a negative refractive power, a first surface of the ninth lens 909 is convex in the paraxial region, and a second surface of the ninth lens 909 is concave in the paraxial region.

Additionally, one or more of the fifth lens 905 to the ninth lens 909 has at least one inflection point formed on either one or both of the first surface and the second surface thereof.

Each surface of the first lens 901 to the ninth lens 909 has aspherical coefficients as illustrated in Table 18 below. For example, both an object-side surface and an image-side surface of each of the first lens 901 to the ninth lens 909 are aspherical surfaces.

TABLE 18

| | S1 | S2 | S3 | S4 | S5 | S6 |
|---|---|---|---|---|---|---|
| Conic Constant (K) | 7.273 | 13.748 | −1.509 | −83.951 | 41.464 | 12.217 |
| Fourth Coefficient (A) | −3.185E−03 | −9.207E−03 | −7.718E−03 | −9.014E−03 | −8.480E−03 | −7.706E−03 |
| Sixth Coefficient (B) | −1.480E−03 | −3.201E−03 | 4.718E−02 | 1.049E−02 | 4.320E−04 | 4.334E−03 |
| Eighth Coefficient (C) | −5.623E−03 | 1.223E−02 | −1.406E−01 | −4.043E−02 | 7.433E−03 | 9.311E−03 |
| Tenth Coefficient (D) | 1.859E−02 | −9.521E−03 | 2.805E−01 | 8.567E−02 | −2.576E−03 | −6.174E−02 |
| Twelfth Coefficient (E) | −2.560E−02 | 2.006E−03 | −3.693E−01 | −1.190E−01 | −1.451E−02 | 1.953E−01 |
| Fourteenth Coefficient (F) | 2.186E−02 | 2.498E−03 | 3.339E−01 | 1.151E−01 | 3.516E−02 | −3.717E−01 |
| Sixteenth Coefficient (G) | −1.277E−02 | −2.758E−03 | −2.136E−01 | −7.921E−02 | −4.317E−02 | 4.647E−01 |
| Eighteenth Coefficient (H) | 5.293E−03 | 1.486E−03 | 9.833E−02 | 3.919E−02 | 3.370E−02 | −3.989E−01 |
| Twentieth Coefficient (J) | −1.575E−03 | −5.294E−04 | −3.269E−02 | −1.395E−02 | −1.772E−02 | 2.395E−01 |
| Twenty-Second Coefficient (L) | 3.346E−04 | 1.334E−04 | 7.777E−03 | 3.538E−03 | 6.363E−03 | −1.005E−01 |
| Twenty-Fourth Coefficient (M) | −4.958E−05 | −2.381E−05 | −1.291E−03 | −6.229E−04 | −1.541E−03 | 2.887E−02 |
| Twenty-Sixth Coefficient (N) | 4.867E−06 | 2.871E−06 | 1.421E−04 | 7.233E−05 | 2.408E−04 | −5.419E−03 |
| Twenty-Eighth Coefficient (O) | −2.845E−07 | −2.093E−07 | −9.304E−06 | −4.978E−06 | −2.193E−05 | 5.984E−04 |
| Thirtieth Coefficient (P) | 7.496E−09 | 6.931E−09 | 2.746E−07 | 1.538E−07 | 8.844E−07 | −2.949E−05 |

| | S7 | S8 | S9 | S10 | S11 | S12 |
|---|---|---|---|---|---|---|
| Conic Constant (K) | −4.014 | −52.220 | −24.462 | −9.279 | −30.187 | 3.165 |
| Fourth Coefficient (A) | −3.242E−03 | −3.014E−03 | −4.247E−02 | −5.913E−02 | −8.705E−02 | −1.090E−01 |
| Sixth Coefficient (B) | 1.068E−02 | 1.974E−02 | 6.865E−02 | 8.532E−02 | 6.766E−02 | 7.252E−02 |
| Eighth Coefficient (C) | −5.959E−02 | −9.936E−02 | −1.746E−01 | −1.722E−01 | −2.306E−02 | −5.892E−02 |

TABLE 18-continued

| | | | | | | |
|---|---|---|---|---|---|---|
| Tenth Coefficient (D) | 1.708E−01 | 2.720E−01 | 2.643E−01 | 2.569E−01 | −7.920E−02 | 3.985E−02 |
| Twelfth Coefficient (E) | −3.257E−01 | −4.997E−01 | −2.070E−01 | −2.834E−01 | 1.913E−01 | −2.002E−02 |
| Fourteenth Coefficient (F) | 4.384E−01 | 6.395E−01 | −1.435E−02 | 2.337E−01 | −2.349E−01 | 6.884E−03 |
| Sixteenth Coefficient (G) | −4.264E−01 | −5.822E−01 | 2.263E−01 | −1.478E−01 | 1.884E−01 | −1.649E−03 |
| Eighteenth Coefficient (H) | 3.027E−01 | 3.812E−01 | −2.722E−01 | 7.334E−02 | −1.053E−01 | 3.778E−04 |
| Twentieth Coefficient (J) | −1.565E−01 | −1.796E−01 | 1.829E−01 | −2.879E−02 | 4.185E−02 | −1.244E−04 |
| Twenty-Second Coefficient (L) | 5.815E−02 | 6.029E−02 | −7.924E−02 | 8.801E−03 | −1.183E−02 | 3.936E−05 |
| Twenty-Fourth Coefficient (M) | −1.510E−02 | −1.404E−02 | 2.265E−02 | −2.005E−03 | 2.324E−03 | −8.227E−06 |
| Twenty-Sixth Coefficient (N) | 2.600E−03 | 2.150E−03 | −4.145E−03 | 3.162E−04 | −3.019E−04 | 1.027E−06 |
| Twenty-Eighth Coefficient (O) | −2.661E−04 | −1.945E−04 | 4.407E−04 | −3.044E−05 | 2.330E−05 | −6.999E−08 |
| Thirtieth Coefficient (P) | 1.225E−05 | 7.850E−06 | −2.074E−05 | 1.337E−06 | −8.081E−07 | 2.011E−09 |

| | S13 | S14 | S15 | S16 | S17 | S18 |
|---|---|---|---|---|---|---|
| Conic Constant (K) | 4.861 | −2.019 | −0.848 | −1.391 | 62.777 | −11.861 |
| Fourth Coefficient (A) | −2.322E−02 | 7.284E−02 | 1.490E−01 | 9.799E−02 | −1.162E−01 | −5.958E−02 |
| Sixth Coefficient (B) | 1.074E−02 | −7.707E−02 | −1.778E−01 | −1.105E−01 | 5.157E−02 | 2.550E−02 |
| Eighth Coefficient (C) | −2.136E−02 | 3.877E−02 | 1.149E−01 | 7.336E−02 | −1.435E−02 | −7.163E−03 |
| Tenth Coefficient (D) | 2.484E−02 | −5.016E−03 | −4.699E−02 | −3.272E−02 | 2.516E−03 | 1.276E−03 |
| Twelfth Coefficient (E) | −1.790E−02 | −4.923E−03 | 1.269E−02 | 1.027E−02 | −2.703E−04 | −1.328E−04 |
| Fourteenth Coefficient (F) | 8.601E−03 | 3.329E−03 | −2.272E−03 | −2.347E−03 | 1.565E−05 | 4.213E−06 |
| Sixteenth Coefficient (G) | −2.914E−03 | −1.078E−03 | 2.609E−04 | 3.992E−04 | −6.309E−08 | 9.235E−07 |
| Eighteenth Coefficient (H) | 7.156E−04 | 2.211E−04 | −1.682E−05 | −5.110E−05 | −6.795E−08 | −1.636E−07 |
| Twentieth Coefficient (J) | −1.281E−04 | −3.077E−05 | 1.973E−07 | 4.913E−06 | 5.970E−09 | 1.378E−08 |
| Twenty-Second Coefficient (L) | 1.648E−05 | 2.948E−06 | 6.157E−08 | −3.487E−07 | −2.731E−10 | −7.209E−10 |
| Twenty-Fourth Coefficient (M) | −1.477E−06 | −1.910E−07 | −5.349E−09 | 1.767E−08 | 7.475E−12 | 2.451E−11 |
| Twenty-Sixth Coefficient (N) | 8.715E−08 | 7.964E−09 | 2.027E−10 | −6.026E−10 | −1.185E−13 | −5.290E−13 |
| Twenty-Eighth Coefficient (O) | −3.031E−09 | −1.912E−10 | −3.534E−12 | 1.235E−11 | 9.163E−16 | 6.606E−15 |
| Thirtieth Coefficient (P) | 4.696E−11 | 1.982E−12 | 1.885E−14 | −1.146E−13 | −1.782E−18 | −3.644E−17 |

Additionally, the optical imaging system 900 configured as described above may have the aberration characteristics illustrated in FIG. 18.

Figure 19:
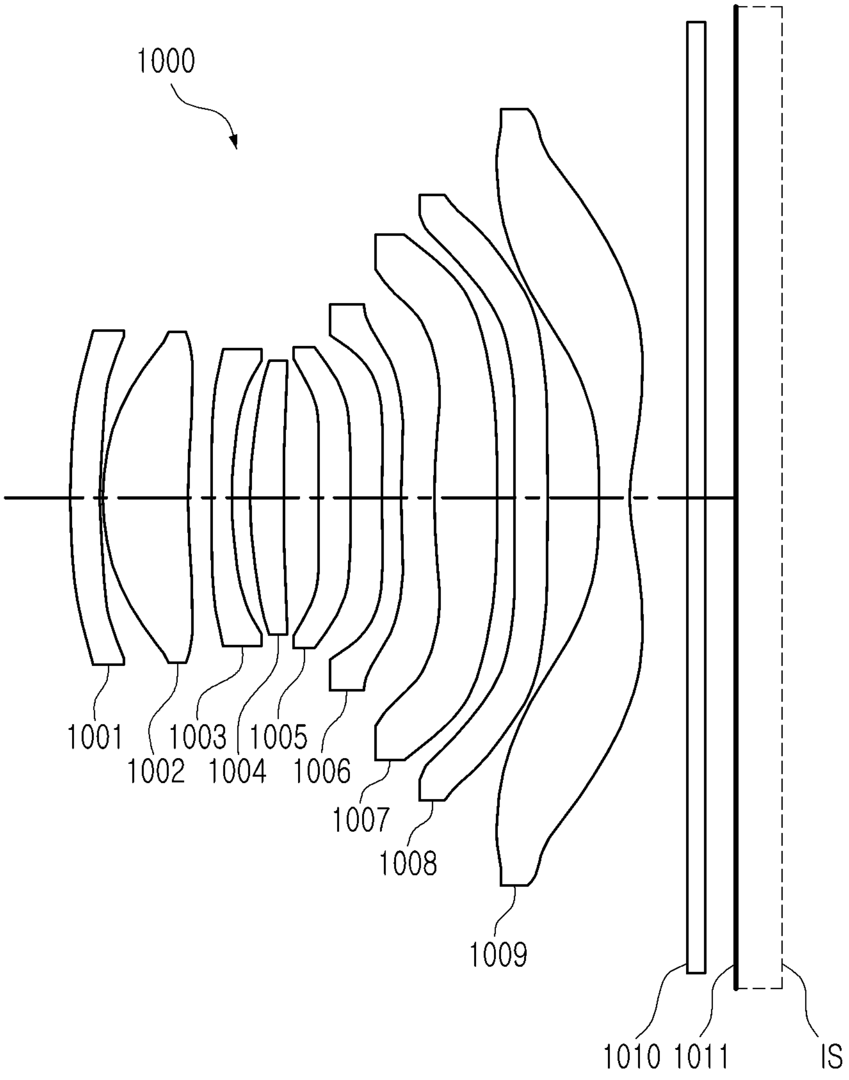
FIG. 19 is a structural view of an optical imaging system according to a tenth embodiment of the present disclosure.
Figure 20:
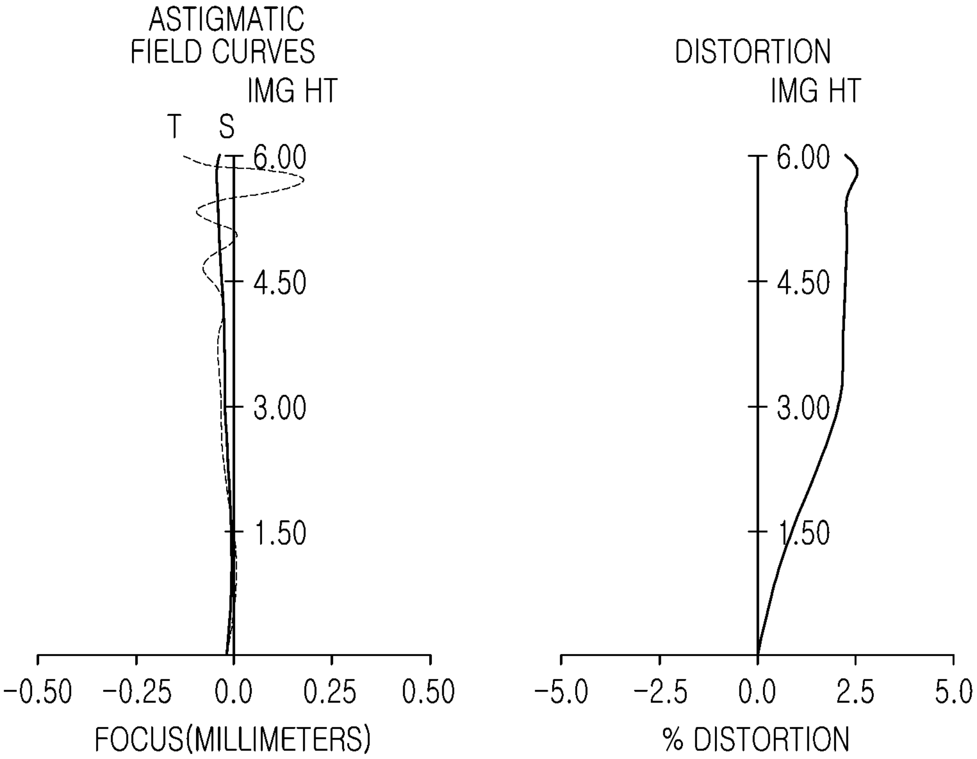
FIG. 20 is a view illustrating aberration characteristics of the optical imaging system illustrated in FIG. 19.

FIG. 19 is a structural view of an optical imaging system according to a tenth embodiment of the present disclosure, and FIG. 20 is a view illustrating aberration characteristics of the optical imaging system illustrated in FIG. 19.

Referring to FIG. 19, an optical imaging system 1000 according to the tenth embodiment of the present disclosure includes a first lens 1001, a second lens 1002, a third lens 1003, a fourth lens 1004, a fifth lens 1005, a sixth lens 1006, a seventh lens 1007, an eighth lens 1008, and a ninth lens 1009, and may further include a filter 1010 and an image sensor IS.

The optical imaging system 1000 according to a tenth embodiment of the present disclosure may form a focus on an imaging surface 1011. The imaging surface 1011 may denote a surface on which a focus is formed by the optical imaging system. In an example, the imaging surface 1011 may denote one surface of the image sensor IS on which light is received.

The lens characteristics (a radius of curvature, a lens thickness, a distance between lenses, an index of refraction, an Abbe number, and a focal length) of each lens are illustrated in Table 19 below.

TABLE 19

| Surface Number | Element | Radius of Curvature | Thickness or Distance | Index of Refraction | Abbe Number | Focal Length |
|---|---|---|---|---|---|---|
| S1 | First | 8.341 | 0.360 | 1.544 | 55.99 | 102.19 |
| S2 | Lens | 9.656 | 0.035 | | | |
| S3 | Second | 2.903 | 1.068 | 1.544 | 55.99 | 6.56 |
| S4 | Lens | 13.284 | 0.276 | | | |
| S5 | Third | 27.786 | 0.251 | 1.671 | 19.24 | −12.89 |
| S6 | Lens | 6.631 | 0.234 | | | |

TABLE 19-continued

| Surface Number | Element | Radius of Curvature | Thickness or Distance | Index of Refraction | Abbe Number | Focal Length |
|---|---|---|---|---|---|---|
| S7 | Fourth | 6.987 | 0.408 | 1.544 | 55.99 | 22.24 |
| S8 | Lens | 16.103 | 0.432 | | | |
| S9 | Fifth | 41.293 | 0.386 | 1.671 | 19.24 | 499.45 |
| S10 | Lens | 46.841 | 0.398 | | | |
| S11 | Sixth | 8.880 | 0.225 | 1.635 | 23.96 | −28.24 |
| S12 | Lens | 5.899 | 0.417 | | | |
| S13 | Seventh | 8.031 | 0.792 | 1.567 | 37.40 | 6.59 |
| S14 | Lens | −6.811 | 0.210 | | | |
| S15 | Eighth | −8.952 | 0.415 | 1.544 | 55.99 | −162.87 |
| S16 | Lens | −10.116 | 0.626 | | | |
| S17 | Ninth | 44.981 | 0.380 | 1.535 | 55.74 | −4.55 |
| S18 | Lens | 2.312 | 0.700 | | | |
| S19 | Filter | Infinity | 0.210 | 1.517 | 64.20 | |
| S20 | | Infinity | 0.396 | | | |
| S21 | Imaging Surface | Infinity | | | | |

A total focal length f of the optical imaging system 1000 according to the tenth embodiment of the present disclosure is 6.83 mm, Fno is 1.59, IMG HT is 6 mm, FOV is 80.5°, SWA11 is 18.547°, SWA21 is 35.989°, and f12 is 6.273 mm.

In the tenth embodiment of the present disclosure, the first lens 1001 has a positive refractive power, a first surface of the first lens 1001 is convex in the paraxial region, and a second surface of the first lens 1001 is concave in the paraxial region.

The second lens 1002 has a positive refractive power, a first surface of the second lens 1002 is convex in the paraxial region, and a second surface of the second lens 1002 is concave in the paraxial region.

The third lens 1003 has a negative refractive power, a first surface of the third lens 1003 is convex in the paraxial region, and a second surface of the third lens 1003 is concave in the paraxial region.

The fourth lens 1004 has a positive refractive power, a first surface of the fourth lens 1004 is convex in the paraxial region, and a second surface of the fourth lens 1004 is concave in the paraxial region.

The fifth lens 1005 has a positive refractive power, a first surface of the fifth lens 1005 is convex in the paraxial region, and a second surface of the fifth lens 1005 is concave in the paraxial region.

The sixth lens 1006 has a negative refractive power, a first surface of the sixth lens 1006 is convex in the paraxial region, and a second surface of the sixth lens 1006 is concave in the paraxial region.

The seventh lens 1007 has a positive refractive power, and a first surface and a second surface of the seventh lens 1007 are convex in the paraxial region.

The eighth lens 1008 has a negative refractive power, a first surface of the eighth lens 1008 is concave in the paraxial region, and a second surface of the eighth lens 1008 is convex in the paraxial region.

The ninth lens 1009 has a negative refractive power, a first surface of the ninth lens 1009 is convex in the paraxial region, and a second surface of the ninth lens 1009 is concave in the paraxial region.

Additionally, one or more of the fifth lens 1005 to the ninth lens 1009 has at least one inflection point formed on either one or both of the first surface and the second surface thereof.

Each surface of the first lens 1001 to the ninth lens 1009 has aspherical coefficients as illustrated in Table 20 below. For example, both an object-side surface and an image-side surface of each of the first lens 1001 to the ninth lens 1009 are aspherical surfaces.

TABLE 20

| | S1 | S2 | S3 | S4 | S5 | S6 |
|---|---|---|---|---|---|---|
| Conic Constant (K) | 6.653 | 13.751 | −1.434 | −99.000 | 99.000 | 12.076 |
| Fourth Coefficient (A) | −6.299E−03 | −2.366E−02 | −1.610E−02 | −7.281E−03 | −1.019E−02 | 2.110E−04 |
| Sixth Coefficient (B) | −3.732E−03 | 2.148E−02 | 5.732E−02 | 8.921E−03 | 1.263E−02 | −4.287E−02 |
| Eighth Coefficient (C) | 6.434E−03 | −1.939E−03 | −1.181E−01 | −3.819E−02 | −4.904E−02 | 1.953E−01 |
| Tenth Coefficient (D) | −1.593E−03 | −3.313E−02 | 1.890E−01 | 7.900E−02 | 1.394E−01 | −5.510E−01 |
| Twelfth Coefficient (E) | −6.287E−03 | 6.493E−02 | −2.189E−01 | −1.050E−01 | −2.399E−01 | 1.066E+00 |
| Fourteenth Coefficient (F) | 1.061E−02 | −7.018E−02 | 1.821E−01 | 9.692E−02 | 2.794E−01 | −1.445E+00 |
| Sixteenth Coefficient (G) | −9.058E−03 | 5.021E−02 | −1.097E−01 | −6.391E−02 | −2.298E−01 | 1.400E+00 |
| Eighteenth Coefficient (H) | 4.964E−03 | −2.509E−02 | 4.817E−02 | 3.045E−02 | 1.359E−01 | −9.813E−01 |
| Twentieth Coefficient (J) | −1.855E−03 | 8.904E−03 | −1.542E−02 | −1.049E−02 | −5.788E−02 | 4.980E−01 |
| Twenty-Second Coefficient (L) | 4.789E−04 | −2.239E−03 | 3.558E−03 | 2.585E−03 | 1.760E−02 | −1.810E−01 |
| Twenty-Fourth Coefficient (M) | −8.427E−05 | 3.903E−04 | −5.761E−04 | −4.440E−04 | −3.720E−03 | 4.592E−02 |
| Twenty-Sixth Coefficient (N) | 9.656E−06 | −4.488E−05 | 6.211E−05 | 5.047E−05 | 5.194E−04 | −7.710E−03 |
| Twenty-Eighth Coefficient (O) | −6.501E−07 | 3.062E−06 | −4.004E−06 | −3.410E−06 | −4.302E−05 | 7.695E−04 |
| Thirtieth Coefficient (P) | 1.952E−08 | −9.389E−08 | 1.168E−07 | 1.037E−07 | 1.601E−06 | −3.456E−05 |

TABLE 20-continued

| | S7 | S8 | S9 | S10 | S11 | S12 |
|---|---|---|---|---|---|---|
| Conic Constant (K) | −3.030 | −87.294 | −96.699 | 99.000 | −41.182 | 3.116 |
| Fourth Coefficient (A) | 5.188E−03 | 1.277E−04 | −2.435E−02 | −2.039E−02 | −4.069E−02 | −6.081E−02 |
| Sixth Coefficient (B) | −3.364E−02 | −3.551E−03 | 2.934E−02 | 1.097E−02 | −3.582E−02 | −3.870E−02 |
| Eighth Coefficient (C) | 1.088E−01 | −2.109E−02 | −1.408E−01 | −7.724E−02 | 1.029E−01 | 9.128E−02 |
| Tenth Coefficient (D) | −2.664E−01 | 9.513E−02 | 3.502E−01 | 2.036E−01 | −1.439E−01 | −8.390E−02 |
| Twelfth Coefficient (E) | 4.607E−01 | −2.185E−01 | −5.711E−01 | −3.383E−01 | 1.465E−01 | 4.168E−02 |
| Fourteenth Coefficient (F) | −5.672E−01 | 3.200E−01 | 6.471E−01 | 3.851E−01 | −1.214E−01 | −8.921E−03 |
| Sixteenth Coefficient (G) | 5.034E−01 | −3.204E−01 | −5.235E−01 | −3.117E−01 | 8.091E−02 | −2.269E−03 |
| Eighteenth Coefficient (H) | −3.242E−01 | 2.260E−01 | 3.063E−01 | 1.827E−01 | −4.149E−02 | 2.474E−03 |
| Twentieth Coefficient (J) | 1.513E−01 | −1.135E−01 | −1.299E−01 | −7.784E−02 | 1.578E−02 | −9.528E−04 |
| Twenty-Second Coefficient (L) | −5.050E−02 | 4.036E−02 | 3.949E−02 | 2.387E−02 | −4.332E−03 | 2.203E−04 |
| Twenty-Fourth Coefficient (M) | 1.174E−02 | −9.937E−03 | −8.391E−03 | −5.136E−03 | 8.296E−04 | −3.282E−05 |
| Twenty-Sixth Coefficient (N) | −1.803E−03 | 1.611E−03 | 1.183E−03 | 7.352E−04 | −1.049E−04 | 3.091E−06 |
| Twenty-Eighth Coefficient (O) | 1.641E−04 | −1.549E−04 | −9.947E−05 | −6.287E−05 | 7.864E−06 | −1.678E−07 |
| Thirtieth Coefficient (P) | −6.698E−06 | 6.686E−06 | 3.778E−06 | 2.430E−06 | −2.644E−07 | 4.005E−09 |

| | S13 | S14 | S15 | S16 | S17 | S18 |
|---|---|---|---|---|---|---|
| Conic Constant (K) | 4.809 | −2.728 | 0.106 | −1.653 | 62.856 | −12.089 |
| Fourth Coefficient (A) | 1.285E−02 | 1.459E−01 | 2.118E−01 | 1.111E−01 | −1.251E−01 | −6.304E−02 |
| Sixth Coefficient (B) | −6.046E−02 | −2.224E−01 | −3.067E−01 | −1.394E−01 | 6.720E−02 | 3.272E−02 |
| Eighth Coefficient (C) | 5.517E−02 | 1.891E−01 | 2.470E−01 | 1.062E−01 | −2.378E−02 | −1.178E−02 |
| Tenth Coefficient (D) | −2.584E−02 | −1.014E−01 | −1.281E−01 | −5.324E−02 | 5.553E−03 | 2.864E−03 |
| Twelfth Coefficient (E) | 3.753E−03 | 3.614E−02 | 4.499E−02 | 1.811E−02 | −8.735E−04 | −4.775E−04 |
| Fourteenth Coefficient (F) | 2.573E−03 | −8.846E−03 | −1.107E−02 | −4.318E−03 | 9.509E−05 | 5.525E−05 |
| Sixteenth Coefficient (G) | −1.855E−03 | 1.505E−03 | 1.956E−03 | 7.400E−04 | −7.246E−06 | −4.456E−06 |
| Eighteenth Coefficient (H) | 6.170E−04 | −1.767E−04 | −2.517E−04 | −9.253E−05 | 3.816E−07 | 2.494E−07 |
| Twentieth Coefficient (J) | −1.292E−04 | 1.377E−05 | 2.371E−05 | 8.472E−06 | −1.310E−08 | −9.480E−09 |
| Twenty-Second Coefficient (L) | 1.812E−05 | −6.364E−07 | −1.622E−06 | −5.623E−07 | 2.372E−10 | 2.319E−10 |
| Twenty-Fourth Coefficient (M) | −1.706E−06 | 9.905E−09 | 7.867E−08 | 2.634E−08 | 8.098E−13 | −3.152E−12 |
| Twenty-Sixth Coefficient (N) | 1.037E−07 | 5.675E−10 | −2.567E−09 | −8.249E−10 | −1.503E−13 | 1.037E−14 |
| Twenty-Eighth Coefficient (O) | −3.677E−09 | −3.251E−11 | 5.061E−11 | 1.549E−11 | 3.203E−15 | 2.790E−16 |
| Thirtieth Coefficient (P) | 5.787E−11 | 5.106E−13 | −4.553E−13 | −1.318E−13 | −2.423E−17 | −2.740E−18 |

Additionally, the optical imaging system 1000 configured as described above may have the aberration characteristics illustrated in FIG. 20.

Figure 21:
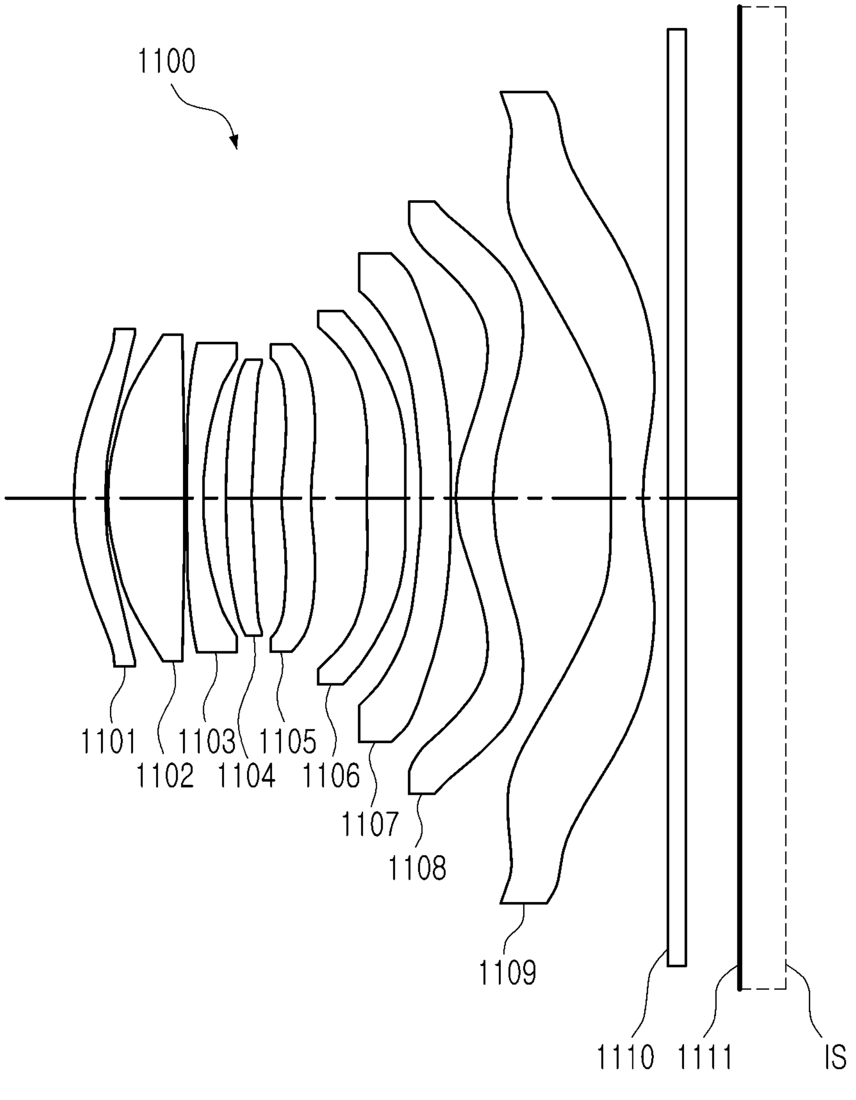
FIG. 21 is a block diagram of an optical imaging system according to an eleventh embodiment of the present disclosure.
Figure 22:
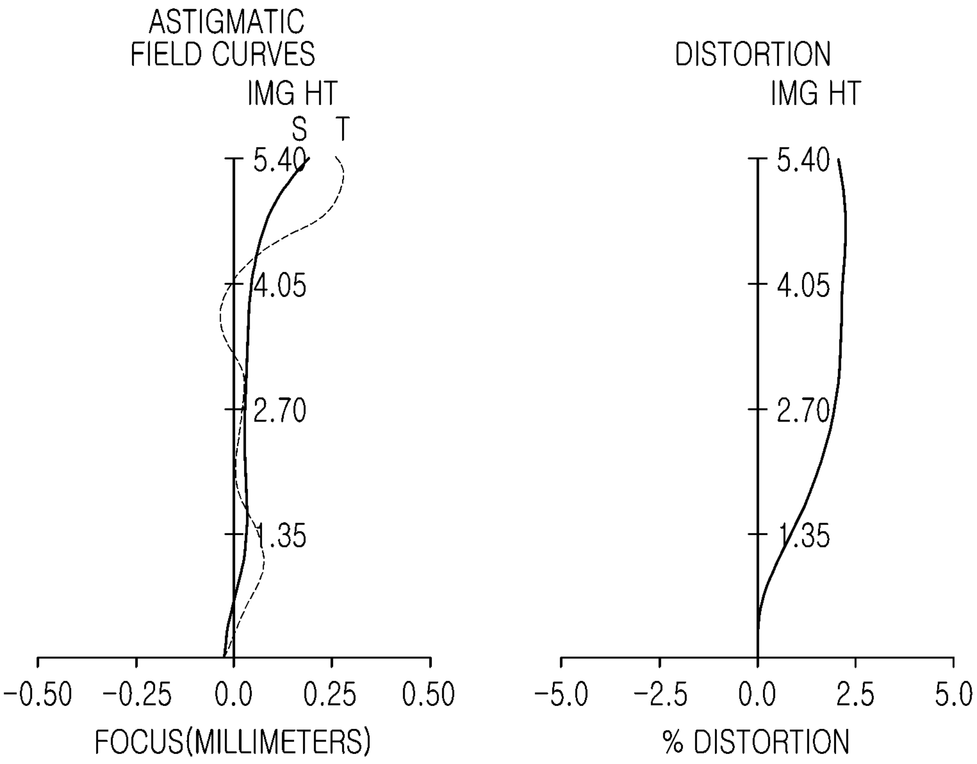
FIG. 22 is a view illustrating aberration characteristics of the optical imaging system illustrated in FIG. 21.

FIG. 21 is a structural view of an optical imaging system according to an eleventh embodiment of the present disclosure, and FIG. 22 is a view illustrating aberration characteristics of the optical imaging system illustrated in FIG. 21.

Referring to FIG. 21, an optical imaging system 1100 according to the eleventh embodiment of the present disclosure includes a first lens 1101, a second lens 1102, a third lens 1103, a fourth lens 1104, a fifth lens 1105, a sixth lens 1106, a seventh lens 1107, an eighth lens 1108, and a ninth lens 1109, and may further include a filter 1110 and an image sensor IS.

The optical imaging system 1100 according to the eleventh embodiment of the present disclosure may form a focus on an imaging surface 1111. The imaging surface 1111 may denote a surface on which a focus is formed by the optical imaging system. In an example, the imaging surface 1111 may mean one surface of the image sensor IS on which light is received.

The lens characteristics (a radius of curvature, a lens thickness, a distance between lenses, an index of refraction, an Abbe number, and a focal length) of each lens are illustrated in Table 21 below.

TABLE 21

| Surface Number | Element | Radius of Curvature | Thickness or Distance | Index of Refraction | Abbe Number | Focal Length |
|---|---|---|---|---|---|---|
| S1 | First | 3.150 | 0.386 | 1.544 | 55.99 | 53.68 |
| S2 | Lens | 3.376 | 0.048 | | | |
| S3 | Second | 3.209 | 0.933 | 1.544 | 55.99 | 6.02 |
| S4 | Lens | 118.460 | 0.030 | | | |
| S5 | Third | 17.018 | 0.210 | 1.639 | 23.49 | −9.71 |
| S6 | Lens | 4.558 | 0.278 | | | |
| S7 | Fourth | 6.696 | 0.323 | 1.544 | 55.99 | −489.05 |
| S8 | Lens | 6.421 | 0.374 | | | |
| S9 | Fifth | 5.294 | 0.365 | 1.671 | 19.24 | 34.51 |
| S10 | Lens | 6.648 | 0.676 | | | |
| S11 | Sixth | 19.699 | 0.480 | 1.544 | 55.99 | 500 |
| S12 | Lens | 21.047 | 0.188 | | | |
| S13 | Seventh | −6.571 | 0.380 | 1.614 | 25.94 | −36.7 |
| S14 | Lens | −9.444 | 0.060 | | | |
| S15 | Eighth | 2.087 | 0.457 | 1.544 | 55.99 | 8.25 |
| S16 | Lens | 3.588 | 1.460 | | | |
| S17 | Ninth | 30.338 | 0.400 | 1.535 | 55.74 | −6.28 |
| S18 | Lens | 3.020 | 0.304 | | | |
| S19 | Filter | Infinity | 0.210 | 1.517 | 64.20 | |
| S20 | | Infinity | 0.657 | | | |
| S21 | Imaging Surface | Infinity | | | | |

A total focal length f of the optical imaging system 1100 according to the eleventh embodiment of the present disclosure is 6.84 mm, Fno is 1.59, IMG HT is 6 mm, FOV is 80.5°, SWA11 is 19.264°, SWA21 is 33.366°, and f12 is 5.659 mm.

In the eleventh embodiment of the present disclosure, the first lens 1101 has a positive refractive power, a first surface of the first lens 1101 is convex in the paraxial region, and a second surface of the first lens 1101 is concave in the paraxial region.

The second lens 1102 has a positive refractive power, a first surface of the second lens 1102 is convex in the paraxial region, and a second surface of the second lens 1102 is concave in the paraxial region.

The third lens 1103 has a negative refractive power, a first surface of the third lens 1103 is convex in the paraxial region, and a second surface of the third lens 1103 is concave in the paraxial region.

The fourth lens 1104 has a negative refractive power, a first surface of the fourth lens 1104 is convex in the paraxial region, and a second surface of the fourth lens 1104 is concave in the paraxial region.

The fifth lens 1105 has a positive refractive power, a first surface of the fifth lens 1105 is convex in the paraxial region, and a second surface of the fifth lens 1105 is concave in the paraxial region.

The sixth lens 1106 has a positive refractive power, a first surface of the sixth lens 1106 is convex in the paraxial region, and a second surface of the sixth lens 1106 is concave in the paraxial region.

The seventh lens 1107 has a negative refractive power, a first surface of the seventh lens 1107 is concave in the paraxial region, and a second surface of the seventh lens 1107 is convex in the paraxial region.

The eighth lens 1108 has a positive refractive power, a first surface of the eighth lens 1108 is convex in the paraxial region, and a second surface of the eighth lens 1108 is concave in the paraxial region.

The ninth lens 1109 has a negative refractive power, a first surface of the ninth lens 1109 is convex in the paraxial region, and a second surface of the ninth lens 1109 is concave in the paraxial region.

Additionally, one or more of the fifth lens 1105 to the ninth lens 1109 has at least one inflection point formed on either one or both of the first surface and the second surface thereof.

Each surface of the first lens 1101 to the ninth lens 1109 has aspherical coefficients as illustrated in Table 22 below. For example, both an object-side surface and an image-side surface of each of the first lens 1101 to the ninth lens 1109 are aspherical surfaces.

TABLE 22

| | S1 | S2 | S3 | S4 | S5 | S6 |
|---|---|---|---|---|---|---|
| Conic Constant (K) | −5.315 | −12.128 | −4.443 | 99.000 | −2.170 | 4.574 |
| Fourth Coefficient (A) | 4.012E−03 | 1.977E−02 | 4.923E−03 | −1.118E−02 | 1.202E−02 | 7.635E−03 |
| Sixth Coefficient (B) | 5.762E−02 | 3.160E−02 | 4.365E−02 | 3.353E−02 | −9.621E−02 | −8.808E−02 |
| Eighth Coefficient (C) | −1.930E−01 | −2.902E−01 | −2.765E−01 | −1.301E−01 | 2.846E−01 | 3.589E−01 |
| Tenth Coefficient (D) | 3.470E−01 | 6.626E−01 | 6.317E−01 | 2.863E−01 | −5.682E−01 | −9.641E−01 |
| Twelfth Coefficient (E) | −4.027E−01 | −8.482E−01 | −8.267E−01 | −3.879E−01 | 7.969E−01 | 1.745E+00 |
| Fourteenth Coefficient (F) | 3.210E−01 | 7.117E−01 | 7.150E−01 | 3.513E−01 | −7.975E−01 | −2.209E+00 |
| Sixteenth Coefficient (G) | −1.817E−01 | −4.163E−01 | −4.337E−01 | −2.225E−01 | 5.773E−01 | 1.997E+00 |
| Eighteenth Coefficient (H) | 7.429E−02 | 1.745E−01 | 1.895E−01 | 1.008E−01 | −3.041E−01 | −1.304E+00 |
| Twentieth Coefficient (J) | −2.202E−02 | −5.286E−02 | −6.011E−02 | −3.289E−02 | 1.163E−01 | 6.145E−01 |
| Twenty-Second Coefficient (L) | 4.687E−03 | 1.149E−02 | 1.374E−02 | 7.676E−03 | −3.190E−02 | −2.068E−01 |
| Twenty-Fourth Coefficient (M) | −6.987E−04 | −1.748E−03 | −2.206E−03 | −1.251E−03 | 6.106E−03 | 4.840E−02 |
| Twenty-Sixth Coefficient (N) | 6.924E−05 | 1.769E−04 | 2.365E−04 | 1.355E−04 | −7.735E−04 | −7.483E−03 |

TABLE 22-continued

| | | | | | | |
|---|---|---|---|---|---|---|
| Twenty-Eighth Coefficient (O) | −4.099E−06 | −1.069E−05 | −1.520E−05 | −8.763E−06 | 5.824E−05 | 6.867E−04 |
| Thirtieth Coefficient (P) | 1.097E−07 | 2.924E−07 | 4.431E−07 | 2.567E−07 | −1.972E−06 | −2.832E−05 |

| | S7 | S8 | S9 | S10 | S11 | S12 |
|---|---|---|---|---|---|---|
| Conic Constant (K) | −13.095 | −86.384 | −34.841 | −35.682 | −38.044 | 48.470 |
| Fourth Coefficient (A) | −1.046E−02 | −1.872E−02 | −4.558E−02 | −3.459E−02 | −5.916E−02 | −9.678E−02 |
| Sixth Coefficient (B) | −2.853E−02 | 7.166E−02 | 1.037E−01 | 2.592E−02 | 4.636E−02 | 7.136E−02 |
| Eighth Coefficient (C) | 1.946E−01 | −2.583E−01 | −3.449E−01 | −4.707E−02 | −4.987E−02 | −8.827E−02 |
| Tenth Coefficient (D) | −5.238E−01 | 6.411E−01 | 7.772E−01 | 5.728E−02 | 4.095E−02 | 9.094E−02 |
| Twelfth Coefficient (E) | 8.894E−01 | −1.073E+00 | −1.220E+00 | −3.844E−02 | −1.569E−02 | −6.173E−02 |
| Fourteenth Coefficient (F) | −1.050E+00 | 1.246E+00 | 1.368E+00 | 1.999E−03 | −8.129E−03 | 2.709E−02 |
| Sixteenth Coefficient (G) | 8.892E−01 | −1.030E+00 | −1.116E+00 | 2.150E−02 | 1.611E−02 | −7.535E−03 |
| Eighteenth Coefficient (H) | −5.456E−01 | 6.151E−01 | 6.684E−01 | −2.174E−02 | −1.177E−02 | 1.134E−03 |
| Twentieth Coefficient (J) | 2.424E−01 | −2.664E−01 | −2.938E−01 | 1.173E−02 | 5.272E−03 | 1.624E−05 |
| Twenty-Second Coefficient (L) | −7.703E−02 | 8.285E−02 | 9.365E−02 | −4.013E−03 | −1.572E−03 | −5.079E−05 |
| Twenty-Fourth Coefficient (M) | 1.705E−02 | −1.803E−02 | −2.107E−02 | 8.959E−04 | 3.133E−04 | 1.230E−05 |
| Twenty-Sixth Coefficient (N) | −2.494E−03 | 2.608E−03 | 3.171E−03 | −1.268E−04 | −4.018E−05 | −1.554E−06 |
| Twenty-Eighth Coefficient (O) | 2.165E−04 | −2.252E−04 | −2.865E−04 | 1.032E−05 | 2.998E−06 | 1.067E−07 |
| Thirtieth Coefficient (P) | −8.443E−06 | 8.791E−06 | 1.175E−05 | −3.679E−07 | −9.893E−08 | −3.142E−09 |

| | S13 | S14 | S15 | S16 | S17 | S18 |
|---|---|---|---|---|---|---|
| Conic Constant (K) | 2.497 | 1.346 | −6.249 | −10.620 | 30.268 | −12.329 |
| Fourth Coefficient (A) | 3.212E−02 | 5.676E−03 | 1.085E−02 | 3.664E−02 | −8.605E−02 | −4.521E−02 |
| Sixth Coefficient (B) | −9.529E−03 | 1.491E−04 | −1.171E−02 | −2.141E−02 | 3.316E−02 | 1.667E−02 |
| Eighth Coefficient (C) | −4.148E−02 | −1.551E−02 | −4.099E−04 | 2.950E−03 | −1.090E−02 | −5.295E−03 |
| Tenth Coefficient (D) | 7.175E−02 | 2.565E−02 | 4.620E−03 | 2.578E−03 | 2.904E−03 | 1.297E−03 |
| Twelfth Coefficient (E) | −5.798E−02 | −2.076E−02 | −3.432E−03 | −1.994E−03 | −5.561E−04 | −2.346E−04 |
| Fourteenth Coefficient (F) | 2.818E−02 | 1.015E−02 | 1.393E−03 | 7.303E−04 | 7.358E−05 | 3.109E−05 |
| Sixteenth Coefficient (G) | −8.921E−03 | −3.289E−03 | −3.671E−04 | −1.696E−04 | −6.708E−06 | −3.046E−06 |
| Eighteenth Coefficient (H) | 1.896E−03 | 7.393E−04 | 6.669E−05 | 2.690E−05 | 4.212E−07 | 2.223E−07 |
| Twentieth Coefficient (J) | −2.703E−04 | −1.176E−04 | −8.515E−06 | −2.983E−06 | −1.793E−08 | −1.208E−08 |
| Twenty-Second Coefficient (L) | 2.500E−05 | 1.325E−05 | 7.620E−07 | 2.314E−07 | 4.922E−10 | 4.815E−10 |
| Twenty-Fourth Coefficient (M) | −1.370E−06 | −1.035E−06 | −4.669E−08 | −1.229E−08 | −7.556E−12 | −1.365E−11 |
| Twenty-Sixth Coefficient (N) | 3.341E−08 | 5.339E−08 | 1.860E−09 | 4.253E−10 | 2.811E−14 | 2.595E−13 |
| Twenty-Eighth Coefficient (O) | 2.335E−10 | −1.637E−09 | −4.330E−11 | −8.625E−12 | 8.857E−16 | −2.960E−15 |
| Thirtieth Coefficient (P) | −1.915E−11 | 2.259E−11 | 4.454E−13 | 7.763E−14 | −1.016E−17 | 1.526E−17 |

Additionally, the optical imaging system 1100 configured as described above may have the aberration characteristics illustrated in FIG. 22.

Figure 23:
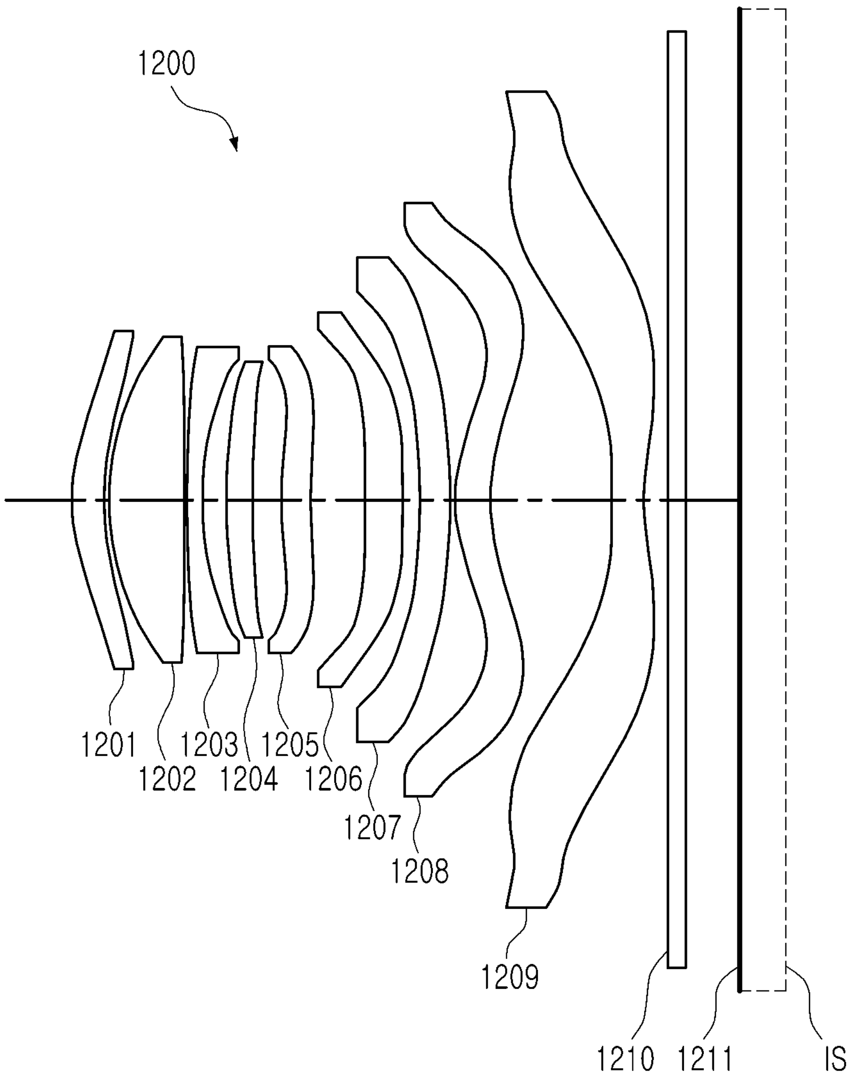
FIG. 23 is a structural view of an optical imaging system according to a twelfth embodiment of the present disclosure.
Figure 24:
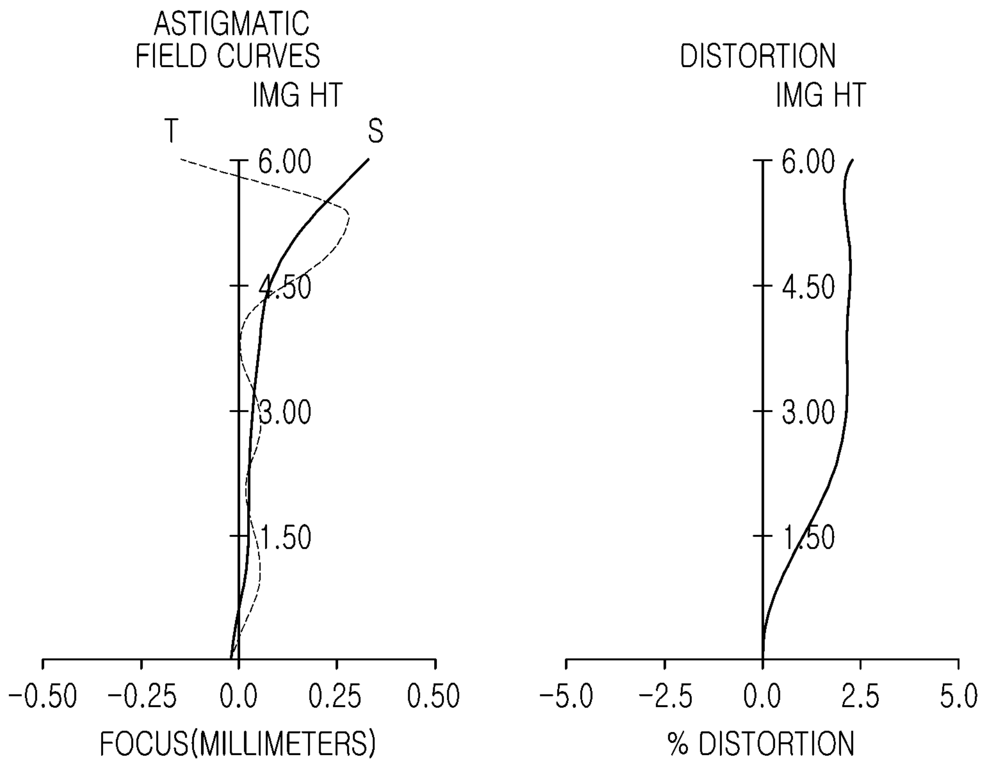
FIG. 24 is a view illustrating aberration characteristics of the optical imaging system illustrated in FIG. 23.

FIG. 23 is a structural view of an optical imaging system according to a twelfth embodiment of the present disclosure, and FIG. 24 is a view illustrating aberration characteristics of the optical imaging system illustrated in FIG. 23.

Referring to FIG. 23, an optical imaging system 1200 according to the twelfth embodiment of the present invention includes a first lens 1201, a second lens 1202, a third lens 1203, a fourth lens 1204, a fifth lens 1205, a sixth lens 1206, a seventh lens 1207, an eighth lens 1208, and a ninth lens 1209, and may further include a filter 1210 and an image sensor IS.

The optical imaging system 1200 according to the twelfth embodiment of the present invention may form a focus on an imaging surface 1211. The imaging surface 1211 may denote a surface on which a focus is formed by the optical imaging system. In an example, the imaging surface 1211 may denote one surface of the image sensor IS on which light is received.

The lens characteristics (a radius of curvature, a lens thickness, a distance between lenses, an index of refraction, an Abbe number, and a focal length) of each lens are illustrated in Table 23 below.

TABLE 23

| Surface Number | Element | Radius of Curvature | Thickness or Distance | Index of Refraction | Abbe Number | Focal Length |
|---|---|---|---|---|---|---|
| S1 | First | 3.149 | 0.386 | 1.544 | 55.99 | 56.2 |
| S2 | Lens | 3.357 | 0.053 | | | |
| S3 | Second | 3.192 | 0.934 | 1.544 | 55.99 | 6 |
| S4 | Lens | 108.696 | 0.030 | | | |
| S5 | Third | 16.839 | 0.210 | 1.639 | 23.49 | −9.77 |
| S6 | Lens | 4.565 | 0.279 | | | |
| S7 | Fourth | 6.722 | 0.322 | 1.544 | 55.99 | −497.84 |
| S8 | Lens | 6.449 | 0.368 | | | |
| S9 | Fifth | 5.099 | 0.351 | 1.671 | 19.24 | 37.57 |
| S10 | Lens | 6.196 | 0.668 | | | |
| S11 | Sixth | 19.741 | 0.480 | 1.544 | 55.99 | −1101.82 |
| S12 | Lens | 18.950 | 0.207 | | | |
| S13 | Seventh | −6.851 | 0.380 | 1.614 | 25.94 | 500 |
| S14 | Lens | −6.846 | 0.060 | | | |
| S15 | Eighth | 2.212 | 0.440 | 1.544 | 55.99 | 10.5 |
| S16 | Lens | 3.346 | 1.490 | | | |
| S17 | Ninth | 30.094 | 0.400 | 1.535 | 55.74 | −6.37 |
| S18 | Lens | 3.056 | 0.304 | | | |
| S19 | Filter | Infinity | 0.210 | 1.517 | 64.20 | |
| S20 | | Infinity | 0.648 | | | |
| S21 | Imaging Surface | Infinity | | | | |

A total focal length f of the optical imaging system 1200 according to the twelfth embodiment of the present invention is 6.84 mm, Fno is 1.59, IMG HT is 6 mm, FOV is 80.5°, SWA11 is 19.281°, SWA21 is 33.538°, and f12 is 5.670 mm.

In the twelfth embodiment of the present invention, the first lens 1201 has positive refractive power, a first surface of the first lens 1201 is convex in the paraxial region, and a second surface of the first lens 1201 is concave in the paraxial region.

The second lens 1202 has a positive refractive power, a first surface of the second lens 1202 is convex in the paraxial region, and a second surface of the second lens 1202 is concave in the paraxial region.

The third lens 1203 has a negative refractive power, a first surface of the third lens 1203 is convex in the paraxial region, and a second surface of the third lens 1203 is concave in the paraxial region.

The fourth lens 1204 has a negative refractive power, a first surface of the fourth lens 1204 is convex in the paraxial region, and a second surface of the fourth lens 1204 is concave in the paraxial region.

The fifth lens 1205 has a positive refractive power, a first surface of the fifth lens 1205 is convex in the paraxial region, and a second surface of the fifth lens 1205 is concave in the paraxial region.

The sixth lens 1206 has a negative refractive power, a first surface of the sixth lens 1206 is convex in the paraxial region, and a second surface of the sixth lens 1206 is concave in the paraxial region.

The seventh lens 1207 has a positive refractive power, a first surface of the seventh lens 1207 is concave in the paraxial region, and a second surface of the seventh lens 1207 is convex in the paraxial region.

The eighth lens 1208 has a positive refractive power, a first surface of the eighth lens 1208 is convex in the paraxial region, and a second surface of the eighth lens 1208 is concave in the paraxial region.

The ninth lens 1209 has a negative refractive power, a first surface of the ninth lens 1209 is convex in the paraxial region, and a second surface of the ninth lens 1209 is concave in the paraxial region.

Additionally, one or more of the fifth lens 1205 to the ninth lens 1209 has at least one inflection point formed on either one or both of the first surface and the second surface thereof.

Each surface of the first lens 1201 to the ninth lens 1209 has aspherical coefficients as illustrated in Table 24 below. For example, both an object-side surface and an image-side surface of each of the first lens 1201 to the ninth lens 1209 are aspherical surfaces.

TABLE 24

| | S1 | S2 | S3 | S4 | S5 | S6 |
|---|---|---|---|---|---|---|
| Conic Constant (K) | −5.303 | −12.128 | −4.451 | 99.000 | −1.397 | 4.571 |
| Fourth Coefficient (A) | 6.201E−03 | 2.124E−02 | 6.961E−03 | −1.223E−02 | 5.382E−03 | 5.886E−03 |
| Sixth Coefficient (B) | 4.462E−02 | 3.389E−04 | 8.614E−03 | 3.152E−02 | −7.034E−02 | −8.015E−02 |
| Eighth Coefficient (C) | −1.546E−01 | −1.572E−01 | −1.350E−01 | −1.011E−01 | 2.490E−01 | 3.463E−01 |
| Tenth Coefficient (D) | 2.789E−01 | 3.852E−01 | 3.447E−01 | 2.060E−01 | −5.602E−01 | −9.562E−01 |
| Twelfth Coefficient (E) | −3.236E−01 | −4.948E−01 | −4.678E−01 | −2.717E−01 | 8.372E−01 | 1.746E+00 |
| Fourteenth Coefficient (F) | 2.575E−01 | 4.096E−01 | 4.127E−01 | 2.445E−01 | −8.642E−01 | −2.213E+00 |
| Sixteenth Coefficient (G) | −1.456E−01 | −2.350E−01 | −2.544E−01 | −1.552E−01 | 6.345E−01 | 2.000E+00 |
| Eighteenth Coefficient (H) | 5.948E−02 | 9.635E−02 | 1.131E−01 | 7.061E−02 | −3.362E−01 | −1.305E+00 |
| Twentieth Coefficient (J) | −1.763E−02 | −2.853E−02 | −3.653E−02 | −2.313E−02 | 1.289E−01 | 6.144E−01 |
| Twenty-Second Coefficient (L) | 3.753E−03 | 6.063E−03 | 8.523E−03 | 5.408E−03 | −3.539E−02 | −2.067E−01 |

TABLE 24-continued

| | | | | | | |
|---|---|---|---|---|---|---|
| Twenty-Fourth Coefficient (M) | −5.599E−04 | −9.025E−04 | −1.400E−03 | −8.812E−04 | 6.777E−03 | 4.839E−02 |
| Twenty-Sixth Coefficient (N) | 5.554E−05 | 8.941E−05 | 1.538E−04 | 9.516E−05 | −8.591E−04 | −7.484E−03 |
| Twenty-Eighth Coefficient (O) | −3.292E−06 | −5.298E−06 | −1.013E−05 | −6.129E−06 | 6.475E−05 | 6.872E−04 |
| Thirtieth Coefficient (P) | 8.822E−08 | 1.421E−07 | 3.033E−07 | 1.785E−07 | −2.196E−06 | −2.836E−05 |

| | S7 | S8 | S9 | S10 | S11 | S12 |
|---|---|---|---|---|---|---|
| Conic Constant (K) | −13.691 | −88.386 | −34.859 | −33.513 | −19.988 | 40.301 |
| Fourth Coefficient (A) | −1.040E−02 | −2.019E−02 | −4.450E−02 | −3.309E−02 | −5.583E−02 | −9.151E−02 |
| Sixth Coefficient (B) | −3.899E−02 | 7.392E−02 | 9.530E−02 | 1.509E−02 | 3.728E−02 | 6.240E−02 |
| Eighth Coefficient (C) | 2.565E−01 | −2.578E−01 | −3.145E−01 | −9.315E−03 | −3.394E−02 | −8.264E−02 |
| Tenth Coefficient (D) | −7.058E−01 | 6.296E−01 | 7.097E−01 | −2.240E−02 | 1.871E−02 | 9.265E−02 |
| Twelfth Coefficient (E) | 1.224E+00 | −1.036E+00 | −1.121E+00 | 7.431E−02 | 8.946E−03 | −6.821E−02 |
| Fourteenth Coefficient (F) | −1.469E+00 | 1.173E+00 | 1.269E+00 | −1.098E−01 | −2.870E−02 | 3.334E−02 |
| Sixteenth Coefficient (G) | 1.261E+00 | −9.390E−01 | −1.048E+00 | 1.011E−01 | 2.870E−02 | −1.114E−02 |
| Eighteenth Coefficient (H) | −7.841E−01 | 5.385E−01 | 6.363E−01 | −6.303E−02 | −1.736E−02 | 2.562E−03 |
| Twentieth Coefficient (J) | 3.532E−01 | −2.218E−01 | −2.839E−01 | 2.735E−02 | 7.070E−03 | −3.878E−04 |
| Twenty-Second Coefficient (L) | −1.140E−01 | 6.490E−02 | 9.189E−02 | −8.285E−03 | −1.985E−03 | 3.125E−05 |
| Twenty-Fourth Coefficient (M) | 2.569E−02 | −1.313E−02 | −2.099E−02 | 1.718E−03 | 3.798E−04 | 6.343E−07 |
| Twenty-Sixth Coefficient (N) | −3.832E−03 | 1.740E−03 | 3.205E−03 | −2.323E−04 | −4.729E−05 | −4.535E−07 |
| Twenty-Eighth Coefficient (O) | 3.399E−04 | −1.354E−04 | −2.936E−04 | 1.845E−05 | 3.454E−06 | 4.503E−08 |
| Thirtieth Coefficient (P) | −1.357E−05 | 4.665E−06 | 1.219E−05 | −6.515E−07 | −1.122E−07 | −1.595E−09 |

| | S13 | S14 | S15 | S16 | S17 | S18 |
|---|---|---|---|---|---|---|
| Conic Constant (K) | 2.715 | −2.440 | −6.162 | −10.918 | 29.778 | −12.260 |
| Fourth Coefficient (A) | 2.475E−02 | 1.481E−02 | 1.452E−02 | 3.653E−02 | −8.372E−02 | −4.428E−02 |
| Sixth Coefficient (B) | 1.179E−03 | −5.263E−03 | −1.833E−02 | −2.197E−02 | 3.185E−02 | 1.616E−02 |
| Eighth Coefficient (C) | −5.736E−02 | −1.450E−02 | 6.590E−03 | 4.232E−03 | −1.033E−02 | −5.083E−03 |
| Tenth Coefficient (D) | 9.035E−02 | 2.813E−02 | −4.862E−05 | 1.581E−03 | 2.714E−03 | 1.232E−03 |
| Twelfth Coefficient (E) | −7.306E−02 | −2.384E−02 | −1.359E−03 | −1.563E−03 | −5.124E−04 | −2.206E−04 |
| Fourteenth Coefficient (F) | 3.660E−02 | 1.200E−02 | 7.500E−04 | 6.093E−04 | 6.684E−05 | 2.897E−05 |
| Sixteenth Coefficient (G) | −1.223E−02 | −3.985E−03 | −2.239E−04 | −1.461E−04 | −6.006E−06 | −2.814E−06 |
| Eighteenth Coefficient (H) | 2.822E−03 | 9.182E−04 | 4.343E−05 | 2.363E−05 | 3.714E−07 | 2.038E−07 |
| Twentieth Coefficient (J) | −4.552E−04 | −1.498E−04 | −5.754E−06 | −2.655E−06 | −1.555E−08 | −1.100E−08 |
| Twenty-Second Coefficient (L) | 5.119E−05 | 1.730E−05 | 5.243E−07 | 2.078E−07 | 4.188E−10 | 4.361E−10 |
| Twenty-Fourth Coefficient (M) | −3.934E−06 | −1.386E−06 | −3.220E−08 | −1.109E−08 | −6.238E−12 | −1.230E−11 |
| Twenty-Sixth Coefficient (N) | 1.984E−07 | 7.332E−08 | 1.266E−09 | 3.849E−10 | 1.944E−14 | 2.331E−13 |
| Twenty-Eighth Coefficient (O) | −6.027E−09 | −2.305E−09 | −2.859E−11 | −7.805E−12 | 7.868E−16 | −2.649E−15 |
| Thirtieth Coefficient (P) | 8.674E−11 | 3.261E−11 | 2.791E−13 | 7.005E−14 | −8.601E−18 | 1.361E−17 |

Additionally, the optical imaging system 1200 configured as described above may have the aberration characteristics illustrated in FIG. 24.

Figure 25:
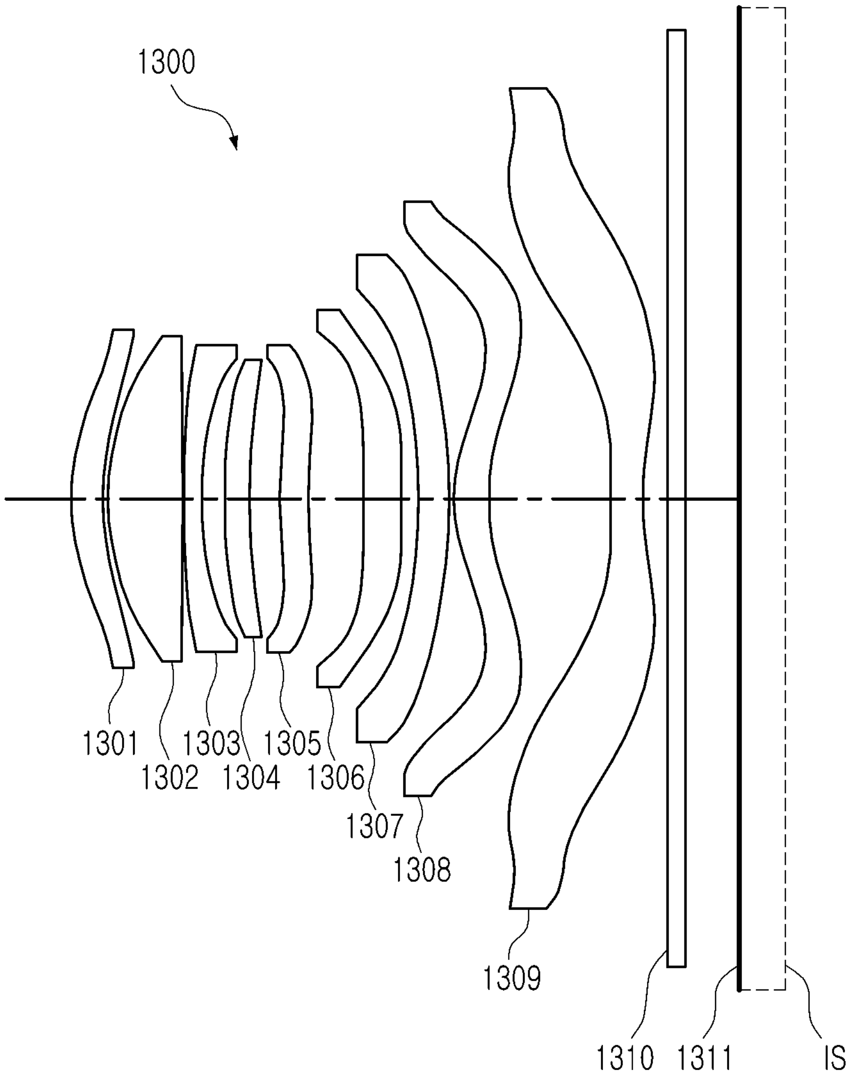
FIG. 25 is a structural view of an optical imaging system according to a thirteenth embodiment of the present disclosure.
Figure 26:
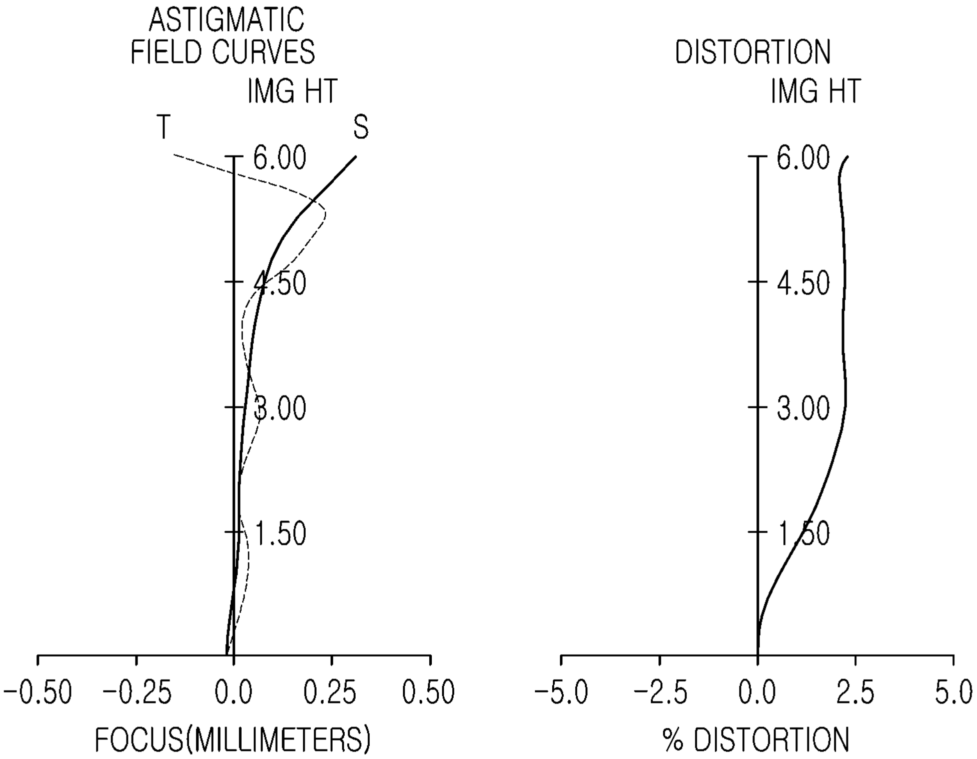
FIG. 26 is a view illustrating aberration characteristics of the optical imaging system illustrated in FIG. 25.

FIG. 25 is a structural view of an optical imaging system according to a thirteenth embodiment of the present disclosure, and FIG. 26 is a view illustrating aberration characteristics of the optical imaging system illustrated in FIG. 25.

Referring to FIG. 25, an optical imaging system 1300 according to the thirteenth embodiment of the present invention includes a first lens 1301, a second lens 1302, a third lens 1303, a fourth lens 1304, a fifth lens 1305, a sixth lens 1306, a seventh lens 1307, an eighth lens 1308, and a ninth lens 1309, and may further include a filter 1310 and an image sensor IS.

The optical imaging system 1300 according to the thirteenth embodiment of the present invention may form a focus on an imaging surface 1311. The imaging surface 1311 may denote a surface on which a focus is formed by the optical imaging system. For example, the imaging surface 1311 may denote one surface of the image sensor IS on which light is received.

The lens characteristics (a radius of curvature, a lens thickness, a distance between lenses, an index of refraction, an Abbe number, and a focal length) of each lens are illustrated in Table 25 below.

TABLE 25

| Surface Number | Element | Radius of Curvature | Thickness or Distance | Index of Refraction | Abbe Number | Focal Length |
|---|---|---|---|---|---|---|
| S1 | First | 3.150 | 0.385 | 1.544 | 55.99 | 61.66 |
| S2 | Lens | 3.325 | 0.056 | | | |
| S3 | Second | 3.163 | 0.933 | 1.544 | 55.99 | 5.94 |
| S4 | Lens | 110.213 | 0.030 | | | |
| S5 | Third | 16.884 | 0.210 | 1.639 | 23.49 | −9.78 |
| S6 | Lens | 4.572 | 0.276 | | | |
| S7 | Fourth | 6.722 | 0.320 | 1.544 | 55.99 | −496.4 |
| S8 | Lens | 6.449 | 0.368 | | | |
| S9 | Fifth | 5.136 | 0.352 | 1.671 | 19.24 | 39.09 |
| S10 | Lens | 6.192 | 0.671 | | | |
| S11 | Sixth | 18.581 | 0.480 | 1.544 | 55.99 | 500 |
| S12 | Lens | 19.755 | 0.206 | | | |
| S13 | Seventh | −6.817 | 0.380 | 1.614 | 25.94 | 500 |
| S14 | Lens | −6.813 | 0.060 | | | |
| S15 | Eighth | 2.196 | 0.428 | 1.544 | 55.99 | 10.87 |
| S16 | Lens | 3.245 | 1.517 | | | |
| S17 | Ninth | 30.100 | 0.400 | 1.535 | 55.74 | −6.43 |
| S18 | Lens | 3.083 | 0.304 | | | |
| S19 | Filter | Infinity | 0.210 | 1.517 | 64.20 | |
| S20 | | Infinity | 0.634 | | | |
| S21 | Imaging Surface | Infinity | | | | |

A total focal length f of the optical imaging system 600 according to the thirteenth embodiment of the present invention is 6.84 mm, Fno is 1.59, IMG HT is 6 mm, FOV is 80.5°, SWA11 is 19.309°, SWA21 is 33.511°, and f12 is 5.670 mm.

In the thirteenth embodiment of the present invention, the first lens 1301 has a positive refractive power, a first surface of the first lens 1301 is convex in the paraxial region, and a second surface of the first lens 1301 is concave in the paraxial region.

The second lens 1302 has a positive refractive power, a first surface of the second lens 1302 is convex in the paraxial region, and a second surface of the second lens 1302 is concave in the paraxial region.

The third lens 1303 has a negative refractive power, a first surface of the third lens 1303 is convex in the paraxial region, and a second surface of the third lens 1303 is concave in the paraxial region.

The fourth lens 1304 has a negative refractive power, a first surface of the fourth lens 1304 is convex in the paraxial region, and a second surface of the fourth lens 1304 is concave in the paraxial region.

The fifth lens 1305 has a positive refractive power, a first surface of the fifth lens 1305 is convex in the paraxial region, and a second surface of the fifth lens 1305 is concave in the paraxial region.

The sixth lens 1306 has a positive refractive power, a first surface of the sixth lens 1306 is convex in the paraxial region, and a second surface of the sixth lens 1306 is concave in the paraxial region.

The seventh lens 1307 has a positive refractive power, a first surface of the seventh lens 1307 is concave in the paraxial region, and a second surface of the seventh lens 1307 is convex in the paraxial region.

The eighth lens 1308 has a positive refractive power, a first surface of the eighth lens 1308 is convex in the paraxial region, and a second surface of the eighth lens 1308 is concave in the paraxial region.

The ninth lens 1309 has a negative refractive power, a first surface of the ninth lens 1309 is convex in the paraxial region, and a second surface of the ninth lens 1309 is concave in the paraxial region.

Additionally, one or more of the fifth lens 1305 to the ninth lens 1309 has at least one inflection point formed on either one or both of the first surface and the second surface thereof.

Each surface of the first lens 1301 to the ninth lens 1309 has aspherical coefficients as illustrated in Table 26 below. For example, both an object-side surface and an image-side surface of each of the first lens 1301 to the ninth lens 1309 are aspherical surfaces.

TABLE 26

| | S1 | S2 | S3 | S4 | S5 | S6 |
|---|---|---|---|---|---|---|
| Conic Constant (K) | −5.265 | −12.081 | −4.497 | 99.000 | −3.771 | 4.570 |
| Fourth Coefficient (A) | 9.723E−03 | 2.466E−02 | 7.356E−03 | −1.211E−02 | 3.957E−04 | 5.762E−03 |
| Sixth Coefficient (B) | 2.709E−02 | −2.842E−02 | −5.257E−03 | 2.186E−02 | −5.221E−02 | −8.331E−02 |
| Eighth Coefficient (C) | −1.091E−01 | −5.727E−02 | −7.819E−02 | −5.531E−02 | 2.206E−01 | 3.822E−01 |
| Tenth Coefficient (D) | 2.058E−01 | 1.945E−01 | 2.327E−01 | 1.017E−01 | −5.443E−01 | −1.087E+00 |
| Twelfth Coefficient (E) | −2.448E−01 | −2.652E−01 | −3.343E−01 | −1.267E−01 | 8.533E−01 | 2.009E+00 |
| Fourteenth Coefficient (F) | 1.982E−01 | 2.221E−01 | 3.066E−01 | 1.099E−01 | −9.036E−01 | −2.550E+00 |

TABLE 26-continued

| | | | | | | |
|---|---|---|---|---|---|---|
| Sixteenth Coefficient (G) | −1.136E−01 | −1.270E−01 | −1.956E−01 | −6.758E−02 | 6.724E−01 | 2.295E+00 |
| Eighteenth Coefficient (H) | 4.689E−02 | 5.159E−02 | 8.975E−02 | 2.975E−02 | −3.587E−01 | −1.487E+00 |
| Twentieth Coefficient (J) | −1.402E−02 | −1.511E−02 | −2.990E−02 | −9.366E−03 | 1.379E−01 | 6.942E−01 |
| Twenty-Second Coefficient (L) | 3.008E−03 | 3.173E−03 | 7.177E−03 | 2.087E−03 | −3.789E−02 | −2.314E−01 |
| Twenty-Fourth Coefficient (M) | −4.517E−04 | −4.669E−04 | −1.210E−03 | −3.206E−04 | 7.252E−03 | 5.369E−02 |
| Twenty-Sixth Coefficient (N) | 4.508E−05 | 4.575E−05 | 1.361E−04 | 3.228E−05 | −9.181E−04 | −8.229E−03 |
| Twenty-Eighth Coefficient (O) | −2.687E−06 | −2.683E−06 | −9.163E−06 | −1.918E−06 | 6.907E−05 | 7.489E−04 |
| Thirtieth Coefficient (P) | 7.240E−08 | 7.133E−08 | 2.794E−07 | 5.110E−08 | −2.338E−06 | −3.064E−05 |

| | S7 | S8 | S9 | S10 | S11 | S12 |
|---|---|---|---|---|---|---|
| Conic Constant (K) | −13.538 | −85.440 | −33.417 | −32.487 | −20.904 | 44.577 |
| Fourth Coefficient (A) | −1.237E−02 | −2.197E−02 | −4.111E−02 | −3.479E−02 | −5.655E−02 | −9.796E−02 |
| Sixth Coefficient (B) | −2.377E−02 | 8.236E−02 | 6.809E−02 | 2.377E−02 | 3.809E−02 | 7.745E−02 |
| Eighth Coefficient (C) | 1.996E−01 | −2.792E−01 | −2.084E−01 | −3.481E−02 | −2.898E−02 | −1.063E−01 |
| Tenth Coefficient (D) | −5.686E−01 | 6.656E−01 | 4.542E−01 | 2.706E−02 | 4.089E−03 | 1.225E−01 |
| Twelfth Coefficient (E) | 9.954E−01 | −1.079E+00 | −7.044E−01 | 9.334E−03 | 2.957E−02 | −9.647E−02 |
| Fourteenth Coefficient (F) | −1.197E+00 | 1.214E+00 | 7.889E−01 | −5.028E−02 | −4.726E−02 | 5.302E−02 |
| Sixteenth Coefficient (G) | 1.026E+00 | −9.706E−01 | −6.483E−01 | 6.235E−02 | 4.031E−02 | −2.122E−02 |
| Eighteenth Coefficient (H) | −6.360E−01 | 5.592E−01 | 3.941E−01 | −4.487E−02 | −2.259E−02 | 6.352E−03 |
| Twentieth Coefficient (J) | 2.852E−01 | −2.326E−01 | −1.769E−01 | 2.123E−02 | 8.779E−03 | −1.429E−03 |
| Twenty-Second Coefficient (L) | −9.151E−02 | 6.917E−02 | 5.788E−02 | −6.816E−03 | −2.388E−03 | 2.368E−04 |
| Twenty-Fourth Coefficient (M) | 2.047E−02 | −1.432E−02 | −1.341E−02 | 1.474E−03 | 4.463E−04 | −2.768E−05 |
| Twenty-Sixth Coefficient (N) | −3.029E−03 | 1.960E−03 | 2.084E−03 | −2.058E−04 | −5.458E−05 | 2.122E−06 |
| Twenty-Eighth Coefficient (O) | 2.664E−04 | −1.592E−04 | −1.945E−04 | 1.675E−05 | 3.930E−06 | −9.388E−08 |
| Thirtieth Coefficient (P) | −1.053E−05 | 5.814E−06 | 8.242E−06 | −6.030E−07 | −1.261E−07 | 1.763E−09 |

| | S13 | S14 | S15 | S16 | S17 | S18 |
|---|---|---|---|---|---|---|
| Conic Constant (K) | 2.610 | −2.850 | −6.044 | −10.652 | 29.835 | −12.297 |
| Fourth Coefficient (A) | 1.874E−02 | 1.748E−02 | 1.767E−02 | 3.816E−02 | −8.243E−02 | −4.355E−02 |
| Sixth Coefficient (B) | 1.180E−02 | −9.318E−03 | −2.322E−02 | −2.386E−02 | 3.106E−02 | 1.586E−02 |
| Eighth Coefficient (C) | −7.060E−02 | −1.005E−02 | 1.132E−02 | 5.707E−03 | −9.985E−03 | −4.990E−03 |
| Tenth Coefficient (D) | 1.035E−01 | 2.448E−02 | −3.180E−03 | 7.466E−04 | 2.603E−03 | 1.208E−03 |
| Twelfth Coefficient (E) | −8.290E−02 | −2.162E−02 | 1.159E−04 | −1.213E−03 | −4.875E−04 | −2.156E−04 |
| Fourteenth Coefficient (F) | 4.197E−02 | 1.102E−02 | 2.512E−04 | 5.015E−04 | 6.307E−05 | 2.815E−05 |
| Sixteenth Coefficient (G) | −1.437E−02 | −3.670E−03 | −1.021E−04 | −1.220E−04 | −5.623E−06 | −2.713E−06 |
| Eighteenth Coefficient (H) | 3.446E−03 | 8.447E−04 | 2.191E−05 | 1.972E−05 | 3.451E−07 | 1.948E−07 |
| Twentieth Coefficient (J) | −5.888E−04 | −1.374E−04 | −3.012E−06 | −2.201E−06 | −1.435E−08 | −1.042E−08 |
| Twenty-Second Coefficient (L) | 7.180E−05 | 1.580E−05 | 2.758E−07 | 1.702E−07 | 3.844E−10 | 4.091E−10 |
| Twenty-Fourth Coefficient (M) | −6.168E−06 | −1.260E−06 | −1.663E−08 | −8.951E−09 | −5.732E−12 | −1.143E−11 |
| Twenty-Sixth Coefficient (N) | 3.593E−07 | 6.631E−08 | 6.280E−10 | 3.047E−10 | 1.956E−14 | 2.145E−13 |
| Twenty-Eighth Coefficient (O) | −1.294E−08 | −2.073E−09 | −1.322E−11 | −6.037E−12 | 6.704E−16 | −2.414E−15 |

TABLE 26-continued

| | | | | | | |
|---|---|---|---|---|---|---|
| Thirtieth Coefficient (P) | 2.206E−10 | 2.916E−11 | 1.148E−13 | 5.266E−14 | −7.406E−18 | 1.229E−17 |

Additionally, the optical imaging system 1300 configured as described above may have the aberration characteristics illustrated in FIG. 26.

Figure 27:
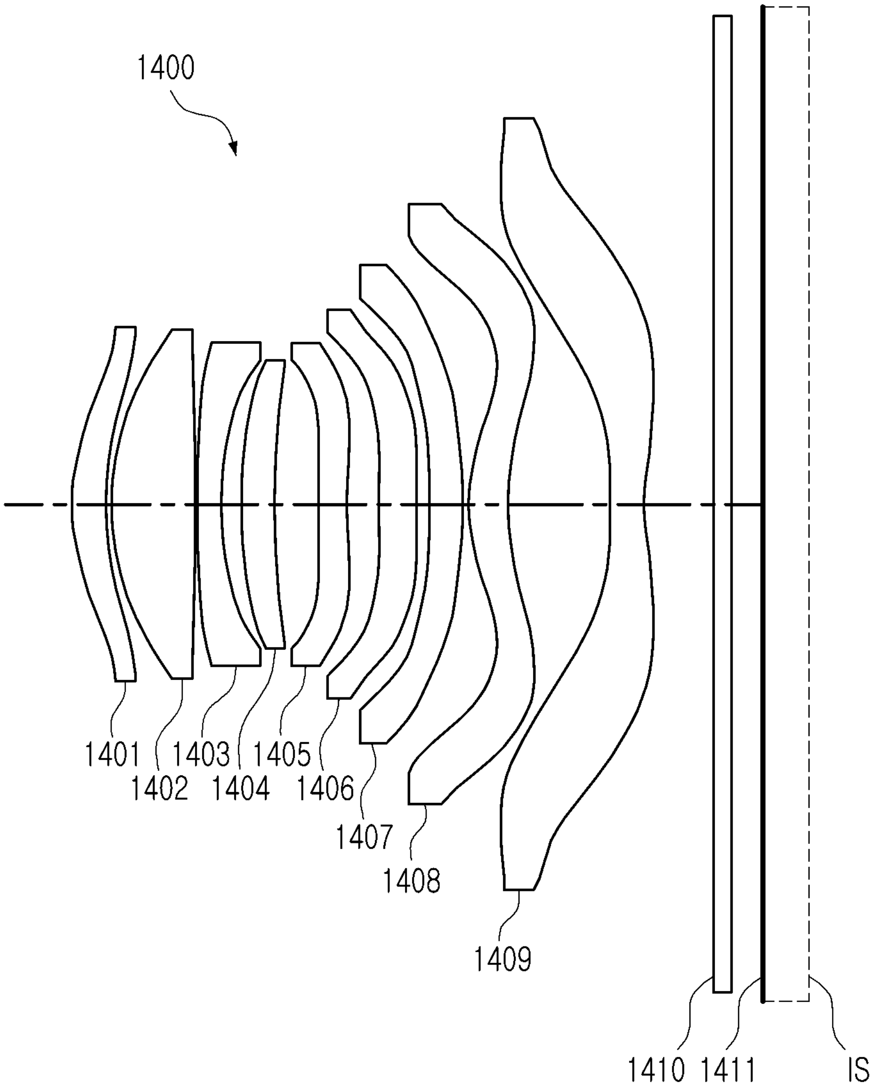
FIG. 27 is a block diagram of an optical imaging system according to a fourteenth embodiment of the present disclosure.
Figure 28:
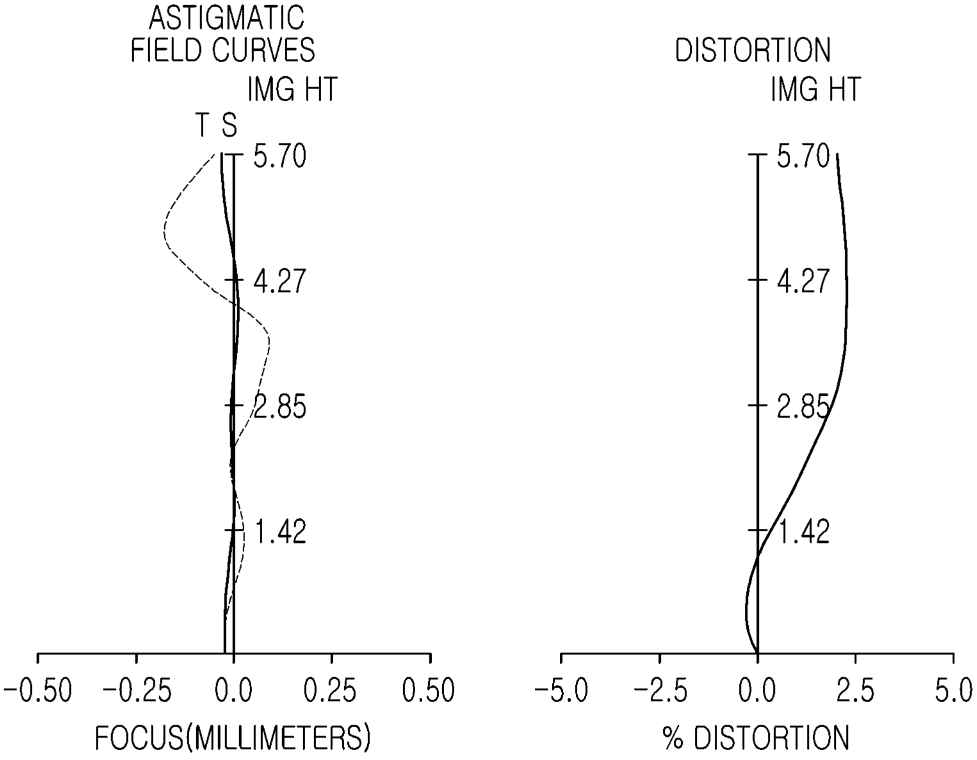
FIG. 28 is a view illustrating aberration characteristics of the optical imaging system illustrated in FIG. 27.

FIG. 27 is a structural view of an optical imaging system according to a fourteenth embodiment of the present disclosure, and FIG. 28 is a view illustrating aberration characteristics of the optical imaging system illustrated in FIG. 27.

Referring to FIG. 27, an optical imaging system 1400 according to the fourteenth embodiment of the present invention includes a first lens 1401, a second lens 1402, a third lens 1403, a fourth lens 1404, a fifth lens 1405, a sixth lens 1406, a seventh lens 1407, an eighth lens 1408, and a ninth lens 1409, and may further include a filter 1410 and an image sensor IS.

The optical imaging system 1400 according to the fourteenth embodiment of the present invention may form a focus on an imaging surface 1411. The imaging surface 1411 may denote a surface on which a focus is formed by the optical imaging system. In an example, the imaging surface 1411 may denote one surface of the image sensor IS on which light is received.

The lens characteristics (a radius of curvature, a lens thickness, a distance between lenses, an index of refraction, an Abbe number, and a focal length) of each lens are illustrated in Table 27 below.

TABLE 27

| Surface Number | Element | Radius of Curvature | Thickness or Distance | Index of Refraction | Abbe Number | Focal Length |
|---|---|---|---|---|---|---|
| S1 | First | 3.112 | 0.410 | 1.544 | 55.99 | 37.73 |
| S2 | Lens | 3.494 | 0.067 | | | |
| S3 | Second | 3.316 | 1.039 | 1.544 | 55.99 | 6.26 |
| S4 | Lens | 96.614 | 0.030 | | | |
| S5 | Third | 17.681 | 0.295 | 1.639 | 23.49 | −9.58 |
| S6 | Lens | 4.552 | 0.243 | | | |
| S7 | Fourth | 6.133 | 0.411 | 1.544 | 55.99 | 23.44 |
| S8 | Lens | 11.490 | 0.540 | | | |
| S9 | Fifth | 19.705 | 0.367 | 1.671 | 19.24 | −57.87 |
| S10 | Lens | 13.024 | 0.370 | | | |
| S11 | Sixth | 26.215 | 0.480 | 1.544 | 55.99 | −65.66 |
| S12 | Lens | 15.049 | 0.164 | | | |
| S13 | Seventh | −6.531 | 0.413 | 1.614 | 25.94 | −121.29 |
| S14 | Lens | −7.325 | 0.060 | | | |
| S15 | Eighth | 2.198 | 0.495 | 1.544 | 55.99 | 8.14 |
| S16 | Lens | 4.002 | 1.262 | | | |
| S17 | Ninth | 33.575 | 0.425 | 1.535 | 55.74 | −5.68 |
| S18 | Lens | 2.783 | 0.868 | | | |
| S19 | Filter | Infinity | 0.210 | 1.517 | 64.20 | |
| S20 | | Infinity | 0.070 | | | |
| S21 | Imaging Surface | Infinity | | | | |

A total focal length f of the optical imaging system 1400 according to the fourteenth embodiment of the present invention is 6.83 mm, Fno is 1.49, IMG HT is 6 mm, FOV is 80.5°, SWA11 is 20.181°, SWA21 is 34.613°, and f12 is 5.623 mm.

In the fourteenth embodiment of the present invention, the first lens 1401 has a positive refractive power, a first surface of the first lens 1401 is convex in the paraxial region, and a second surface of the first lens 1401 is concave in the paraxial region.

The second lens 1402 has a positive refractive power, a first surface of the second lens 1402 is convex in the paraxial region, and a second surface of the second lens 1402 is concave in the paraxial region.

The third lens 1403 has a negative refractive power, a first surface of the third lens 1403 is convex in the paraxial region, and a second surface of the third lens 1403 is concave in the paraxial region.

The fourth lens 1404 has a positive refractive power, a first surface of the fourth lens 1404 is convex in the paraxial region, and a second surface of the fourth lens 1404 is concave in the paraxial region.

The fifth lens 1405 has a negative refractive power, a first surface of the fifth lens 1405 is convex in the paraxial region, and a second surface of the fifth lens 1405 is concave in the paraxial region.

The sixth lens 1406 has a negative refractive power, a first surface of the sixth lens 1406 is convex in the paraxial region, and a second surface of the sixth lens 1406 is concave in the paraxial region.

The seventh lens 1407 has a negative refractive power, a first surface of the seventh lens 1407 is concave in the paraxial region, and a second surface of the seventh lens 1407 is convex in the paraxial region.

The eighth lens 1408 has a positive refractive power, a first surface of the eighth lens 1408 is convex in the paraxial region, and a second surface of the eighth lens 1408 is concave in the paraxial region.

The ninth lens 1409 has a negative refractive power, a first surface of the ninth lens 1409 is convex in the paraxial region, and a second surface of the ninth lens 1409 is concave in the paraxial region.

Additionally, one or more of the fifth lens 1405 to the ninth lens 1409 has at least one inflection point formed on either one or both of the first surface and the second surface thereof.

Each surface of the first lens 1401 to the ninth lens 1409 has aspherical coefficients as illustrated in Table 28 below. For example, both an object-side surface and an image-side surface of each of the first lens 1401 to the ninth lens 1409 are aspherical surfaces.

TABLE 28

| | S1 | S2 | S3 | S4 | S5 | S6 |
|---|---|---|---|---|---|---|
| Conic Constant (K) | −4.915 | −12.307 | −4.362 | 99.000 | 10.694 | 4.554 |
| Fourth Coefficient (A) | 1.472E−02 | 1.022E−02 | −1.835E−03 | 3.071E−02 | 2.295E−02 | 1.071E−02 |
| Sixth Coefficient (B) | −1.508E−02 | −1.569E−02 | −8.326E−05 | −1.448E−01 | −1.483E−01 | −1.915E−01 |

TABLE 28-continued

| | | | | | | |
|---|---|---|---|---|---|---|
| Eighth Coefficient (C) | 2.611E−02 | 1.476E−02 | 4.518E−03 | 3.069E−01 | 3.740E−01 | 8.442E−01 |
| Tenth Coefficient (D) | −3.675E−02 | −1.829E−02 | −1.241E−02 | −4.203E−01 | −6.158E−01 | −2.275E+00 |
| Twelfth Coefficient (E) | 3.508E−02 | 2.017E−02 | 1.881E−02 | 3.967E−01 | 7.105E−01 | 4.032E+00 |
| Fourteenth Coefficient (F) | −2.344E−02 | −1.496E−02 | −1.607E−02 | −2.631E−01 | −5.830E−01 | −4.902E+00 |
| Sixteenth Coefficient (G) | 1.119E−02 | 7.336E−03 | 8.726E−03 | 1.236E−01 | 3.438E−01 | 4.203E+00 |
| Eighteenth Coefficient (H) | −3.850E−03 | −2.400E−03 | −3.192E−03 | −4.099E−02 | −1.467E−01 | −2.582E+00 |
| Twentieth Coefficient (J) | 9.544E−04 | 5.131E−04 | 8.012E−04 | 9.454E−03 | 4.527E−02 | 1.141E+00 |
| Twenty-Second Coefficient (L) | −1.685E−04 | −6.567E−05 | −1.363E−04 | −1.455E−03 | −9.991E−03 | −3.594E−01 |
| Twenty-Fourth Coefficient (M) | 2.061E−05 | 3.388E−06 | 1.502E−05 | 1.352E−04 | 1.536E−03 | 7.879E−02 |
| Twenty-Sixth Coefficient (N) | −1.656E−06 | 2.678E−07 | −9.627E−07 | −5.426E−06 | −1.559E−04 | −1.141E−02 |
| Twenty-Eighth Coefficient (O) | 7.836E−08 | −4.885E−08 | 2.611E−08 | −1.443E−07 | 9.391E−06 | 9.824E−04 |
| Thirtieth Coefficient (P) | −1.647E−09 | 2.101E−09 | 1.259E−10 | 1.613E−08 | −2.537E−07 | −3.803E−05 |

| | S7 | S8 | S9 | S10 | S11 | S12 |
|---|---|---|---|---|---|---|
| Conic Constant (K) | −8.127 | −53.603 | −24.476 | −44.380 | 15.028 | 1.666 |
| Fourth Coefficient (A) | 4.466E−03 | 4.062E−03 | −2.750E−02 | −2.920E−02 | −6.257E−02 | −9.148E−02 |
| Sixth Coefficient (B) | −3.158E−02 | −4.247E−02 | 2.020E−02 | 9.525E−03 | 3.873E−02 | 4.383E−02 |
| Eighth Coefficient (C) | 9.498E−02 | 1.681E−01 | −1.211E−01 | −1.379E−02 | −3.081E−02 | −9.348E−03 |
| Tenth Coefficient (D) | −2.109E−01 | −4.550E−01 | 3.633E−01 | 1.400E−02 | 4.442E−02 | −1.104E−02 |
| Twelfth Coefficient (E) | 3.397E−01 | 8.422E−01 | −6.809E−01 | −5.307E−03 | −6.870E−02 | 1.548E−02 |
| Fourteenth Coefficient (F) | −3.940E−01 | −1.090E+00 | 8.579E−01 | −9.870E−03 | 7.347E−02 | −1.147E−02 |
| Sixteenth Coefficient (G) | 3.312E−01 | 1.003E+00 | −7.574E−01 | 1.846E−02 | −5.288E−02 | 5.873E−03 |
| Eighteenth Coefficient (H) | −2.024E−01 | −6.627E−01 | 4.789E−01 | −1.541E−02 | 2.627E−02 | −2.144E−03 |
| Twentieth Coefficient (J) | 8.961E−02 | 3.142E−01 | −2.184E−01 | 7.855E−03 | −9.127E−03 | 5.575E−04 |
| Twenty-Second Coefficient (L) | −2.838E−02 | −1.058E−01 | 7.132E−02 | −2.624E−03 | 2.213E−03 | −1.026E−04 |
| Twenty-Fourth Coefficient (M) | 6.254E−03 | 2.465E−02 | −1.629E−02 | 5.784E−04 | −3.664E−04 | 1.309E−05 |
| Twenty-Sixth Coefficient (N) | −9.092E−04 | −3.773E−03 | 2.471E−03 | −8.126E−05 | 3.945E−05 | −1.103E−06 |
| Twenty-Eighth Coefficient (O) | 7.831E−05 | 3.408E−04 | −2.241E−04 | 6.597E−06 | −2.484E−06 | 5.524E−08 |
| Thirtieth Coefficient (P) | −3.023E−06 | −1.374E−05 | 9.191E−06 | −2.355E−07 | 6.931E−08 | −1.241E−09 |

| | S13 | S14 | S15 | S16 | S17 | S18 |
|---|---|---|---|---|---|---|
| Conic Constant (K) | 3.582 | 1.778 | −7.010 | −12.692 | 30.689 | −17.741 |
| Fourth Coefficient (A) | 3.804E−02 | −7.739E−03 | −9.790E−04 | 2.404E−02 | −1.132E−01 | −4.777E−02 |
| Sixth Coefficient (B) | −3.480E−02 | 3.571E−02 | 1.792E−02 | −1.988E−03 | 5.994E−02 | 2.150E−02 |
| Eighth Coefficient (C) | 3.010E−02 | −6.116E−02 | −3.639E−02 | −1.387E−02 | −2.608E−02 | −8.081E−03 |
| Tenth Coefficient (D) | −2.189E−02 | 6.020E−02 | 3.018E−02 | 1.160E−02 | 8.445E−03 | 2.245E−03 |
| Twelfth Coefficient (E) | 1.222E−02 | −3.811E−02 | −1.539E−02 | −5.165E−03 | −1.911E−03 | −4.485E−04 |
| Fourteenth Coefficient (F) | −5.409E−03 | 1.629E−02 | 5.316E−03 | 1.498E−03 | 3.017E−04 | 6.475E−05 |
| Sixteenth Coefficient (G) | 1.784E−03 | −4.867E−03 | −1.299E−03 | −3.014E−04 | −3.379E−05 | −6.859E−06 |
| Eighteenth Coefficient (H) | −3.721E−04 | 1.036E−03 | 2.288E−04 | 4.324E−05 | 2.720E−06 | 5.382E−07 |
| Twentieth Coefficient (J) | 2.887E−05 | −1.584E−04 | −2.916E−05 | −4.455E−06 | −1.581E−07 | −3.123E−08 |

TABLE 28-continued

| | | | | | | |
|---|---|---|---|---|---|---|
| Twenty-Second Coefficient (L) | 6.760E−06 | 1.725E−05 | 2.658E−06 | 3.270E−07 | 6.580E−09 | 1.320E−09 |
| Twenty-Fourth Coefficient (M) | −2.285E−06 | −1.307E−06 | −1.686E−07 | −1.668E−08 | −1.916E−10 | −3.944E−11 |
| Twenty-Sixth Coefficient (N) | 2.950E−07 | 6.551E−08 | 7.051E−09 | 5.614E−10 | 3.707E−12 | 7.860E−13 |
| Twenty-Eighth Coefficient (O) | −1.876E−08 | −1.954E−09 | −1.745E−10 | −1.119E−11 | −4.285E−14 | −9.355E−15 |
| Thirtieth Coefficient (P) | 4.847E−10 | 2.627E−11 | 1.933E−12 | 1.001E−13 | 2.239E−16 | 5.017E−17 |

Additionally, the optical imaging system 1400 configured as described above may have the aberration characteristics illustrated in FIG. 28.

Figure 29:
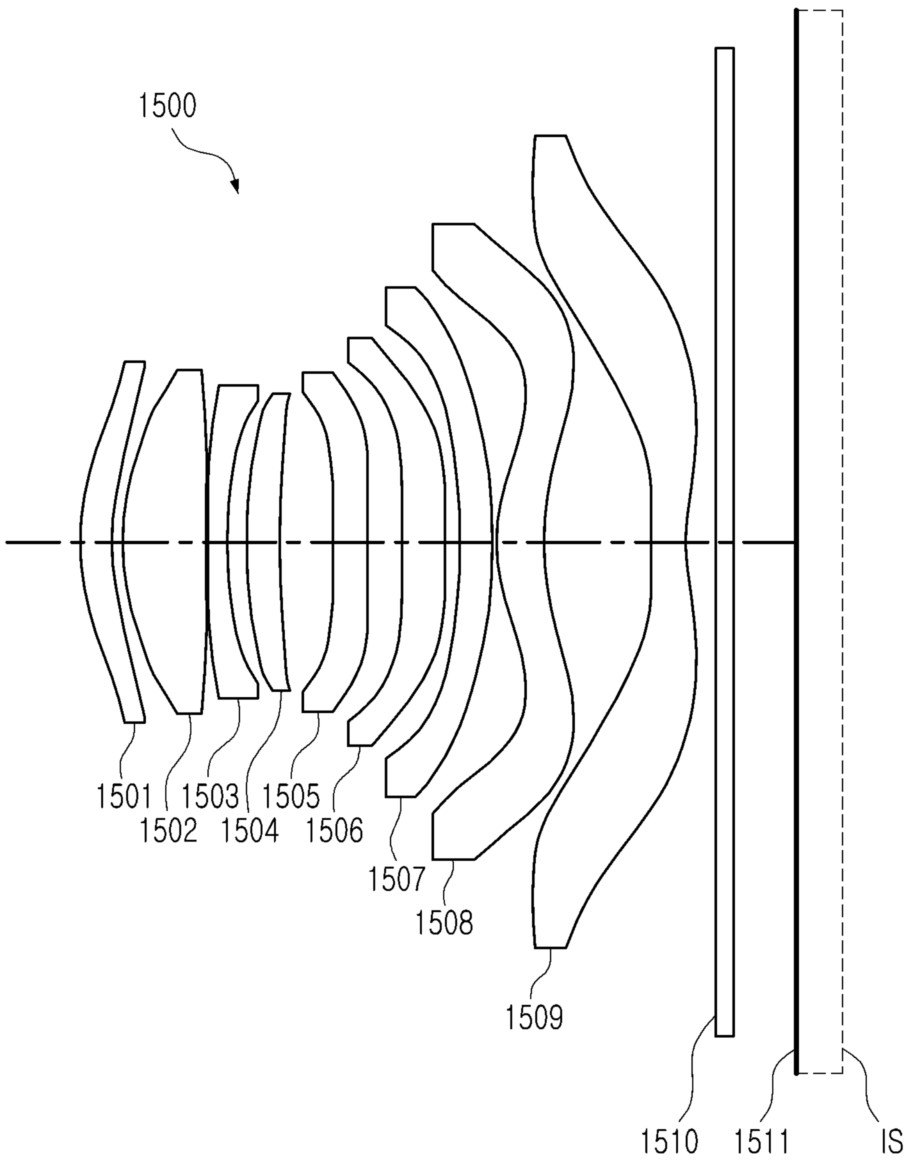
FIG. 29 is a structural view of an optical imaging system according to a fifteenth embodiment of the present disclosure.
Figure 30:
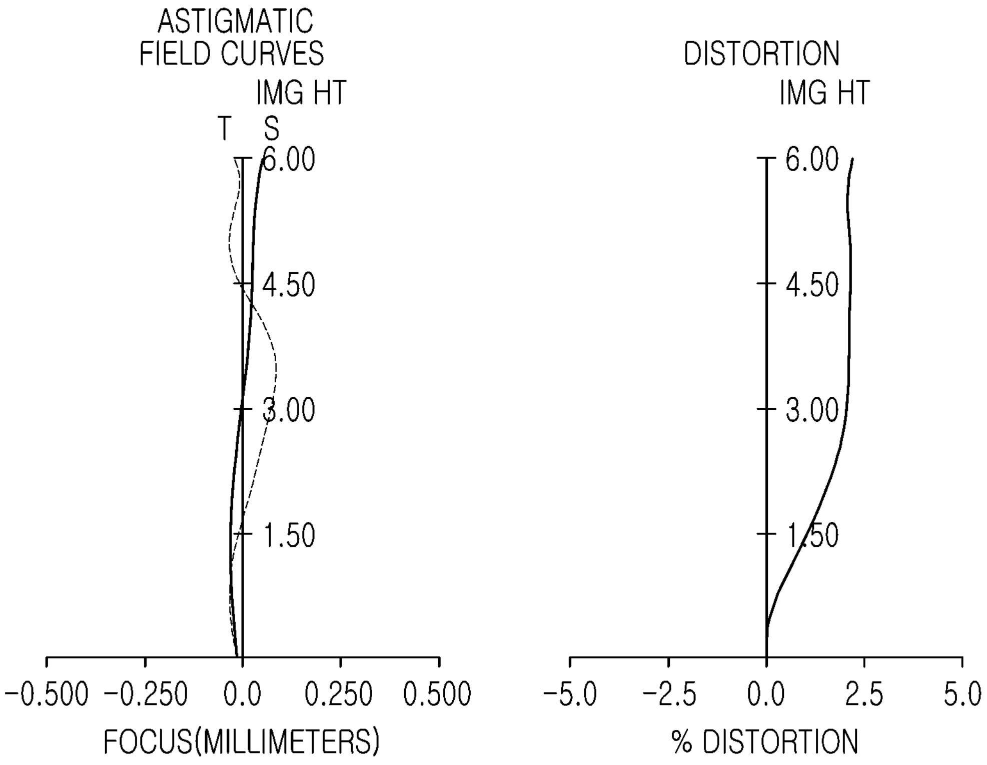
FIG. 30 is a view illustrating aberration characteristics of the optical imaging system illustrated in FIG. 29.

FIG. 29 is a structural view of an optical imaging system according to a fifteenth embodiment of the present disclosure, and FIG. 30 is a view illustrating aberration characteristics of the optical imaging system illustrated in FIG. 29.

Referring to FIG. 29, an optical imaging system 1500 according to the fifteenth embodiment of the present invention includes a first lens 1501, a second lens 1502, a third lens 1503, a fourth lens 1504, a fifth lens 1505, a sixth lens 1506, a seventh lens 1507, an eighth lens 1508, and a ninth lens 1509, and may further include a filter 1510 and an image sensor IS.

The optical imaging system 1500 according to the fifteenth embodiment of the present invention may form a focus on an imaging surface 1511. The imaging surface 1511 may denote a surface on which a focus is formed by the optical imaging system. In an example, the imaging surface 1511 may denote one surface of the image sensor IS on which light is received.

The lens characteristics (a radius of curvature, a lens thickness, a distance between lenses, an index of refraction, an Abbe number, and a focal length) of each lens are illustrated in Table 29 below.

TABLE 29

| Surface Number | Element | Radius of Curvature | Thickness or Distance | Index of Refraction | Abbe Number | Focal Length |
|---|---|---|---|---|---|---|
| S1 | First | 3.110 | 0.374 | 1.544 | 55.99 | 37.06 |
| S2 | Lens | 3.519 | 0.111 | | | |
| S3 | Second | 3.338 | 0.949 | 1.544 | 55.99 | 6.36 |
| S4 | Lens | 75.139 | 0.033 | | | |
| S5 | Third | 16.743 | 0.210 | 1.639 | 23.49 | −9.72 |
| S6 | Lens | 4.541 | 0.226 | | | |
| S7 | Fourth | 5.762 | 0.388 | 1.544 | 55.99 | 21.7 |
| S8 | Lens | 10.941 | 0.609 | | | |
| S9 | Fifth | 51.940 | 0.401 | 1.671 | 19.24 | −52.34 |
| S10 | Lens | 21.033 | 0.402 | | | |
| S11 | Sixth | 39.872 | 0.480 | 1.544 | 55.99 | −66.59 |
| S12 | Lens | 18.943 | 0.163 | | | |
| S13 | Seventh | −6.448 | 0.380 | 1.614 | 25.94 | −90.53 |
| S14 | Lens | −7.449 | 0.060 | | | |
| S15 | Eighth | 2.156 | 0.538 | 1.544 | 55.99 | 7.89 |
| S16 | Lens | 3.937 | 1.228 | | | |
| S17 | Ninth | 32.913 | 0.400 | 1.535 | 55.74 | −5.95 |
| S18 | Lens | 2.900 | 0.306 | | | |
| S19 | Filter | Infinity | 0.210 | 1.517 | 64.20 | |
| S20 | | Infinity | 0.751 | | | |
| S21 | Imaging Surface | Infinity | | | | |

A total focal length f of the optical imaging system 1500 according to the fifteenth embodiment of the present invention is 6.84 mm, Fno is 1.69, IMG HT is 6 mm, FOV is 80.49°, SWA11 is 19.045°, SWA21 is 33.395°, and f12 is 5.671 mm.

In the fifteenth embodiment of the present invention, the first lens 1501 has a positive refractive power, a first surface of the first lens 1501 is convex in the paraxial region, and a second surface of the first lens 1501 is concave in the paraxial region.

The second lens 1502 has a positive refractive power, a first surface of the second lens 1502 is convex in the paraxial region, and a second surface of the second lens 1502 is concave in the paraxial region.

The third lens 1503 has a negative refractive power, a first surface of the third lens 1503 is convex in the paraxial region, and a second surface of the third lens 1503 is concave in the paraxial region.

The fourth lens 1504 has a positive refractive power, a first surface of the fourth lens 1504 is convex in the paraxial region, and a second surface of the fourth lens 1504 is concave in the paraxial region.

The fifth lens 1505 has a negative refractive power, a first surface of the fifth lens 1505 is convex in the paraxial region, and a second surface of the fifth lens 1505 is concave in the paraxial region.

The sixth lens 1506 has a negative refractive power, a first surface of the sixth lens 1506 is convex in the paraxial region, and a second surface of the sixth lens 1506 is concave in the paraxial region.

The seventh lens 1507 has a negative refractive power, a first surface of the seventh lens 1507 is concave in the paraxial region, and a second surface of the seventh lens 1507 is convex in the paraxial region.

The eighth lens 1508 has a positive refractive power, a first surface of the eighth lens 1508 is convex in the paraxial region, and a second surface of the eighth lens 1508 is concave in the paraxial region.

The ninth lens 1509 has a negative refractive power, a first surface of the ninth lens 1509 is convex in the paraxial region, and a second surface of the ninth lens 1509 is concave in the paraxial region.

Additionally, one or more of the fifth lens 1505 to the ninth lens 1509 has at least one inflection point formed on either one or both of the first surface and the second surface thereof.

Each surface of the first lens 1501 to the ninth lens 1509 has aspherical coefficients as illustrated in Table 30 below. For example, both an object-side surface and an image-side surface of each of the first lens 1501 to the ninth lens 1509 are aspherical surfaces.

TABLE 30

| | S1 | S2 | S3 | S4 | S5 | S6 |
|---|---|---|---|---|---|---|
| Conic Constant (K) | −5.517 | −12.092 | −4.259 | 99.000 | 20.052 | 4.565 |
| Fourth Coefficient (A) | 1.933E−02 | 1.397E−02 | −2.160E−03 | 4.518E−02 | 3.735E−02 | 6.053E−03 |
| Sixth Coefficient (B) | −3.085E−02 | −4.567E−02 | 1.093E−03 | −2.702E−01 | −2.608E−01 | −1.387E−01 |
| Eighth Coefficient (C) | 6.061E−02 | 1.079E−01 | −8.651E−03 | 7.191E−01 | 7.711E−01 | 5.715E−01 |
| Tenth Coefficient (D) | −9.012E−02 | −1.882E−01 | 4.058E−02 | −1.197E+00 | −1.430E+00 | −1.469E+00 |
| Twelfth Coefficient (E) | 9.244E−02 | 2.266E−01 | −8.070E−02 | 1.352E+00 | 1.814E+00 | 2.542E+00 |
| Fourteenth Coefficient (F) | −6.691E−02 | −1.899E−01 | 9.668E−02 | −1.077E+00 | −1.632E+00 | −3.073E+00 |
| Sixteenth Coefficient (G) | 3.473E−02 | 1.132E−01 | −7.649E−02 | 6.190E−01 | 1.064E+00 | 2.656E+00 |
| Eighteenth Coefficient (H) | −1.303E−02 | −4.860E−02 | 4.166E−02 | −2.594E−01 | −5.069E−01 | −1.659E+00 |
| Twentieth Coefficient (J) | 3.526E−03 | 1.508E−02 | −1.590E−02 | 7.928E−02 | 1.766E−01 | 7.502E−01 |
| Twenty-Second Coefficient (L) | −6.799E−04 | −3.351E−03 | 4.248E−03 | −1.746E−02 | −4.441E−02 | −2.429E−01 |
| Twenty-Fourth Coefficient (M) | 9.075E−05 | 5.199E−04 | −7.795E−04 | 2.697E−03 | 7.846E−03 | 5.487E−02 |
| Twenty-Sixth Coefficient (N) | −7.927E−06 | −5.349E−05 | 9.363E−05 | −2.768E−04 | −9.231E−04 | −8.209E−03 |
| Twenty-Eighth Coefficient (O) | 4.050E−07 | 3.279E−06 | −6.632E−06 | 1.694E−05 | 6.490E−05 | 7.306E−04 |
| Thirtieth Coefficient (P) | −9.087E−09 | −9.062E−08 | 2.101E−07 | −4.671E−07 | −2.061E−06 | −2.928E−05 |

| | S7 | S8 | S9 | S10 | S11 | S12 |
|---|---|---|---|---|---|---|
| Conic Constant (K) | −8.237 | −64.854 | −99.000 | −74.600 | 56.326 | 10.586 |
| Fourth Coefficient (A) | 6.270E−04 | −7.096E−03 | −2.960E−02 | −3.370E−02 | −6.276E−02 | −9.275E−02 |
| Sixth Coefficient (B) | −2.500E−02 | 3.036E−02 | 8.598E−04 | 1.322E−02 | 2.811E−02 | 3.620E−02 |
| Eighth Coefficient (C) | 8.655E−02 | −1.314E−01 | −1.213E−02 | −2.175E−02 | 1.989E−02 | −2.576E−03 |
| Tenth Coefficient (D) | −2.104E−01 | 3.452E−01 | 6.403E−02 | 4.314E−02 | −7.486E−02 | −1.521E−02 |
| Twelfth Coefficient (E) | 3.705E−01 | −6.140E−01 | −1.705E−01 | −7.246E−02 | 1.075E−01 | 2.160E−02 |
| Fourteenth Coefficient (F) | −4.723E−01 | 7.734E−01 | 2.710E−01 | 8.448E−02 | −1.015E−01 | −1.850E−02 |
| Sixteenth Coefficient (G) | 4.370E−01 | −7.059E−01 | −2.839E−01 | −6.799E−02 | 6.806E−02 | 1.056E−02 |
| Eighteenth Coefficient (H) | −2.933E−01 | 4.714E−01 | 2.058E−01 | 3.854E−02 | −3.309E−02 | −4.114E−03 |
| Twentieth Coefficient (J) | 1.420E−01 | −2.302E−01 | −1.052E−01 | −1.556E−02 | 1.170E−02 | 1.106E−03 |
| Twenty-Second Coefficient (L) | −4.898E−02 | 8.115E−02 | 3.798E−02 | 4.456E−03 | −2.975E−03 | −2.049E−04 |
| Twenty-Fourth Coefficient (M) | 1.171E−02 | −2.009E−02 | −9.480E−03 | −8.856E−04 | 5.298E−04 | 2.555E−05 |
| Twenty-Sixth Coefficient (N) | −1.841E−03 | 3.313E−03 | 1.560E−03 | 1.163E−04 | −6.263E−05 | −2.032E−06 |
| Twenty-Eighth Coefficient (O) | 1.710E−04 | −3.264E−04 | −1.524E−04 | −9.078E−06 | 4.412E−06 | 9.185E−08 |
| Thirtieth Coefficient (P) | −7.110E−06 | 1.453E−05 | 6.705E−06 | 3.196E−07 | −1.400E−07 | −1.755E−09 |

| | S13 | S14 | S15 | S16 | S17 | S18 |
|---|---|---|---|---|---|---|
| Conic Constant (K) | 3.384 | 2.029 | −7.436 | −13.027 | 24.864 | −13.487 |
| Fourth Coefficient (A) | 5.179E−02 | 3.583E−03 | 2.902E−03 | 3.067E−02 | −9.969E−02 | −5.050E−02 |
| Sixth Coefficient (B) | −6.312E−02 | 3.551E−03 | −3.912E−03 | −1.869E−02 | 4.168E−02 | 1.934E−02 |
| Eighth Coefficient (C) | 5.710E−02 | −1.512E−02 | −8.030E−03 | 3.714E−03 | −1.419E−02 | −6.175E−03 |
| Tenth Coefficient (D) | −4.232E−02 | 1.856E−02 | 9.321E−03 | 6.853E−04 | 3.807E−03 | 1.538E−03 |
| Twelfth Coefficient (E) | 2.845E−02 | −1.277E−02 | −5.497E−03 | −7.614E−04 | −7.331E−04 | −2.929E−04 |

TABLE 30-continued

| | | | | | | |
|---|---|---|---|---|---|---|
| Fourteenth Coefficient (F) | −1.715E−02 | 5.554E−03 | 2.082E−03 | 2.757E−04 | 9.751E−05 | 4.239E−05 |
| Sixteenth Coefficient (G) | 8.223E−03 | −1.628E−03 | −5.427E−04 | −6.057E−05 | −8.838E−06 | −4.670E−06 |
| Eighteenth Coefficient (H) | −2.901E−03 | 3.330E−04 | 1.000E−04 | 8.955E−06 | 5.329E−07 | 3.917E−07 |
| Twentieth Coefficient (J) | 7.334E−04 | −4.828E−05 | −1.308E−05 | −9.169E−07 | −1.975E−08 | −2.476E−08 |
| Twenty-Second Coefficient (L) | −1.310E−04 | 4.946E−06 | 1.197E−06 | 6.489E−08 | 3.144E−10 | 1.153E−09 |
| Twenty-Fourth Coefficient (M) | 1.617E−05 | −3.499E−07 | −7.415E−08 | −3.091E−09 | 6.957E−12 | −3.808E−11 |
| Twenty-Sixth Coefficient (N) | −1.314E−06 | 1.624E−08 | 2.921E−09 | 9.344E−11 | −4.755E−13 | 8.394E−13 |
| Twenty-Eighth Coefficient (O) | 6.345E−08 | −4.439E−10 | −6.465E−11 | −1.584E−12 | 9.821E−15 | −1.102E−14 |
| Thirtieth Coefficient (P) | −1.380E−09 | 5.392E−12 | 5.888E−13 | 1.100E−14 | −7.627E−17 | 6.493E−17 |

Additionally, the optical imaging system configured 1500 as described above may have the aberration characteristics illustrated in FIG. 30.

Table 31 below illustrates conditional expression values of the optical imaging system according to each of the first to fifteenth embodiments.

TABLE 31

| Conditional Expression | Emb. 1 | Emb. 2 | Emb. 3 | Emb. 4 | Emb. 5 |
|---|---|---|---|---|---|
| 0 < f1/f < 30 | 5.418 | 4.826 | 5.728 | 4.920 | 5.402 |
| 0 < f2/f < 3 | 0.930 | 0.955 | 0.925 | 0.959 | 0.912 |
| −3 < f3/f < 0 | −1.421 | −1.428 | −1.433 | −1.450 | −1.365 |
| −1 < f4/f/100 < 0.5 | 0.032 | 0.031 | 0.033 | 0.033 | 0.037 |
| −0.5 < f5/f/100 < 1 | −0.077 | −0.072 | −0.063 | −0.054 | 0.439 |
| −2 < f6/f/100 < 1.5 | −0.097 | −0.073 | 0.562 | 1.462 | −0.075 |
| −0.5 < f7/f/15 | −0.132 | 0.582 | −0.081 | 14.217 | −0.062 |
| −1 < f8/f/100 < 0.5 | 0.012 | 0.012 | 0.012 | 0.013 | 0.011 |
| −3 < f9/f < 0 | −0.870 | −0.857 | −0.870 | −0.849 | −0.868 |
| v1 − v3 < 45 | 32.5 | 32.5 | 32.5 | 32.5 | 32.5 |
| v1 − v5 < 45 | 36.75 | 36.75 | 36.75 | 36.75 | 36.75 |
| TTL/f < 1.5 | 1.205 | 1.202 | 1.202 | 1.202 | 1.206 |
| BFL/f < 0.5 | 0.313 | 0.316 | 0.315 | 0.316 | 0.305 |
| TTL/(2 × IMG HT) < 0.7 | 0.687 | 0.685 | 0.685 | 0.685 | 0.687 |
| FOV × IMG HT/f > 60° | 70.877° | 70.614° | 70.614° | 70.614° | 70.614° |
| Fno ≤ 1.69 | 1.59 | 1.59 | 1.59 | 1.59 | 1.59 |
| SWA11 < 25° | 19.045° | 19.011° | 19.065° | 19.074° | 19.090° |
| SWA21 < 36° | 33.395° | 32.830° | 33.450° | 32.851° | 33.324° |
| Nv26 <= 3 | 3 | 3 | 3 | 3 | 3 |
| 35 < v3 + v5 < 45 | 42.73 | 42.73 | 42.73 | 42.73 | 42.73 |
| 4.5 < f1/f2 < 21 | 5.827 | 5.053 | 6.191 | 5.132 | 5.921 |
| 0.4 < \|f12/f3\| < 0.6 | 0.578 | 0.576 | 0.575 | 0.571 | 0.592 |
| 0.4 < \|f2/f3\| < 0.7 | 0.654 | 0.669 | 0.646 | 0.661 | 0.668 |
| 0.09 < \|f3/f1\| < 0.32 | 0.262 | 0.296 | 0.250 | 0.295 | 0.253 |

| Conditional Expression | Emb. 6 | Emb. 7 | Emb. 8 | Emb. 9 | Emb. 10 |
|---|---|---|---|---|---|
| 0 < f1/f < 30 | 6.218 | 7.123 | 19.625 | 19.353 | 14.962 |
| 0 < f2/f < 3 | 0.889 | 0.887 | 0.958 | 0.958 | 0.960 |
| −3 < f3/f < 0 | −1.355 | −1.409 | −1.962 | −1.959 | −1.887 |
| −1 < f4/f/100 < 0.5 | 0.037 | −0.731 | 0.030 | 0.031 | 0.033 |
| −0.5 < f5/f/100 < 1 | 0.731 | 0.048 | −0.037 | −0.043 | 0.731 |
| −2 < f6/f/100 < 1.5 | −0.055 | −1.326 | 0.457 | −0.621 | −0.041 |
| −0.5 < f7/f/15 | 0.731 | −0.058 | 0.009 | 0.009 | 0.010 |
| −1 < f8/f/100 < 0.5 | 0.013 | 0.012 | −0.083 | −0.085 | −0.238 |
| −3 < f9/f < 0 | −0.879 | −0.915 | −0.669 | −0.671 | −0.666 |
| v1 − v3 < 45 | 32.5 | 32.5 | 36.75 | 36.75 | 36.75 |
| v1 − v5 < 45 | 36.75 | 36.75 | 36.75 | 36.75 | 36.75 |
| TTL/f < 1.5 | 1.206 | 1.202 | 1.204 | 1.204 | 1.204 |
| BFL/f < 0.5 | 0.302 | 0.328 | 0.288 | 0.287 | 0.280 |
| TTL/(2 × IMG HT) < 0.7 | 0.687 | 0.685 | 0.685 | 0.685 | 0.685 |
| FOV × IMG HT/f > 60° | 70.614° | 70.614° | 70.717° | 70.717° | 70.717° |
| Fno ≤ 1.69 | 1.59 | 1.59 | 1.59 | 1.59 | 1.59 |
| SWA11 < 25° | 19.159° | 19.230° | 17.312° | 17.443° | 18.547° |
| SWA21 < 36° | 33.721° | 33.346° | 35.581° | 35.742° | 35.989° |
| Nv26 <= 3 | 3 | 3 | 3 | 3 | 3 |
| 35 < v3 + v5 < 45 | 42.73 | 42.73 | 38.48 | 38.48 | 38.48 |
| 4.5 < f1/f2 < 21 | 6.995 | 8.024 | 20.494 | 20.210 | 15.578 |
| 0.4 < \|f12/f3\| < 0.6 | 0.594 | 0.580 | 0.468 | 0.468 | 0.481 |
| 0.4 < \|f2/f3\| < 0.7 | 0.656 | 0.630 | 0.488 | 0.489 | 0.509 |
| 0.09 < \|f3/f1\| < 0.32 | 0.218 | 0.198 | 0.100 | 0.101 | 0.126 |

TABLE 31-continued

| Conditional Expression | Emb. 11 | Emb. 12 | Emb. 13 | Emb. 14 | Emb. 15 |
|---|---|---|---|---|---|
| 0 < f1/f < 30 | 7.848 | 8.216 | 9.015 | 5.524 | 5.418 |
| 0 < f2/f < 3 | 0.880 | 0.877 | 0.868 | 0.917 | 0.930 |
| −3 < f3/f < 0 | −1.420 | −1.428 | −1.430 | −1.403 | −1.421 |
| −1 < f4/f/100 < 0.5 | −0.715 | −0.728 | −0.726 | 0.034 | 0.032 |
| −0.5 < f5/f/100 < 1 | 0.050 | 0.055 | 0.057 | −0.085 | −0.077 |
| −2 < f6/f/100 < 1.5 | 0.731 | −1.611 | 0.731 | −0.096 | −0.097 |
| −0.5 < f7/f/15 | −0.054 | 0.731 | 0.731 | −0.178 | −0.132 |
| −1 < f8/f/100 < 0.5 | 0.012 | 0.015 | 0.016 | 0.012 | 0.012 |
| −3 < f9/f < 0 | −0.918 | −0.931 | −0.940 | −0.832 | −0.870 |
| v1 − v3 < 45 | 32.5 | 32.5 | 32.5 | 32.5 | 32.5 |
| v1 − v5 < 45 | 36.75 | 36.75 | 36.75 | 36.75 | 36.75 |
| TTL/f < 1.5 | 1.202 | 1.202 | 1.202 | 1.204 | 1.202 |
| BFL/f < 0.5 | 0.347 | 0.351 | 0.355 | 0.405 | 0.313 |
| TTL/(2 × IMG HT) < 0.7 | 0.685 | 0.685 | 0.685 | 0.685 | 0.685 |
| FOV × IMG HT/f > 60° | 70.614° | 70.614° | 70.614° | 70.717° | 70.605° |
| Fno ≤ 1.69 | 1.59 | 1.59 | 1.59 | 1.49 | 1.69 |
| SWA11 < 25° | 19.264° | 19.281° | 19.309° | 20.181° | 19.045° |
| SWA21 < 36° | 33.366° | 33.538° | 33.511° | 34.613° | 33.395° |
| Nv26 <= 3 | 3 | 3 | 3 | 3 | 3 |
| 35 < v3 + v5 < 45 | 42.73 | 42.73 | 42.73 | 42.73 | 42.73 |
| 4.5 < f1/f2 < 21 | 8.917 | 9.367 | 10.380 | 6.027 | 5.827 |
| 0.4 < \|f12/f3\| < 0.6 | 0.577 | 0.575 | 0.574 | 0.581 | 0.578 |
| 0.4 < \|f2/f3\| < 0.7 | 0.620 | 0.614 | 0.607 | 0.653 | 0.654 |
| 0.09 < \|f3/f1\| < 0.32 | 0.181 | 0.174 | 0.159 | 0.254 | 0.262 |

While this disclosure includes specific examples, it will be apparent after an understanding of the disclosure of this application that various changes in form and details may be made in these examples without departing from the spirit and scope of the claims and their equivalents. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An optical imaging system comprising:

a first lens, a second lens, a third lens, a fourth lens, a fifth lens, a sixth lens, a seventh lens, an eighth lens, and a ninth lens sequentially disposed in ascending numerical order along an optical axis of the optical imaging system from an object side of the optical imaging system toward an imaging surface of the optical imaging system, wherein the first lens has a positive refractive power, the second lens has a positive refractive power, and the third lens has a negative refractive power, an Abbe number of the third lens is less than an Abbe number of the first lens and is less than an Abbe number of the second lens, $TTL/(2\times IMG\ HT)<0.7$ is satisfied, where TTL is a distance along the optical axis from an object-side surface of the first lens to the imaging surface, and IMG HT is one half of a diagonal length of the imaging surface, and $0.09<|f3/f1|<0.32$ is satisfied, where f1 is a focal length of the first lens, and f3 is a focal length of the third lens.

2. The optical imaging system of claim 1, wherein either one or both of $v1-v3<45$ and $v1-v5<45$ is satisfied, where v1 is the Abbe number of the first lens, v3 is the Abbe number of the third lens, and v5 is an Abbe number of the fifth lens.

3. The optical imaging system of claim 2, wherein $35<v3+v5<45$ is satisfied.

4. The optical imaging system of claim 1, wherein $0<f1/f<30$ is satisfied, where f is a total focal length of the optical imaging system.

5. The optical imaging system of claim 1, wherein $0<f2/f<3$ is satisfied, where f2 is a focal length of the second lens, and f is a total focal length of the optical imaging system.

6. The optical imaging system of claim 1, wherein $-3<f3/f<0$ is satisfied, where f is a total focal length of the optical imaging system.

7. The optical imaging system of claim 1, wherein $0.4<|f12/f3|<0.6$ is satisfied, where f12 is a composite focal length of the first lens and the second lens.

8. The optical imaging system of claim 7, wherein $4.5<f1/f2<21$ is satisfied, where f2 is a focal length of the second lens.

9. The optical imaging system of claim 7, wherein $0.4<|f2/f3|<0.7$ is satisfied, where f2 is a focal length of the second lens.

10. The optical imaging system of claim 1, wherein $TTL/f<1.5$ and $BFL/f<0.5$ are satisfied, where BFL is a distance along the optical axis from an image-side surface of the ninth lens to the imaging surface, and f is a total focal length of the optical imaging system.

11. The optical imaging system of claim 1, wherein $Fno\leq 1.69$ is satisfied, where Fno is an F-number of the optical imaging system.

12. The optical imaging system of claim 1, wherein $FOV\times IMG\ HT/f>60°$ is satisfied, where FOV is a field of view of the optical imaging system, and f is a total focal length of the optical imaging system.

13. The optical imaging system of claim 1, wherein either one or both of $SWA11<25°$ and $SWA21<36°$ is satisfied, where SWA11 is a sweep angle at an end of an effective diameter of the object-side surface of the first lens, and SWA21 is a sweep angle at an end of an effective diameter of an object-side surface of the second lens.

14. The optical imaging system of claim 1, wherein each of the first lens to the sixth lens has a convex object-side surface in a paraxial region thereof and a concave image-side surface in a paraxial region thereof.

15. The optical imaging system of claim 1, wherein a sum of the Abbe number of the third lens and an Abbe number of the fifth lens is less than an Abbe number of the fourth lens.

16. The optical imaging system of claim 1, wherein the ninth lens has a negative refractive power, a convex object-side surface in a paraxial region thereof, and a concave image-side surface in a paraxial region thereof.

17. The optical imaging system of claim 1, wherein each of the first lens and the second lens has an Abbe number greater than 54 and less than 57, and the third lens has an Abbe number greater than 18 and less than 24.

18. The optical imaging system of claim 1, wherein the fifth lens has a refractive index greater than 1.64 and an Abbe number less than 21.

19. The optical imaging system of claim 1, wherein two of the fifth to seventh lenses have a refractive index greater than 1.61 and an Abbe number less than 26.

20. The optical imaging system of claim 1, wherein an Abbe number of the seventh lens is less than an Abbe number of the eighth lens and is less than an Abbe number of the ninth lens.

21. The optical imaging system of claim 1, wherein a focal length of the second lens is less than an absolute value of a focal length of the third lens, and the absolute value of the focal length of the third lens is less than a focal length of the first lens.

22. The optical imaging system of claim 1, wherein the optical imaging system has a field of view greater than 80° and less than 85°.

* * * * *